United States Patent
Budampati et al.

(10) Patent No.: US 12,410,067 B2
(45) Date of Patent: Sep. 9, 2025

(54) SYSTEMS AND METHODS FOR OPTIMIZATION OF CONNECTED WATER DEVICES

(71) Applicant: PENTAIR PLC, London (GB)

(72) Inventors: Ramakrishna Budampati, Woodbury, MN (US); Joseph Krueger, Edina, MN (US); Jason Fitzpatrick, Glen Ellyn, IL (US); Edward Brown, Thousand Oaks, CA (US); Roger Turley, Wales, UT (US); Christopher Chomeau, Milwaukee, WI (US); Brian Boothe, Raleigh, NC (US); David MacCallum, Camarillo, CA (US); Marc Brentjens, Roermond (NL); Brian Broga, Elkhorn, WI (US); Justin Kutney, Pewaukee, WI (US); Philip M. Rolchigo, Eden Prairie, MN (US)

(73) Assignee: PENTAIR PLC, London (GB)

( * ) Notice: Subject to any disclaimer, the term of this patent is extended or adjusted under 35 U.S.C. 154(b) by 627 days.

(21) Appl. No.: 17/347,255

(22) Filed: Jun. 14, 2021

(65) Prior Publication Data
US 2021/0309539 A1 Oct. 7, 2021

Related U.S. Application Data

(63) Continuation of application No. PCT/GB2019/053530, filed on Dec. 12, 2019.
(Continued)

(51) Int. Cl.
*C02F 1/00* (2023.01)
*B01D 29/60* (2006.01)
(Continued)

(52) U.S. Cl.
CPC .............. *C02F 1/008* (2013.01); *B01D 29/60* (2013.01); *B01D 35/1435* (2013.01);
(Continued)

(58) Field of Classification Search
None
See application file for complete search history.

(56) References Cited

U.S. PATENT DOCUMENTS 9,282,041 B2 * 3/2016 Calavrezo ............... H04L 47/11
10,011,500 B1 7/2018 Chandler, Jr. et al.
(Continued)

FOREIGN PATENT DOCUMENTS

WO 2018096456 A1 5/2018

OTHER PUBLICATIONS

International Search Report and Written Opinion, International Application No. PCT/GB2019/053530, dated Jun. 23, 2020, 18 pages.

*Primary Examiner* — Sean Shechtman
(74) *Attorney, Agent, or Firm* — Husch Blackwell LLP

(57) ABSTRACT

Systems and methods related to communication with and control of network-enabled water devices and sensors of various water systems are disclosed. Such water systems may include water filtration systems, water reclamation systems, sump pump systems, pool or spa systems, water softening systems, and plumbing systems. Such water devices may include chemical controllers, smart valves, pool pumps, sump pumps, water softeners, residential appliances, and manifolds. Such sensor devices may include flow meters, splash detectors, motion sensors, moisture sensors, humidity sensors, chemical sensors, water level sensors, pressure sensors, and cameras. Data received from network-enabled water devices and sensors may be processed at a remote server or a local controller, which may cause corre- (Continued)

sponding alerts or maintenance requests to be sent to one or more user devices or service providers or may automatically control one or more of the water devices and sensors based on analysis of the data.

8 Claims, 23 Drawing Sheets

Related U.S. Application Data

(60) Provisional application No. 62/778,487, filed on Dec. 12, 2018.

(51) Int. Cl.
| | |
|---|---|
| *B01D 35/143* | (2006.01) |
| *C02F 1/42* | (2023.01) |
| *C02F 5/02* | (2023.01) |
| *C02F 103/42* | (2006.01) |
| *E03B 7/07* | (2006.01) |
| *G05B 23/02* | (2006.01) |
| *G06F 16/953* | (2019.01) |
| *G08B 21/18* | (2006.01) |
| *G16Y 10/75* | (2020.01) |
| *G16Y 30/10* | (2020.01) |
| *H04L 67/125* | (2022.01) |

(52) U.S. Cl.
CPC ............... *C02F 1/001* (2013.01); *C02F 1/42* (2013.01); *C02F 5/02* (2013.01); *G05B 23/0224* (2013.01); *G05B 23/027* (2013.01); *G06F 16/953* (2019.01); *G08B 21/182* (2013.01); *H04L 67/125* (2013.01); *B01D 2201/54* (2013.01); *B01D 2201/56* (2013.01); *C02F 2103/42* (2013.01); *C02F 2201/005* (2013.01); *C02F 2209/006* (2013.01); *C02F 2209/008* (2013.01); *C02F 2209/40* (2013.01); *C02F 2209/445* (2013.01); *C02F 2307/12* (2013.01); *E03B 7/071* (2013.01); *E03B 7/072* (2013.01); *E03B 7/074* (2013.01); *G16Y 10/75* (2020.01); *G16Y 30/10* (2020.01)

(56) References Cited

U.S. PATENT DOCUMENTS

| | | | | |
|---|---|---|---|---|
| 2010/0088273 | A1* | 4/2010 | Donaldson | G06Q 10/10 707/802 |
| 2018/0259131 | A1* | 9/2018 | Ravid | G01F 15/068 |
| 2018/0291911 | A1 | 10/2018 | Ward et al. | |
| 2018/0347157 | A1 | 12/2018 | Brotherton et al. | |

\* cited by examiner

SYSTEMS AND METHODS FOR OPTIMIZATION OF CONNECTED WATER DEVICES

CROSS-REFERENCE TO RELATED APPLICATIONS

This application is a continuation of International Application No. PCT/GB2019/053530, filed Dec. 12, 2019, which claims priority to U.S. Provisional Application No. 62/778,487 filed Dec. 12, 2018, which are incorporated by reference in their entirety for all purposes.

BACKGROUND

Water supplied to a home or business, whether through a well or a municipal water supply, may be used in a variety of applications such as drinking, cooking, showers, baths, toilets, pools, agricultural maintenance, and even heat. With conventional water systems and related devices, one may be able to determine the total amount of water used in their home or business by checking, in person, a meter at the main water feed. However, such conventional meters do not provide information as to how much water is used at each of the various taps and appliances within a home or business, do not provide information about water leaks that may have occurred, and the information that is provided is generally not accessible remotely. Thus, a home or business owner remains uninformed of any potential leaks, misuse, or overuse of water in their home or business, which may be financially and environmentally harmful. This is especially true for homes and business with water filtration systems and water softeners, where the waste of filtered or softened water is even more costly than the waste of otherwise untreated water.

Many homes and businesses may be equipped with water-related devices such as dehumidifiers, sump pumps, dishwashers, and washing machines, as well as chemical controllers, pumps, heaters, and skimmers for pools. Conventionally, such water-related devices include or are connected to one or more controllers through which a user may manually or automatically operate these devices. However, when away from their home or business, a person is generally unable to monitor or control these devices. For example, a homeowner may be unable to remotely instruct a conventional chemical controller for their pool to operate less frequently in their absence, to remotely instruct a conventional sump pump in their basement to turn on in anticipation of inclement weather to prevent flooding, to be informed if an animal or object enters their pool, or to be informed if a water leak has occurred in their home. As another example, when a sump pump system experiences a fault, such as loss of power, a conventional pump control system may not be capable of alerting the home or business owner remotely. A delay in the home or business owner being notified about a fault in the sump pump system can undesirably result in flooding of the home or business.

SUMMARY

In light of the deficiencies described above, new systems and methods for providing individuals with the ability to monitor and control the status of water systems and related devices inside and outside of a home or business and to optimize the performance of these systems and devices and overall water use within the home or business are desirable.

In an example embodiment, a system may include a water system and a communication system. The water system may include a water softener system that receives unsoftened water from a water source and that converts the unsoftened water into softened water and a flow meter in fluid communication with an output of the water softener system, the flow meter generating flow rate data. The communication system may include a gateway device that is coupled to and in electronic communication with the water softener system and the flow meter, and a controller coupled to the gateway device. The controller may include a processor and a memory device comprising computer-readable instructions which, when executed, cause the processor to periodically retrieve the flow rate data from the flow meter, generate a first water usage profile corresponding to a first time period based on the flow rate data, the first water usage profile comprising first water usage statistics derived from a first portion of the flow rate data that is generated during the first time period, and send the first water usage profile to a user device via the gateway device.

In some embodiments, the instructions, when executed, may cause the processor to retrieve a second water usage profile corresponding to a second time period from the memory device. The second time period may immediately precede the first time period. The second water usage profile may include second water usage statistics derived from a second portion of the flow rate data that is generated during the second time period. The first water usage statistics may include a first total water usage for the first time period. The second water usage statistics may include a second total water usage for the second time period.

In some embodiments, the instructions, when executed, may cause the processor to perform a comparison of the first total water usage and the second total water usage, generate a water efficiency report based on the comparison, the water efficiency report indicating whether water usage efficiency of the water system has increased or decreased from the second time period to the first time period, and send the water efficiency report to the user device via the gateway device.

In some embodiments, the instructions, when executed, may cause the processor to determine that the first total water usage exceeds the second total water usage based on the comparison, determine that the first water usage profile represents a constant flow of water occurring for longer than a predetermined threshold time period, and send an alert to the user device indicating that a leak has been detected in the water system.

In some embodiments, the instructions, when executed may cause the processor to determine that automatic leak prevention is enabled based on a configuration stored in the memory device, and cause, via electronic communication via the gateway device, a network-enabled valve disposed at the water source of the water system to close to prevent water from flowing from the water source.

In an example embodiment, a method of generating water usage data describing water usage in a water system having a plurality of flow meters positioned at respectively different locations of the water system to monitor flow of water at each of the locations may be performed. The method may include steps of retrieving, by a processor of a controller, flow rate data collected by each of the plurality of flow meters, generating a first plurality of water usage profiles based on the flow rate data, the first plurality of water usage profiles including respective water usage profiles for each of the locations of the water system and a total water usage profile representing total water usage of the system over at least one time period, retrieving a second plurality of water usage profiles from a profile database of a remote server, comparing the second plurality of water usage profiles to the first plurality of water usage profiles to identify abnormal water usage profiles of the first plurality of water usage profiles, identifying respective abnormality types of each of the abnormal water usage profiles, and sending an alert to a user device associated with the water system, the alert indicating, for each abnormal water usage profile of the abnormal water usage profiles, a corresponding location of the locations, a corresponding abnormality type of the abnormality types, and a corresponding time period of the at least one time period.

In some embodiments, the step of retrieving the second plurality of water usage profiles from the profile database of the remote server includes performing a comparison of a set of characteristics of the water system each of a plurality of sets of characteristics of a plurality of water systems represented in the profile database, based on the comparison, identifying a subset of the plurality of water systems that are characteristically similar to the water system, and retrieving the second plurality of water usage profiles from the profile database of the remote server that correspond to the subset of the plurality of water systems.

In some embodiments, the method may include steps of determining that at least one abnormality type of the abnormality types corresponds to a leak in the water system, a leak location associated with the leak, and sending a leak alert to the user device indicating that a leak has been detected.

In some embodiments, the method may include steps of determining that automatic leak prevention is enabled for the water system, and causing a smart valve of the water system to close to prevent water from flowing to the leak location.

In some embodiments, the method may include steps of retrieving contact information associated with a service provider from memory, contacting the service provider based on the contact information to schedule repair of the leak, and sending a service alert to the user device indicating that the repair of the water system has been scheduled with the service provider.

In some embodiments, the method may include steps of determining that at least one abnormality type of the abnormality types corresponds to misuse of filtered water, and sending a misuse alert to the user device indicating that the filtered water of the water system is being misused.

In some embodiments, the method may include a step of determining that an abnormality subtype of the at least one abnormality type corresponds to the filtered water being used for handwashing. The abnormality subtype may be included in the misuse alert.

In an example embodiment, a system may include a water system and a communication system. The water system may include a water softener, a manifold, a water heater, a dishwasher, and an appliance. The water softener may be coupled to a water source and configured to convert unsoftened water into softened water. The water softener may have a water softener output. The manifold may have multiple manifold outputs, a first manifold input that is coupled directly to the water source, and a second manifold input that is coupled to the water softener output. The multiple manifold outputs may be selectively controllable to open or close. The water heater may have a water heater input coupled to a first manifold output of the plurality of manifold outputs, a first water heater output, and a second water heater output. The first water heater output and the second water heater output may be selectively controllable to open or close. The dishwasher may have a first dishwasher input coupled to the first water heater output and a second dishwasher input coupled to a second manifold output of the plurality of manifold outputs. The appliance may have an appliance input coupled to the second water heater output. The communication system may include a gateway device that is coupled to and in electronic communication with the manifold, the dishwasher, the water heater, and the water softener. The communication system may further include a controller coupled to the gateway device that includes a processor and a memory device comprising computer-readable instructions which, when executed, cause the processor to communicate with and control the manifold, the dishwasher, the water heater and the water softener when the dishwasher performs a self-cleaning operation.

In some embodiments, the instructions, when executed, may cause the processor to receive a request from the dishwasher to initiate the self-cleaning operation, cause the manifold to open the first manifold output and the second manifold output, and to close all other manifold outputs of the plurality of manifold outputs, cause the water heater to close the second water heater output and open the first water heater output, cause the water softener to elevate a salt level of softened water produced by the water softener to the dishwasher through the manifold, cause the dishwasher to initiate the self-cleaning operation, receive a notification from the dishwasher that the self-cleaning operation is complete, cause the water softener to stop elevating the salt level of the softened water, cause the manifold to open the other manifold outputs, and cause the water heater to open the second water heater output.

In an example embodiment, a system may include a water filtration system and a communication system. The water filtration system may be coupled to a water source and may include a filter and a water filtration controller. The communication system may include a gateway device and a controller. The gateway device may be coupled to and in electronic communication with the water filtration controller. The controller may be coupled to the gateway device, and may include a processor and a memory device comprising computer-readable instructions which, when executed, cause the processor to cause the water filtration controller to perform a diagnostic check, cause the water filtration controller to determine a filter status of the filter based on results of the diagnostic check, receive the filter status from the water filtration controller, and send an alert to a user device based on the filter status.

In some embodiments, the instructions, when executed, may cause the processor to determine, based on the filter status, an amount of solids in the filter and determine that the amount of solids exceeds a predetermined threshold. The alert may indicate that the filter should be replaced immediately.

In some embodiments, the instructions, when executed, may cause the processor to determine, based on the filter status, that a mechanical failure of the filter has occurred. The alert may indicate that the filter should be replaced immediately due to mechanical failure.

In some embodiments, the instructions, when executed, may cause the processor to determine, based on the filter status, an amount of time since the filter was last replaced, retrieve regional filter analytics data from a database of a remote server, determine, based on the regional filter analytics data, an average regional filter lifespan for a region in which the water filtration system is located, calculate a lifespan threshold based on the average regional filter lifespan, determine that the amount of time since the filter was last replaced exceeds the lifespan threshold, and determine a defined date based on the average regional filter lifespan. The alert may indicate that the filter should be replaced by the defined date.

In some embodiments, the instructions, when executed, may cause the processor to determine, based on the filter status, that the filter was changed since the most recently performed diagnostic check, and determine, based on the filter status, that an amount of time between two most recent filter changes exceeds a predetermined threshold. The alert may indicate that the filter is being changed too often.

In an example embodiment, a system may include a sump pump, at least one water detection device, and a communication system. The sump pump may be configured to pump water from an area around the sump pump to a drain. The communication system may include a gateway device and a controller. The gateway device may be coupled to and in electronic communication with the sump pump and the at least one water detection device. The controller may be coupled to the gateway device, and may include a processor and a memory device configured to store instructions which, when executed, cause the processor to receive data from the at least one water detection device, determine, based on the data, that flooding has occurred in the area, cause the pump to begin pumping water from the area to the drain, and send an alert to a user device indicating that flooding has been detected in the area.

In some embodiments, the system may include a dehumidifier in proximity to the sump pump. The gateway device may be coupled to and in electronic communication with the dehumidifier. The instructions, when executed, may cause the processor to, upon determining that flooding has occurred in the area, cause the dehumidifier to begin dehumidifying the area.

In some embodiments, the at least one water detection device may include a water level sensor configured to determine a water level in the area around the sump pump. The data may include water level data generated by the water level sensor.

In some embodiments, the at least one water detection device may include a humidity sensor in proximity to the sump pump and configured to measure a humidity level. The data may include the humidity level.

In some embodiments, the at least one water detection device may include a moisture sensor in proximity to the sump pump and configured to generate a moisture alert in response to detecting moisture. The data may include the moisture alert.

In an example embodiment, a system may include a pool, a chemical controller in fluid communication with the pool, and a communication system. The communication system may include a gateway device and a controller. The gateway device may be coupled to and in electronic communication with the chemical controller. The controller may be coupled to the gateway device, and may include a processor and a memory device configured to store instructions which, when executed, cause the processor to retrieve weather data from a weather server, determine that rain is predicted to occur in a region in which the pool is located at a predicted time based on the weather data, upon determining that the rain is predicted to occur, retrieve chemical level data from the chemical controller, determine that at least one chemical level represented in the chemical level data is below a predetermined threshold, and send an alert to a user device associated with the chemical controller, the alert recommending that at least one chemical corresponding to the at least one chemical level be added to the chemical controller before the predicted time.

In some embodiments, the instructions, when executed, may cause the processor to determine, based on configuration data associated with the chemical controller, that automatic chemical supply requests have been enabled for the chemical controller, retrieve contact information for a service provider from the memory device, contact the service provider based on the contact information, and request that the service provider add the at least one chemical to the chemical controller before the predicted time.

In some embodiments, the instructions, when executed, may cause the processor to cause the chemical controller to oversaturate water of the pool with chlorine before predicted time, and send an alert to the user device indicating that the chlorine has been added to the pool.

In some embodiments, the instructions, when executed, may cause the processor to periodically retrieve additional weather data from the weather server until the additional weather data indicates that rain has occurred in the region and that rain is no longer occurring in the region, and cause the chemical controller to chemically balance the water of the pool.

In an example embodiment, a system may include a pool, a splash detector disposed in the pool that detects motion of water in the pool, and a communication system. The communication system may include a gateway device and a controller. The gateway device may be in electronic communication with the splash detector. The controller may be coupled to the gateway device, and may include a processor and a memory device configured to store instructions which, when executed, cause the processor to periodically retrieve sensor data from the splash detector, determine that the water in the pool has been undisturbed for longer than a predetermined threshold time based on the sensor data, initiate a vacation mode, periodically retrieve additional sensor data from the splash detector during the vacation mode, determine that a disturbance has occurred having a magnitude that exceeds a predetermined disturbance threshold based on the additional sensor data, and send an alert to a user device indicating that an object has entered the pool.

In some embodiments, the system may include a camera having a field of view overlapping the pool. The gateway device may be coupled to and in electronic communication with the camera. The camera may be communicatively coupled to the user device via the gateway device. The instructions, when executed, may cause the processor to, upon determining that the disturbance has occurred, cause the camera to activate and begin streaming video to the user device.

In some embodiments, the system may include a chemical controller in fluid communication with the pool. The gateway device may be coupled to and in electronic communication with the chemical controller. The instructions, when executed, may cause the processor to, upon determining that the disturbance has occurred, cause the chemical controller to chemically balance the water of the pool.

In an example embodiment, a flow meter may include a printed circuit board, a turbine, a magnetic pickup, and at least one electric generator. The printed circuit board may include a microprocessor coupled to receive power from the power input circuitry, a memory device coupled to the microprocessor, a radio frequency transmit/receive module coupled to the microprocessor, and power input circuitry that includes energy storage circuitry. The power input circuitry provides electric power to the microprocessor, the memory device, and the radio frequency transmit/receive module. The turbine may be configured to be rotated by water passing through the flow meter. The magnetic pickup may be configured to detect a rotation frequency of the turbine corresponding to a flow rate of the water passing through the flow meter, and send a signal corresponding to the flow rate to the microprocessor. The at least one electric generator may be coupled to the energy storage circuitry, and may be configured to generate electrical energy via transformation of non-electrical energy at the flow meter, and store the electrical energy at the energy storage circuitry.

In some embodiments, the at least one electric generator may include a hydroelectric generator coupled to the turbine and configured to generate the electrical energy from kinetic energy corresponding to rotation of the turbine.

In some embodiments, the flow meter may be coupled to a pipe, and the at least one electric generator may include a thermo-electric generator coupled to the pipe and configured to generate the electrical energy via transformation of thermal energy via a heat flux between a first temperature of water passing through the pipe and a second temperature of air around the pipe.

In some embodiments, the at least one electric generator may include a solar powered electric generator configured to generate the electrical energy via transformation of photon energy corresponding to light received at the solar powered electric generator.

In some embodiments, the memory device may be configured to store instructions which, when executed by the microprocessor cause the microprocessor to receive the flow rate data, and cause the radio frequency transmit/receive module to send the flow rate data to a controller via transmission of the flow rate data to a gateway device.

In some embodiments, the flow meter may be coupled to a pipe. The electrical energy may include first electrical energy, second electrical energy, and third electrical energy. The least one electric generator may include a hydroelectric generator coupled to the turbine and configured to generate the first electrical energy from kinetic energy corresponding to rotation of the turbine, a thermo-electric generator coupled to the pipe and configured to generate the second electrical energy via transformation of thermal energy via a heat flux between a first temperature of water passing through the pipe and a second temperature of air around the pipe, and a solar powered electric generator configured to generate the third electrical energy via transformation of photon energy corresponding to light received at the solar powered electric generator.

In an example embodiment, a system may include a water reclamation system configured to collect reclaimed water, a water treatment hub, non-potable water applications, a first plurality of smart valves, a second plurality of smart valves, and a communication system. The water treatment hub may include an input coupled to receive the reclaimed water from the water reclamation system, an output through which the water treatment hub is configured to supply filtered water, a first tank coupled to the input and having a first water level sensor that generates first water level data, a second tank coupled to the output and having a second water level sensor that generates second water level data, and a water filtration system coupled between the first tank and the second tank that is configured to filter the reclaimed water to produce filtered water. The non-potable water applications may be coupled to the output of the water treatment hub that receive the filtered water from the output. The first plurality of smart valves may be coupled between the reclaimed water sources and the input of the water treatment hub. The second plurality of smart valves may be coupled between the output of the water treatment hub and the non-potable water applications. The communication system may include a gateway device and a controller. The gateway device may be coupled to and in electronic communication with the first and second pluralities of smart valves, the first and second tanks, and the water filtration system. The controller may be coupled to the gateway device and may include a processor and a memory device configured to store instructions which, when executed, cause the processor to control the first plurality of smart valves to selectively route the reclaimed water to the first tank, and control the second plurality of smart valves to selectively route the filtered water to the non-potable water applications.

In some embodiments, the instructions, when executed, may cause the processor to retrieve the first water level data from the first water level sensors, determine, based on the first water level data, that a first water level of the first tank exceeds a first predetermined threshold, and cause the first plurality of smart valves to close until the first water level is less than the first predetermined threshold.

In some embodiments, the instructions, when executed, may cause the processor to retrieve the second water level data from the second water level sensors, determine, based on the second water level data, that a second water level of the second tank exceeds a second predetermined threshold, and cause the water filtration system to stop filtering the reclaimed water until the second water level is less than the second predetermined threshold.

In an example embodiment, a system may include a sump pump and a communication system. The communication system may include a gateway device and a controller. The gateway device may be coupled to and in electronic communication with the sump pump. The controller may be coupled to the gateway device, and may include a processor and a memory device configured to store instructions which, when executed, cause the processor to retrieve weather data from a weather server, determine that rain is predicted to occur in a region in which the sump pump is located at a predicted time based on the weather data, cause the sump pump to perform diagnostic check to a generate sump pump status, receive the sump pump status from sump pump, determine that service of the sump pump is needed based on the sump pump status, and send an alert to a user device associated with the sump pump, the alert indicating that maintenance of the sump pump is required.

In some embodiments, the alert may further indicate that the rain is expected to occur at the predicted time.

In some embodiments, the instructions, when executed, may cause the processor to determine, based on configuration data for the sump pump stored in the memory device, that automated maintenance requests are enabled for the sump pump, retrieve contact information for a service provider from the memory device, contact the service provider based on the contact information, and request that the service provider perform maintenance of the sump pump prior to the predicted time.

Features which are described in the context of separate aspects and/or embodiments of the invention may be used together and/or be interchangeable wherever possible. Similarly, where features are, for brevity, described in the context of a single embodiment, those features may also be provided separately or in any suitable sub-combination. Features described in connection with a system may have corresponding features definable and/or combinable with respect to a method or vice versa, and these embodiments are specifically envisaged.

DESCRIPTION OF THE DRAWINGS

The invention will be better understood and features, aspects and advantages other than those set forth above will become apparent when consideration is given to the following detailed description. Such detailed description makes reference to the following drawings.

DETAILED DESCRIPTION

Figure 1:
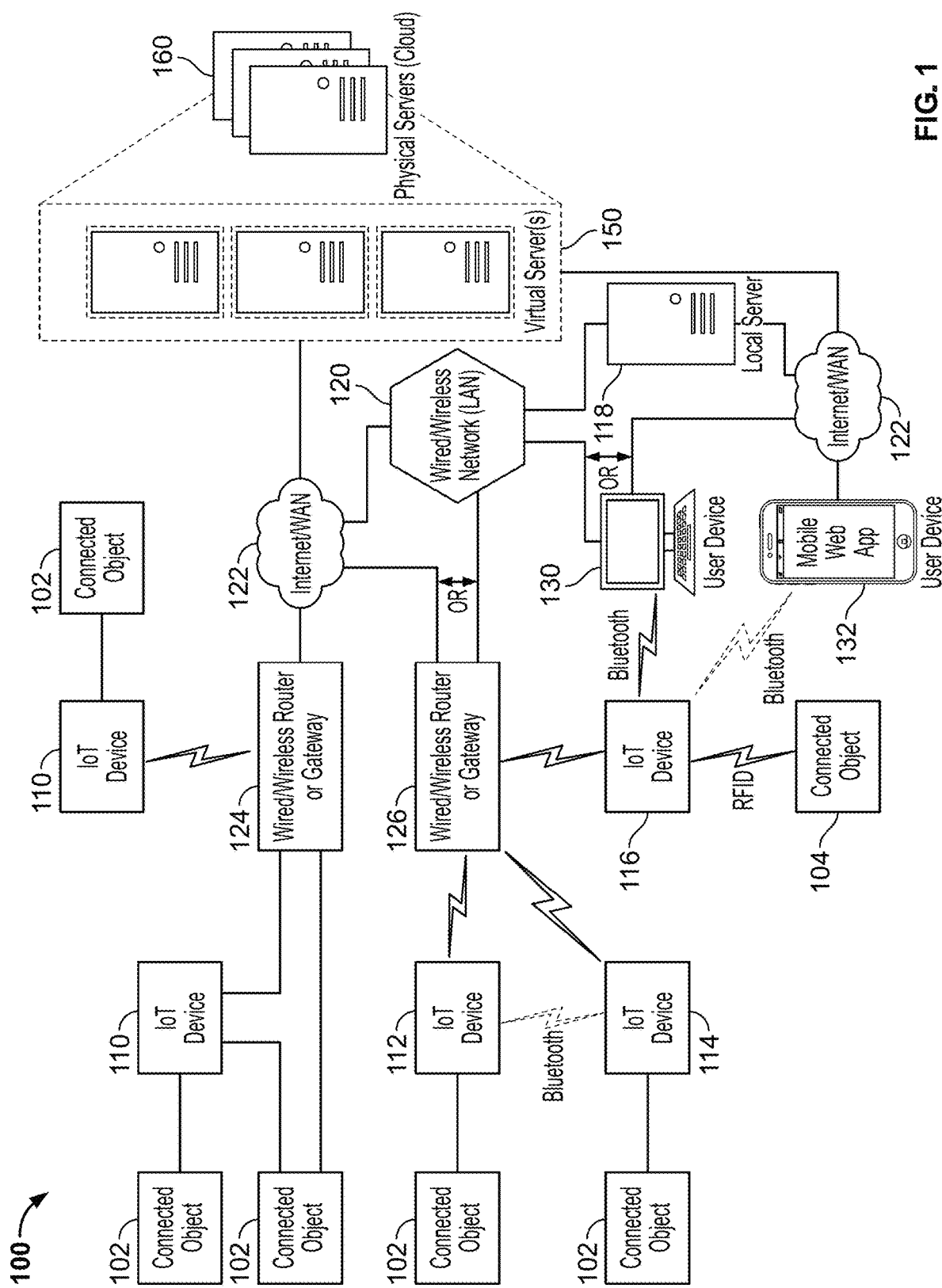
FIG. 1 is a diagram of a computing environment for deploying Internet of Things (IoT) devices in accordance with various embodiments of the invention.

Before any embodiments are described in detail, it is to be understood that the invention is not limited in its application to the details of construction and the arrangement of components set forth in the following description or illustrated in the following drawings, which is limited only by the claims that follow the present disclosure. The invention is capable of other embodiments, and of being practiced, or of being carried out, in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following description is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. Skilled artisans will recognize the examples provided herein have many useful alternatives and fall within the scope of embodiments of the invention.

Additionally, while the following discussion may describe features associated with specific devices, it is understood that additional devices and or features can be used with the described systems and methods, and that the discussed devices and features are used to provide examples of possible embodiments, without being limited.

FIG. 1 illustrates an example computing environment 100 for wired and/or wireless monitoring and control of electronic and mechanical devices that are deployed in a physical environment, such as a home or residential environment, a commercial building, a farm or other agricultural facility, industrial environments such as factories and refineries, and any other physical environment where it is feasible and beneficial to deploy so-called "smart" devices, which are natively or retroactively enabled to connect to the internet or another wide-area network (WAN) 122 to send and receive electronic data. In particular, such devices become "connected objects" 102, 104 in the computing environment 100 by interfacing with an internet enabled device, referred to herein as an "Internet-of-Things" (IoT) device, in accordance with various embodiments described herein. Other significant entities, such as a person, an animal (e.g., a farm animal), a pipe or pipeline, a body of water, or the physical environment itself, may become a connected object 102, 104 in the computing environment 100 by interfacing with an IoT device. The interface or connection between a connected object 102, 104 and an IoT device 110, 112, 114, 116 may depend on several factors, non-limiting examples of which include: whether the object is electronic, mechanical, organic, etc.; whether the object is "natively" connected, having the IoT device or another transmitter built-in, or the IoT device is added or connected to the object to make the object "connected;" whether the IoT device connects directly to the connected object, and/or connects to other objects or must be disposed in a particular location (e.g., to deploy a sensor); and, whether the IoT device sends data to the connected object, receives s data from the connected object, or both. Example interfaces/connections are described below with respect to FIGS. 1 and 2.

Each of the IoT devices 110-116 may be embedded with electronics, software, sensors, actuators, and network connectivity, either within the device itself or in cooperation with connected servers 118, 160, which enable the IoT devices 110-116 and their embedded software to collect and exchange data. In some embodiments, various IoT devices 110-116 in an environment 100 may send and/or receive data transmissions over a WAN 122, a local area network (LAN) 120, and/or another communication network using any suitable communication protocol. For example, the IoT devices 112-116 may communicate over the LAN 120 with a local server computing device 118, such as in a private network where transmitted data to/from the IoT devices is isolated from the internet or another WAN 122, at least until the data is processed by the local server 118. In some embodiments, (a) local server(s) 118 may be operated at the same location as the IoT devices 112-116, such as at a residence or in an office building. A user device 130 may also be connected to the LAN 120 in order to access the IoT data as described below; alternatively, IP connectivity may be used, connecting the LAN 120 and/or the local server(s) 118 to the Internet or another WAN 122, so that the local and/or remote user devices 130, 132 can access the local server 118.

In still other embodiments, one or more of the IoT devices 110-116 may connect, directly or through a router, gateway, base station, etc. (shown as wired/wireless router or gateway 124, 126), to the WAN 122 in order to communicate with cloud-based computing resources. Such an environment provides a bi-directional, direct-to-cloud communication between the IoT devices 110-116 and one or more application and/or hosting servers. In some embodiments, IoT devices 110-116 may communicate with and directly use the resources of one or more physical, remote server computing devices 160, which may be deployed in one or more data centers (for example) in a particular geographic location or dispersed throughout several geographic locations. In other embodiments, the remote physical servers 160 may cooperate to provide virtualized computing resources that can be allocated for use by, for example, an authorized user of a computing resource service provider. Thus, a user that controls, or provides services for, the IoT devices 110-116 may configure and deploy one or more virtual servers 150 that are allocated the use of certain physical computing resources, such as processor cycles, memory, data storage, etc., of the physical servers 160; the IoT devices 110-116 may, in turn, be configured to connect to the virtual servers 150. For example, an IoT device 110 may be programmed to connect to an IP address associated with an endpoint that connects a virtual network adapter of the servers 150 to a physical network adapter of the physical servers 160. The virtual servers 150, or the computing resource service provider's computing environment in which the virtual servers 150 are deployed, may provide other computing resource services for implementing an IoT platform as described further below.

Given this bi-directional, cloud-based environment, each IoT device 110-116 may be deployed as a direct-to-cloud IoT device. In other words, the deployment of multiple IoT devices 110-116 in a LAN-based or cloud-based environment provides for an internetworking of physical devices, connected devices, and/or smart devices at the network level. Various communication protocols between components may be used, depending on the types of devices connecting to each other and the type, amount, and frequency of data being exchanged. Non-limiting examples of connection protocols include: an IoT device 110, such as a base station or fixture, may have a wired (e.g., CAT5, USB) connection to a router 124 and may use any TCP/IP protocol for wired connections; or, an IoT device 110 may have a wireless connection to a router 124, and may use wireless TCP/IP protocols such as WiFi or MQTT; an IoT device 112 may communicate directly with another IoT device 114 using the above wireless protocols or other suitable protocols such as Bluetooth; IoT device 110-114 connections to a connected object 102 may be wired, or may be indirect based on a sensor interface; or, an IoT device 116 may connect wirelessly to the connected object 104, using a suitable protocol such as RFID for an RFID-enabled connected object 104. More generally, a communication network can include a Wi-Fi network (e.g., an 802.11x network, which can include one or more wireless routers, one or more switches, etc.), a peer-to-peer network (e.g., a Bluetooth network, a ZigBee® network, a Z-Wave® network, a proprietary RF connection, etc.), a cellular network (e.g., a 3G network, a 4G network, a 5G network, etc., complying with any suitable standard, such as CDMA, GSM, LTE, LTE Advanced, WiMAX, etc.), a wired network, an EnOcean® network, etc. In some embodiments, the communication network can be a LAN, a WAN, a public network (e.g., the Internet), a private or semi-private network (e.g., a corporate or university intranet), any other suitable type of network, or any suitable combination of networks. Communications links between the pressure switch 100, the router/modem 202, the cloud based server 204, and/or the internet enabled device 206 can each be any suitable communications link or combination of communications links, such as wired links, fiber optic links, Wi-Fi links, Bluetooth links, cellular links, etc.

A user may operate one or more client computing devices 130, such as a desktop or laptop computer, or a mobile computing device 132 such as a phone or tablet, running client software that enables the device 130, 132 to access an interface to the IoT platform provided by a server 118, 150, 160. Each of these client computing devices 130, 132 may include at least one processor executing specific computer-executable instructions (i.e., the running software) stored in a memory coupled to the client computing device. The user may access and run a client-based software such as a web browser or web application, in order to request access to the system level software and/or the GUI (e.g., by entering a Uniform Resource Locator (URL) for a web page including the GUI). This request may identify the IP address for the server(s), as well as instructions to generate and render the GUI and/or web page for the system level software. The server(s) may execute one or more software instructions to generate and render the GUI, and transmit it to the client computing device 130, 132 for display. The server(s) 118, 150, 160 may include components and data processing capabilities used to host and run software applications that allow for bi-directional communication between each IoT device 110-116 and the server(s). For example, the server(s) may host the customizable software that is deployed to, and installed on, each IoT device 110-116. The server(s) may also run the software and protocols for other services used by the IoT platform, as well as for the interface to the client computing devices 130, 132. Example uses of the user interface to the IoT platform include configuring and deploying server resources, configuring and deploying software and settings for IoT devices, obtaining and/or reviewing data collected by the server(s) from the IoT devices 110-116 (e.g., viewing current status), performing and/or reviewing data analysis, accessing particular IoT devices 110-116, etc.

Figure 2:
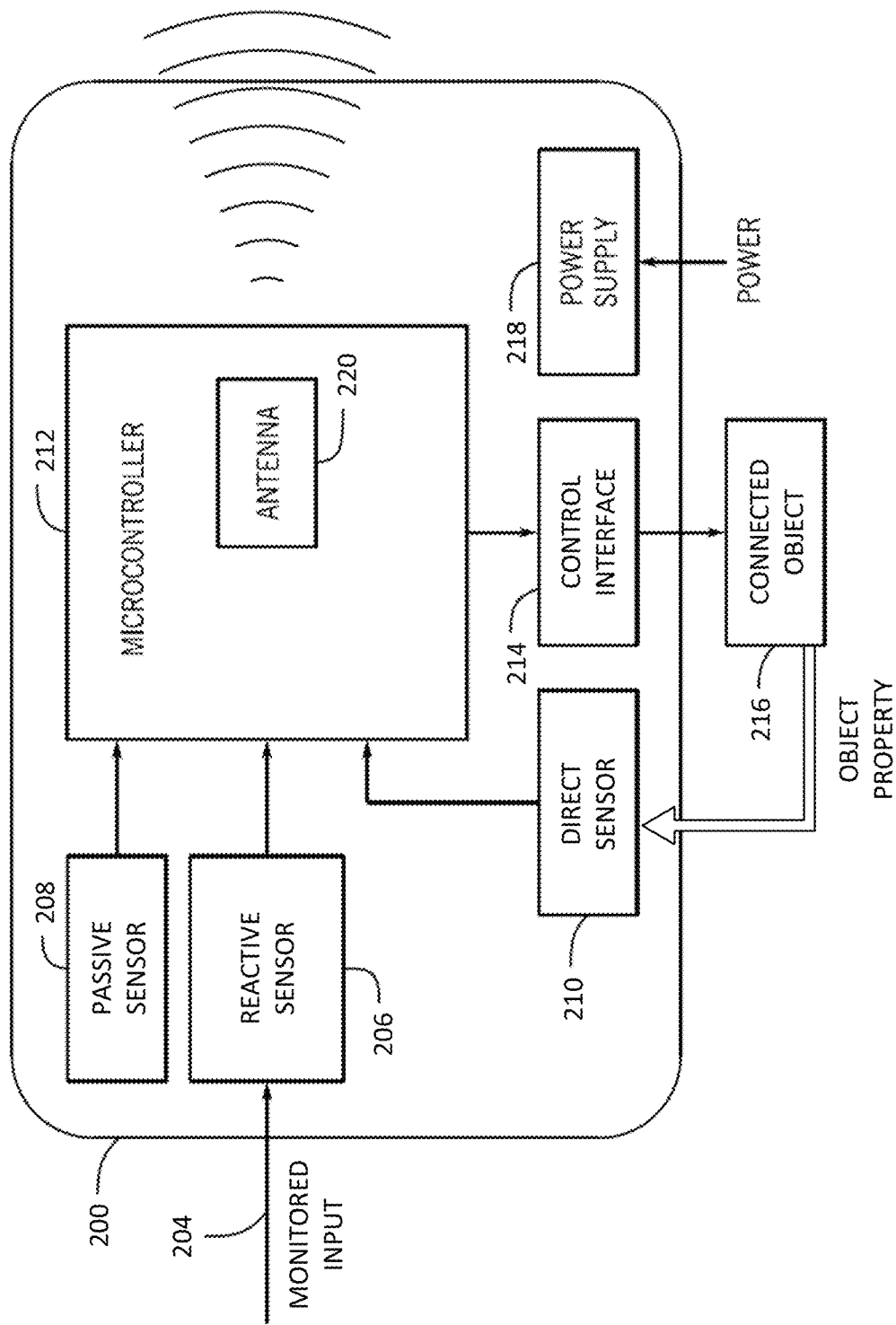
FIG. 2 is a block diagram of an example embodiment of an IoT device.

FIG. 2 shows the internal (i.e., partially or fully inside a housing) components of an example IoT device 200 in accordance with some embodiments of the invention (e.g., as an example of one or more of the IoT devices 110-116 of FIG. 1). As shown in FIG. 2, an IoT device 200 may serve to both collect data associated with a connected object 216, and control one or more operations and/or operating parameters of the connected object 216; in other embodiments, an IoT device for the connected object 216 may only collect and report data, or only control operations/configurations of the connected object 216. To collect data associated with the connected object 216, the IoT device 200 may include, connect to, or communicate with one or more of several different types of sensors. Non-limiting examples of types of sensors that may cooperate with or be incorporated in the IoT device 200 include reactive sensors 206, passive sensors 208, and direct sensors 210, among others. A reactive sensor 206 can detect and report certain monitored inputs 204 on the connected object 216 or the IoT device 200 itself; examples include a pressure transducer that detects a button press or a fluid pressure level, a moisture sensor, a flow rate sensor, a photodiode or other light receptor, and a sample analyzer that collects a sample (e.g., of water in which the sensor 206 is submerged) and measures a property of the sample (e.g., total dissolved solids; note that a sample analyzer may also be a direct sensor 210 if the connected object 216 is a body of water (as opposed to a water filter in the body of water)). A passive sensor 208 can detect environmental and other ambient properties; examples include an ambient temperature sensor, an ambient light sensor (e.g., for sunlight), a humidistat, etc. A direct sensor 210 can be connected to the connected object 216, or in communication therewith, or otherwise oriented to monitor one or more specific properties of the connected object 216; examples include a thermistor for monitoring the temperature of the connected object 216, a biometric sensor, a sample analyzer (e.g., of water at the inlet or outlet of a water filter), a current sensor, a speed sensor, etc.

Any of the sensors 206-210 may be configured to monitor a corresponding property continuously, at intervals, or randomly, and/or may "listen" for inputs and react when they are detected. Sensors 206-210 may also continuously generate data, or may only generate data at intervals, or only when the monitored property meets one or more particular thresholds; the generated data may describe the state of the property being measured. The sensors 206-210 may send the data to a microcontroller 212 of the IoT device 200. A microcontroller 212 may be any suitable microprocessor, including single- and multi-core CPUs, wireless-enabled microcontrollers, and other known microcontrollers having the processing power to receive data from the sensors and transmit the data to a receiving device such as a gateway/router or a local or cloud server. In some embodiments, the microcontroller 212 can be configured to itself act as a wireless gateway module. For example, the microcontroller 212 can be implemented using a single-chip wireless microcontroller, such as the CC3200MOD microcontroller available from Texas Instruments® (of Dallas, Texas), which can include a CC3200R1M2RGC microcontroller from Texas Instruments®. A microcontroller 212 may further have sufficient computing power to receive control commands from a router/gateway, a server, another IoT device, or a client computing device, and deliver the control commands to the connected object 216 as described below. The microcontroller 212 may further have sufficient resources to store and execute data analysis algorithms, such as processing methods that enable the microcontroller 212 to evaluate sensor 206-210 data and issue control commands to the connected object 216 based on the evaluated data. For example, the microcontroller 212 and/or the IoT device 200 can include any suitable volatile memory, non-volatile memory, storage, or any suitable combination thereof. For example, the memory can include RAM, ROM, EEPROM, one or more flash drives, one or more hard disks, one or more solid state drives, one or more optical drives, etc. In some embodiments, the memory can have encoded thereon a computer program for controlling operation of a hardware processor (e.g., microcontroller 212) in the form of computer executable instructions that, when executed by the hardware processor, cause the hardware processor to perform one or more actions as indicated by the instructions.

In some embodiments, the microcontroller 212 or the IoT device 200 can include one or more antennas 220 configured to send and/or receive wireless signals, such as signals for communicating over Wi-Fi, Bluetooth, ZigBee, Z-Wave, free-space optical, etc. In some such embodiments, the antenna(s) 220 can receive signals from the wireless gateway module, and can transmit the signals to the microcontroller 212 for processing into commands. Additionally or alternatively, the antenna 220 can send signals generated by the microcontroller 212 to the wireless gateway/router. In some embodiments, the antenna(s) 220 can be an integral part of the microcontroller 212. Alternatively, in some embodiments, the antenna 220 can be mounted to a printed circuit board (PCB) and electrically connected to the microcontroller 212, and/or can be mounted to a housing of the IoT device 200. In some embodiments, the IoT device 200 can communicate with server(s) and/or other IoT devices in the network using the antenna(s) 220. For example, the IoT device 200 can use the antenna(s) 220 to communicate using a direct connection (e.g., over a Bluetooth connection, over a direct Wi-Fi connection such as an ad hoc Wi-Fi connection or Direct Wi-Fi connection), and/or an indirect connection (e.g., over a LAN, over a mesh network, etc.).

In some embodiments, the IoT device 200 can include a control interface 214 that enables the IoT device 200 to control operations and/or to change configuration settings or other data of the connected object 216. The control interface 214 may include any suitable electrical and/or electronic components and connections needed to enable the desired control of the connected object 216. For example, a control interface 214 for a water pump can connect to the power supply circuit of the pump and, based on signals from the microcontroller 212, selectively provide power for operation of the pump. In this example, the control interface 214 or the IoT device 200 can be connected to both a source of power (e.g., a household electrical grid) and wires/cable(s) connected to the pump, and can either provide power to the pump or inhibit power from being provided to the pump. The microcontroller 212 may provide the appropriate format of signal to cause the control interface 214 to apply the desired control. For example, in an analog environment such as the pump power control, the control interface 214 may be a series of switches, and the microcontroller 212 may send one or more signals that open or close the switches as needed to apply the desired power setting. In another example, the connected object 216 may be a digital device, and the control interface 214 may be an API that converts the microcontroller 212 control signals to function calls that the control interface 214 sends to the connected object 216 to change its operating parameters.

In some embodiments, the IoT device 200 can include a power supply 218 that can provide power for operation of the microcontroller 212 and/or any other suitable low voltage devices within the IoT device 200. For example, the IoT device 200 can receive input power at 230 V and 60 Hertz (Hz), which is not suitable for operation of the microcontroller 212, which is typically a low voltage device (e.g., operating at 3.3 V DC, 5 V DC, 12 V DC, 24 V DC, etc.). In some embodiments, power supply 218 can receive AC power (e.g., at 230 V, 60 Hz), convert the AC power to low voltage DC power, and distribute power to one or more other components of the IoT device 200, such as the microcontroller 212. In other embodiments, the power supply 218 may be one or more onboard batteries (e.g., AAA batteries) contained within the housing of the IoT device 200. The power supply 218 may provide power in a variety of other ways, for example, from harvested energy, wirelessly through inductive coupling or resonant inductive coupling, or in any other known way. In some embodiments, the power supply 218 or another energy storage device such as a battery, an ultracapacitor, a fuel cell, etc., can provide supplemental power to continue to operate the IoT device 200 when an external power supply is interrupted, or a primary battery fails.

Figure 3:
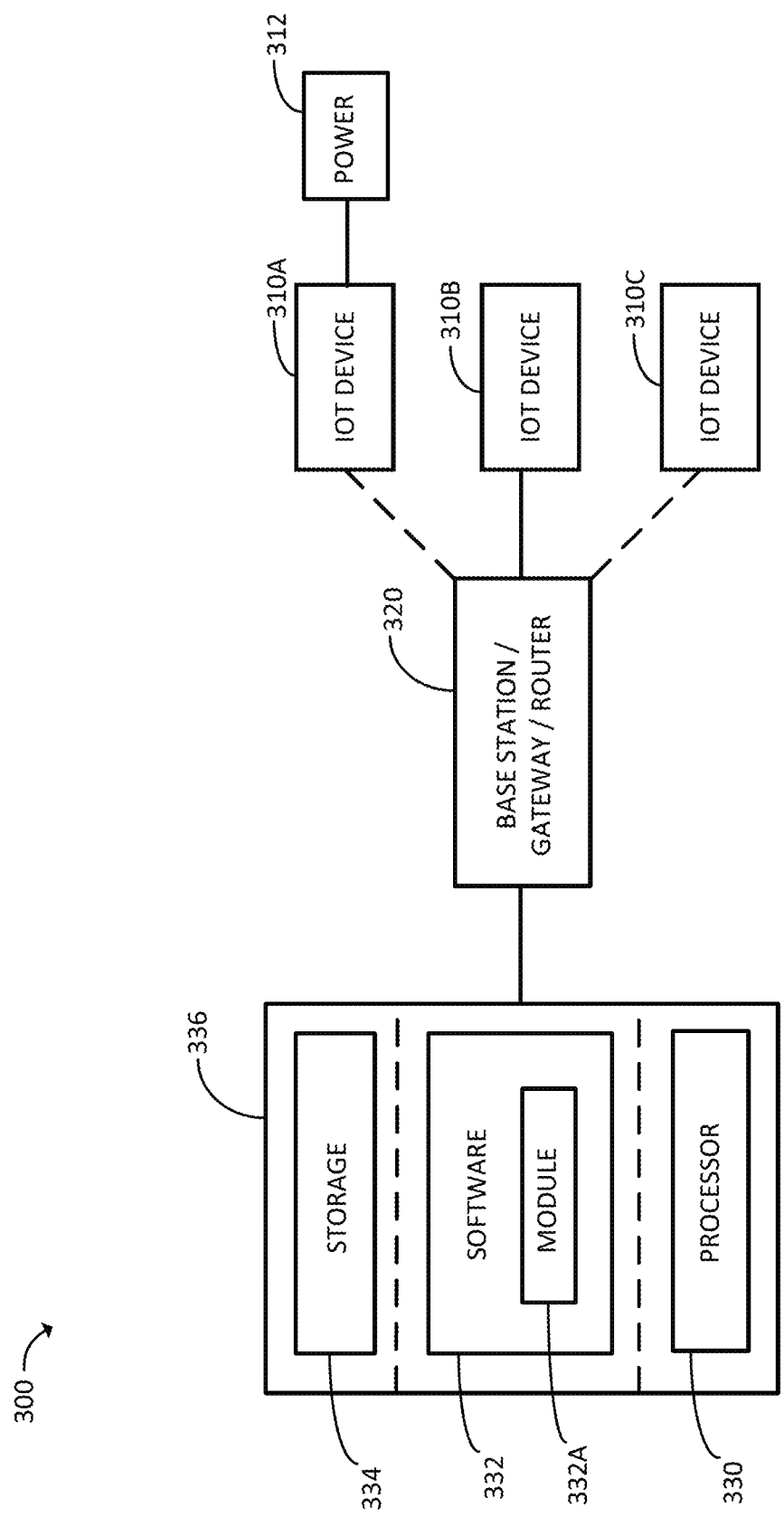
FIG. 3 is a block diagram of an example embodiment of a system in accordance with embodiments of the invention, including a server and IoT devices.

FIG. 3 is a block diagram 300 that illustrates additional details of a communication system. The block diagram 300 includes IoT devices 310A-C, a power source 312, a base station, router, or gateway 320, a server 336, a processor 330, software 332, and storage 334.

As described above, the IoT devices 310 may sense data about the environment and/or users and/or a connected object; an IoT device 310A-C can provide raw sensor data and/or processed sensor data to server 336 via gateway 320. Additionally, or alternatively, the IoT devices 310 may receive data, such as control signals generated by the server 336 or a client computing device or sensor data from other IoT devices, from the server 336 via the gateway 320. The IoT devices 310 may communicate with the gateway 320 through a wired (e.g., IoT device 310B) or wireless connection. The IoT device 310B may also receive power through its wired connection with the gateway 320; the IoT device 310A receives power from the power source 312; the IoT device 310C does not have a separate power source and may instead rely on piezoelectric technology or other technology to provide sufficient energy for transmitting information to the gateway 320. Depending on the embodiment, the IoT devices 310 may employ a range of technologies. For example, the IoT devices 310 may detect heat or pressure changes, may detect touch, or may detect changes in a variety of health indicators. Certain IoT devices 310 may rely on Bluetooth, iBeacon, or near field communication technology. In some embodiments, the IoT devices 310 may include an accelerometer. The IoT devices 310 may be present in a variety of locations within an organization's environment. The IoT devices 310 may be embedded in an article of furniture, such as a chair or table, and/or may be embedded in or coupled to a wall, partition, ceiling, of floor. The IoT devices 310 may also be associated with a user, present, for example, in a user's identification badge or mobile communication device (e.g., a smartphone, in a wrist worn device, etc.).

The gateway 320 relays information to the server 336 and may be coupled to the server 336 via a LAN or wide area network (WAN). The gateway 320 may be any device suitable to receive, aggregate, and/or relay information from the IoT devices 310A-C, including, for example, a wireless router or a Room Wizard™. The gateway 320 may include existing technology affiliated with other services of an organization or may be provided to an organization specifically for use with the IoT devices 310. For example, the gateway 320 may be provided in the form of a base station comprising computing resources, such as a processor, memory, and specific program instructions (e.g., software or firmware) that the processor executes to communicate with and/or monitor deployed IoT devices 310. In some embodiments, more than one gateway 320 may be used to optimize performance. For example, the number and/or positioning of gateways may depend on the number and/or positioning of IoT devices 310.

As information from one or more IoT devices 310 reaches the server 336, software 332 may determine how the information is processed. In this embodiment, a software module 332A can configure a commands processor 330 to perform a variety of tasks, such as processing collected data from the IoT devices 310 and/or sending control signals to the IoT devices 310 for controlling the corresponding connected object(s). For example, processor 330 may analyze incoming data related to a user's location, orientation, or interaction with a client computing device. The processor 330 may make determinations or conclusions about a user or group of users, or an object or group of objects, or other environmental or input conditions, based on incoming data. The processor 330 may also relay information or send conclusions to a user or group of users. Incoming data from IoT devices 310, other incoming data or inputs, conclusions, and other data may be stored in storage 334.

In various embodiments, the server 336 may be a virtual server or may represent a cluster of servers. Some or all portions of the block diagram may be located physically on site at an organization's location and some or all may be stored remotely in the cloud. For example, in one embodiment, server 336 may physically include the processor 330 while the software 332, the software module 332A, and the storage 334 are located in a remote or cloud server. In another embodiment, only the software 332 or the storage 334 may be located in a remote or cloud server. The software module 332A may additionally communicate with a variety of other servers, processors, hardware, and software located in the server 336 or in other servers or other locations. For example, the software module 332A may communicate with a second server to ensure that a user's calendar or reservation information is up-to-date.

Figure 4:
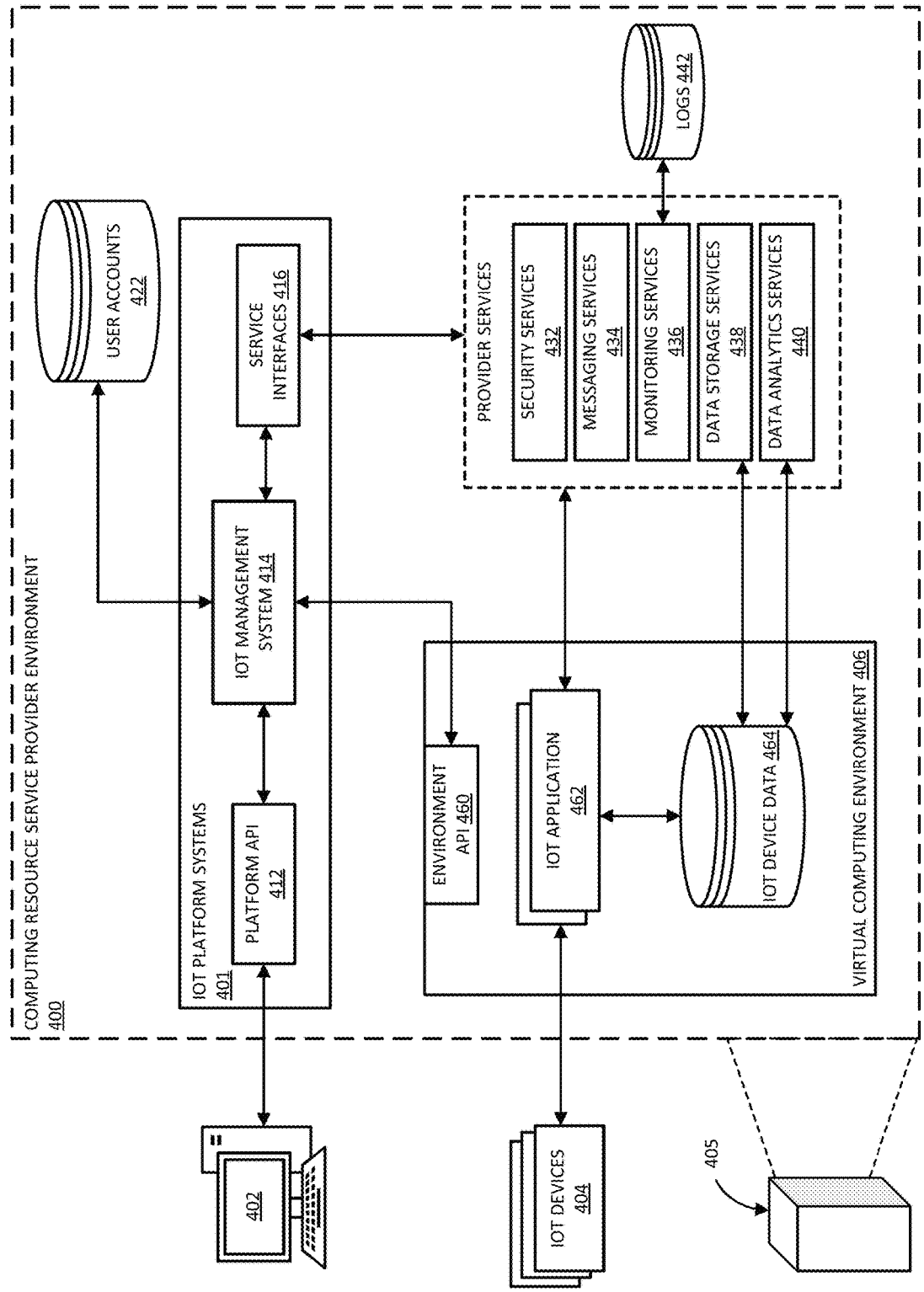
FIG. 4 is a block diagram of an example embodiment of another computing environment in accordance with some embodiments of the invention.

Referring to FIG. 4, embodiments of the invention may operate within or upon computing systems (e.g., the hardware computing device 405) of a computing resource service provider that provide a computing environment 400 accessible, via one or more computer networks, by users of user computing devices 402 and by one or more IoT devices 404 configured and deployed as described above. The computing environment 400 may, for example, be provided by the virtual servers 150 and/or the physical servers 160 of FIG. 1 (i.e., computing device 405 may be one of the physical servers 160 of FIG. 1). That is, where FIG. 1 illustrates the conceptual operation of the present systems and methods in interaction, via the computing devices 130, 132, with a "client," or administrator of the IoT devices 110-116 deployed in a computing environment 100, FIG. 4 illustrates a computing architecture in which a client may access the computing systems of the computing resource service provider environment 400 (e.g., using the client's user account credentials) using a computing device 402 to connect to one or more user interfaces provided (e.g., as websites, web applications, command consoles, APIs, etc.) in the environment 400. The user interfaces may enable the client to manage virtual computing resources allocated to the client's account and configured to implement an IoT platform for the client's IoT devices 404.

The computing resource service provider environment 400 may include one or more systems 401 that cooperate to enable deployment of the IoT platform using a customized configuration for a particular user. The systems 401 may include a platform API 412 to which the client, via user device 102, connects in order to configure, deploy, manage, and otherwise interact with the client's IoT platform. In some embodiments, the platform API 412 provides secure access to an IoT management system 414 that includes or accesses services and data needed to interact with an IoT platform, an IoT application 462, and/or IoT devices 404 that are deployed within or connect to the client's virtual computing environment 406, described below. In some embodiments, the IoT management system 414 may access one or more user account data stores 422 that contain user account information and other private information associated with the client's user account. For example, the IoT management system 414 may store and retrieve configuration settings for particular IoT devices 404 and/or IoT applications 462 that the client has previously submitted.

The computing resource service provider implements, within its computing environment 400, at least one virtual computing environment 406 in which users may obtain virtual computing resources that enable the users to run programs, store, retrieve, and process data, access services of the computing resource service provider environment 400, etc. The virtual computing environment 406 may be one of any suitable type and/or configuration of a compute resource virtualization platform implemented on one or more physical computing devices. Non-limiting examples of virtual computing environments 406 include data centers, clusters of data centers organized into zones or regions, a public or private cloud environment, etc. The virtual computing environment 406 may be associated with and controlled and managed by the client. In some embodiments, the virtual computing environment 406 of a particular client may be dedicated to the client, and access thereto by any other user or service of the computing resource service provider environment 400 prohibited except in accordance with access permissions granted by the client. In some embodiments, an environment API 460 may serve as a front-end interface that provides access to the resources of the virtual computing environment 406 based on whether or not requests to access the environment 406 are authorized. For example, the IoT management system 414 may deploy IoT platform-related resources, push configuration changes, and request information about such resources via calls to the environment API 460. Additionally, or alternatively, other channels, such as TLS-encrypted data channels, may be enabled to allow data to enter or exit the environment 406 without passing through the environment API 460. For example, an IoT application 462 in the environment 406 may be configured to communicate directly with IoT devices 404 and/or certain services in the computing resource service provider environment 400.

In some embodiments, a client's IoT platform may be deployed by installing one or more IoT applications 462 into the client's virtual computing environment 406. An IoT application 462 may be a software program or suite of software programs including program instructions that enable a processor executing the IoT application 462 to communicate with deployed IoT devices 404, sending and/or receiving data, processing data, and making decisions in accordance with the desired goals and functions of the IoT platform. For example, the IoT application 462 may cause the processor to receive sensor data from the IoT devices 404, process the data to determine whether to take any actions, and then perform any identified action such as reporting the status of connected objects to the client, sending new commands to one or more of the IoT devices 404, storing data (e.g., in an IoT device data store 464), etc. The IoT application may be executed within virtual computing resources allocated to the client's virtual computing environment 406, such as one or more virtual machine instances or logical container instances configured to provide virtualized physical computing resources for the purpose of performing the IoT application's functions. For example, a virtual machine instance may be launched from a software image including the configuration information (e.g., operating system, memory, disk storage, network interface configuration, and software program code) needed to provide an execution environment for the IoT application 462.

The computing resource service provider environment 400 may include data processing architecture that implements systems and services that operate "outside" of any particular user's virtual computing environment and perform various functions, such as managing communications to the virtual computing environments, providing electronic data storage, and performing security assessments and other data analysis functions. These systems and services may communicate with each other, with devices and services outside of the computing resource service provider environment 400, and/or with the virtual computing environments. Services depicted in the figures as inside a particular virtual computing environment 406 or outside all virtual computing environments may be suitably modified to operate in the data processing architecture in a different fashion than what is depicted. The IoT management system 414 may include or communicate with one or more service interfaces 416, such as APIs, that enable the IoT management system 414 and/or other components of a deployed IoT platform (e.g., an IoT application 462) to interact with one or more of these systems and services. Non-limiting examples of provider services that may be invoked or accessed to work in conjunction with the IoT platform include: security services 432 that maintain and apply security policies, access controls, and the like, encrypt and decrypt information, create secure transmission (e.g., TLS) channels, etc.; messaging services 434 that transmit triggering events and other notifications between subscribing users and services, and or/provide queueing services for prioritizing synchronous and asynchronous operations (e.g., API calls); monitoring services 436 that monitor network activity and computing resource usage and generate logs 442 of activity; data storage services 438 that maintain distributed storage devices, databases, etc., and that may maintain and/or obtain data stored in an IoT device data store 464; and, data analytics services 440 that may collect data (e.g., aggregated sensor data) and perform analytics on the data, such as machine learning, trend analysis, general monitoring/alerting, etc.

Figure 5:
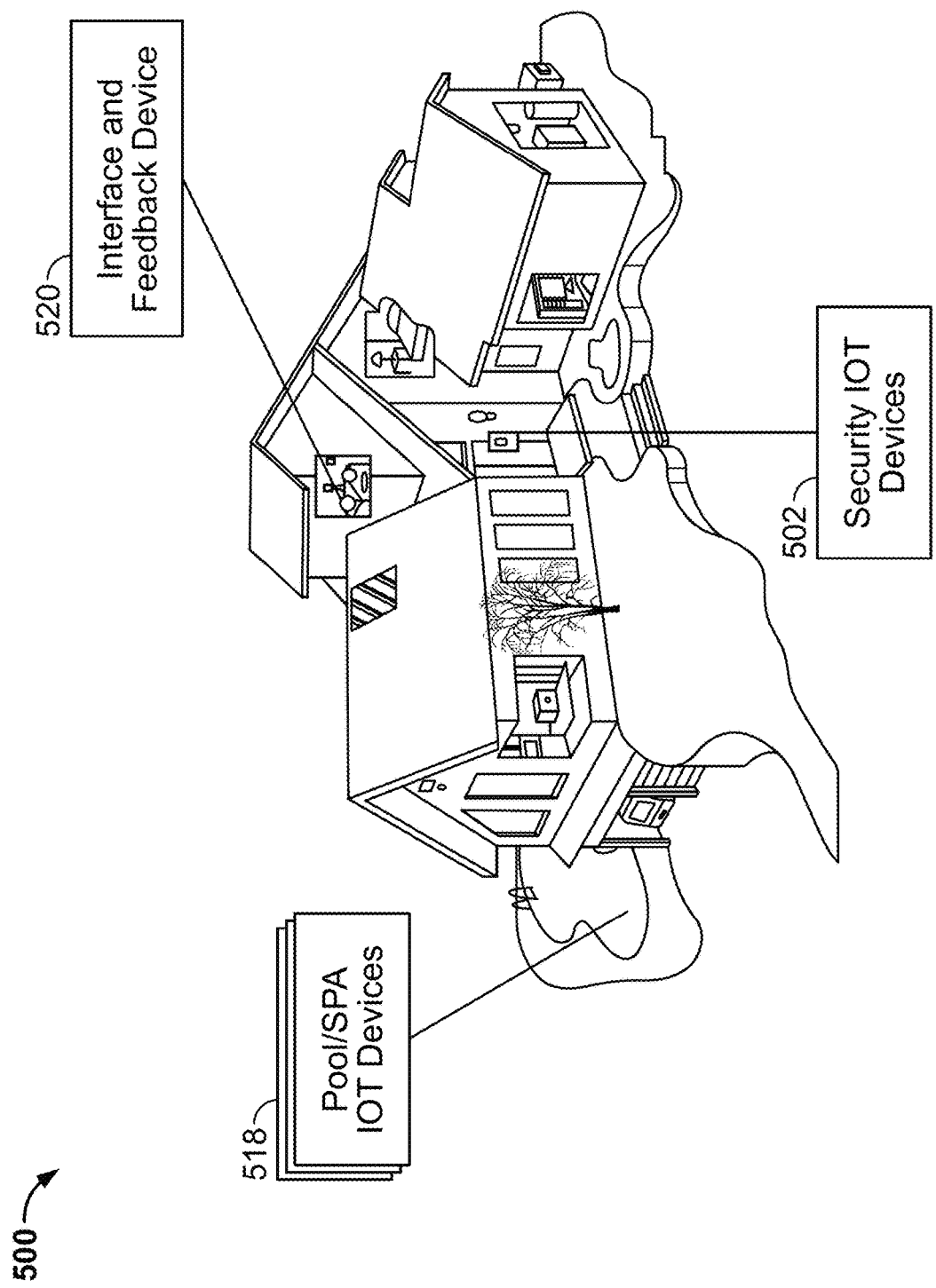
FIG. 5 is a diagram of an example deployment including embodiments of the invention, illustrating a connected residence.

FIG. 5 is a diagram 500 of an example IoT device deployment at a residence in order to create a set of connected objects around the home. The illustrated example IoT devices for connecting to certain objects are not limiting, but are demonstrative of a "smart home" concept where the status can be monitored, and/or operations controlled, for residential devices and systems that historically could only be monitored and controlled manually. Additionally, using the IoT platform described above, together with user interactions and feedback, data from different types of objects and IoT devices may be collected, aggregated, and analyzed to identify previously unknown optimizations, synergies, impacts, and cooperative functionalities between objects in the home. In the illustrated example, the IoT devices may be natively included as a component of the corresponding connected object, or may be retroactively connected (e.g., via sensors and control interfaces as described above) to an unconnected object to connect that object to the IoT platform.

Non-limiting example IoT devices in the diagram 500 include: security IoT devices 502 that monitor home activity, such as smart doorbells, indoor and outdoor video cameras, security/alarm systems, etc.; fixture IoT devices 504 for connecting to "analog" home fixtures, such as faucets and other plumbing; appliance IoT devices 506 for connecting to in-home appliances such as televisions, washers and dryers, refrigerators, dishwashers, garbage disposals, coffee makers, etc.; HVAC IoT devices 508 for connecting to air conditioning units, heating units, vents, etc.; water supply IoT devices 510 for connecting to water heaters, water softeners, water filtration systems, water and sewer pipes, sump pumps and other water pumps, etc.; interior environmental sensor devices 512 such as motion detectors, light detectors, sound detectors, smoke detectors, carbon monoxide detectors, thermostats, etc.; exterior sensor devices 514 such as light and motion detectors, rain sensors, wind sensors, etc.; irrigation IoT devices 516 for connecting to watering system control panels, valves, water lines, areas of earth/soil, etc.; and, pool and spa IoT devices 518 for connecting to pool controls, pool pumps, pool lights, the pool/spa itself, etc. Some or all of the IoT devices 502-518 may collect and send data to a gateway, router, or base station in the home, or directly to a cloud-based server; configuration and control commands may be transmitted in the opposite direction.

The deployment may further include one or more IoT platform interface/feedback devices 520, such as a resident's desktop PC or smartphone having software or a browser interface executing thereon to access the IoT platform and monitor, configure, control, add, remove, change, and perform other management operations on the IoT devices 502-518 and/or interact with collected and analyzed data. The IoT platform may further include a vehicle IoT system 530 installed in the resident's vehicle. In some embodiments, the installation may include a user interface similar to that of the feedback device 520, installed on a computer of the vehicle and presented, e.g., on a navigation screen or another display device. Additionally, or alternatively, the vehicle IoT system 530 may include one or more IoT devices that monitor and/or control various properties of the vehicle, such as motor speed and temperature, fuel/battery level, interior temperature, ignition, etc.

Figure 6:
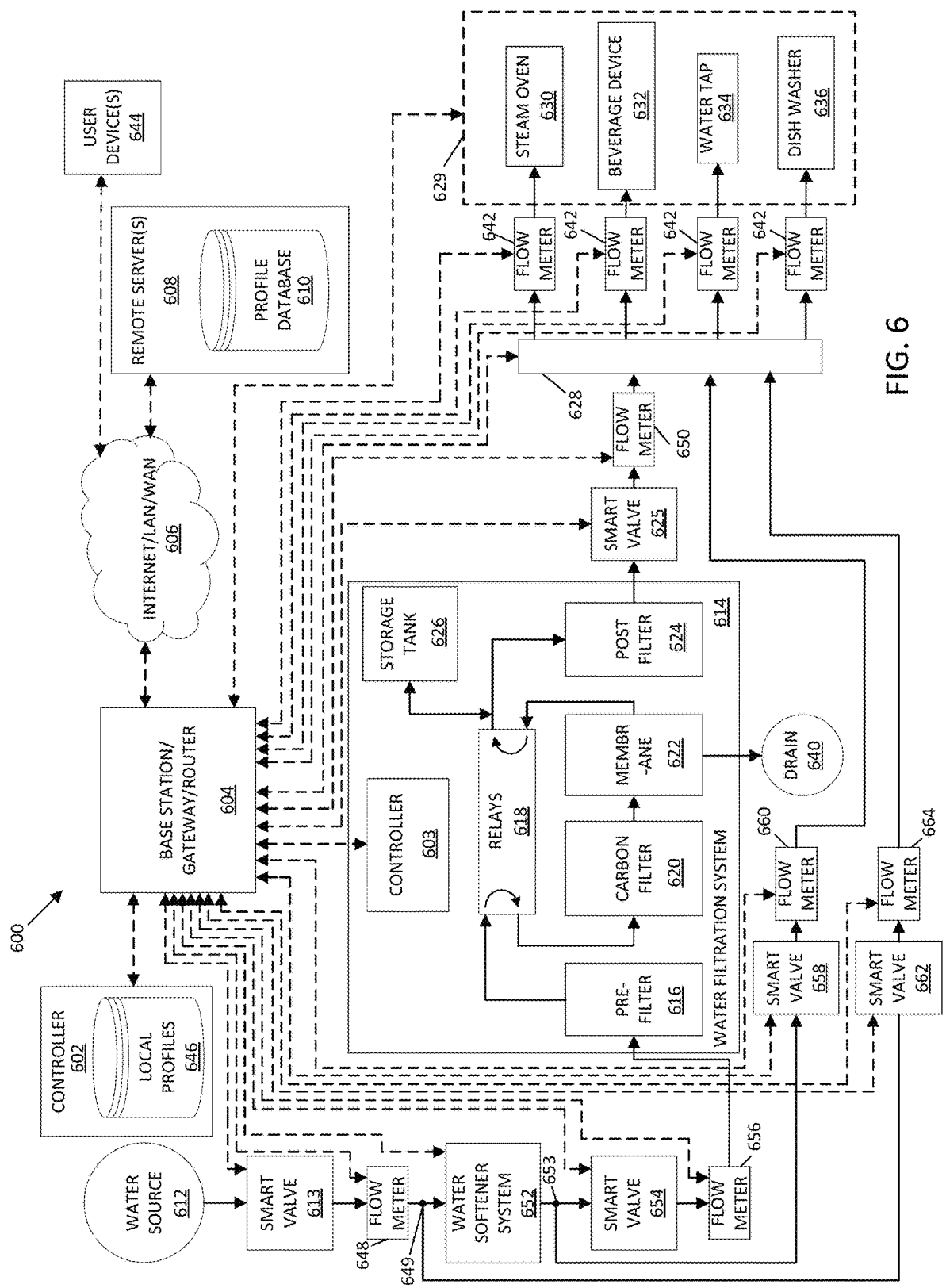
FIG. 6 is a block diagram of an example embodiment of a communication system and a water system having a water softener system and a water filtration system.

FIG. 6 shows an illustrative system 600 that enables the filtration of water in a water system through a water filtration system 614, the monitoring and control of the water filtration system 614, and the monitoring and control of network-enabled flow meters and smart valves coupled to inputs and outputs of the water filtration system 614. The system 600 may include one or more network-enabled devices (e.g., which may each include or correspond to an IoT device such as the IoT device 200 of FIG. 2) including a controller 602, smart valves 613, 625, 654, 658, and 662, the water filtration system 614, a manifold 628, a water softener system 652, flow meters 642, 648, 650, 656, 660, and 664, one or more remote servers 608, and one or more user devices 644.

The system 600 may further include a communication network that includes a gateway 604 (e.g., gateway 320 of FIG. 3), which may be alternatively referred to as a base station or a router, and a network 606, which may be a LAN, WAN, or the internet. The gateway 604 may route data (e.g., including commands, messages, sensor data, profile data, alerts, or other applicable information) locally between the network-enabled devices of the system 600 that in direct communication with the gateway 604, and globally between local devices and remote devices via the network 606. One or more user devices 644 and one or more remote servers 608 may be communicatively coupled to the gateway 604 via the network 606. The user devices 644 may include personal computers, tablets, smart phones, etc. In some embodiments, at least a portion of water appliances 629 that receive filtered water from the water filtration system 614 (e.g., through the flow meters 642 and 650 and the manifold 628) may be network-enabled devices that are communicatively coupled to the gateway 604.

A smart valve 613 and a flow meter 648 may be coupled between a node 649 and the output of a water source 612, which may be, for example, the main water line into a building such as a residence or business, an output of a water softener, or an output of a hot water heater. For example, the smart valve 613 can be, or can connect to, a municipal water meter with an integrated controller. The smart valve may selectively enable and disable the flow of water into the system 600. The flow meter 648 may measure the flow rate of water passing through it and may generate corresponding flow rate data. The flow meter 648 may be communicatively coupled to the gateway 604 and may thereby transmit flow rate data to the controller 602 or remote servers 608. The smart valve 613 may be communicatively coupled to the gateway 604 and may receive commands from the controller 602, which set the state (e.g., open or closed) of the smart valve 613. The node 649 may split the flow of water output from the flow meter 648 (e.g., with a pipe fitting that splits the flow of water) between an input of the water softener system 652 and an input of a manifold 628. A smart valve 662 and a flow meter 664 may be coupled between the node 649 and an input of the manifold 628 and may operate similarly to the smart valve 613 and the flow meter 648, respectively.

The water softener system 652 may be coupled to receive water from one of the two outputs of the node 649. The water softener system 652 may, for example, be an ion exchange system (e.g., a sodium ion exchange system) that reduces the mineral content (e.g., the calcium and magnesium content) of water passing through it to produce "softened" water. In some embodiments, the water softener system 652 may include an internal flow meter and smart valve at its input and/or output, so that the flow of water through the water softener system 652 may be measured and controlled, and one or more measures of efficiency of the water softener system 652 may be determined by comparing the input flow rate of the water softener system 652 to the output flow rate of the water softener system 652 or by comparing the total amount of water input to the water softener system to the total amount of water output by the water softener system. However, in some embodiments, the flow rate at the input of the water softener may be calculated (e.g., by a processor of the controller 602) as a difference between the flow rate measured by the flow meter 648 and the flow rate measured by the flow meter 664. Somewhat similarly, the flow rate at the output of the water softener may be calculated as a sum of the flow rate measured by the flow meter 656 and the flow rate measured by the flow meter 660. The output of the water softener system 652 may be coupled to a node 653, which may split the flow of softened water output by the water softener system 652 between an input of the water filtration system 614 and an input of the manifold 628. A smart valve 654 and a flow meter 656 may be coupled between the node 653 and the input of the water filtration system 614 and may operate similarly to the smart valve 613 and the flow meter 648, respectively. A smart valve 658 and a flow meter 660 may be coupled between the node 653 and an input of the manifold 628 and may operate similarly to the smart valve 613 and the flow meter 648, respectively.

In some embodiments, the water filtration system 614 may include a controller 603, a pre-filter 616, controllable relays 618 (i.e., pipes between different components, having controllable valves as described herein), a carbon filter 620, a membrane 622, a post filter 624, and a storage tank 626. Other embodiments of a water filtration system 614 may include additional or substitute components; for example, controllable relays 618 may instead be fluid connectors, or a fluid manifold system, or a piston and valve system. An input of the water filtration system 614 (e.g., an input of the pre-filter 616) may receive water from an output of the flow meter 656. While shown here to be external to the water filtration system 614, in alternate embodiments the smart valve 654 and/or the flow meter 656 may be internal components of the water filtration system 614 and may be controlled by the controller 603. The pre-filter 616 may be a sediment pre-filter, for example. An output of the pre-filter 616 may be coupled to and in fluid communication with an input of the relays 618. In other embodiments, the pre-filter may be omitted and the output of the water source 612 may be coupled directly to the input of the relays 618. An output of the relays 618 may be coupled to and in fluid communication with an input of the carbon filter 620, such that water received by the relays 618 from the pre-filter 616 may be controllably passed to the input of the carbon filter 620. An output of the carbon filter 620 may be coupled to and in fluid communication with an input of the membrane 622, which may be a semi-permeable membrane. In some embodiments, a pump (not shown) may apply pressure to water being fed into the input of the membrane 622. In some embodiments, pre-filter 616 and/or post-filter 624 may be optionally omitted in order to increase the driving pressure across the membrane 622.

Some or all of the pre-filter 616, the carbon filter 620, the membrane 622, and the post-filter 624 may include on-board diagnostic systems and/or may be coupled to a diagnostic system of the water filtration system 614. For example, the controller 603 may include (or a processor thereof may implement) a diagnostic module, which may function as such a diagnostic system. The diagnostic system may periodically perform diagnostic checks to determine the status (sometimes referred to herein as the "filter status") of these components of the water filtration system 614. The determined status may include filter information such as the last time a given filter was changed, whether the given filter has been changed since the last time a diagnostic check was performed, whether a mechanical failure has occurred in the given filter, such as plugging (e.g., indicating that the filter has reached the end of its useful life), black water (e.g., where activated carbon from the filter cartridge enters the water stream), or leaks (e.g., which may be identified as water pressure drops across the filtration system 614). The controller 603 may be an IoT device (e.g., IoT device 200 of FIG. 2) communicatively coupled to the gateway 604, and may control the operation of the relays 618, thereby controlling the flow of fluids through the relays 618.

A portion of the input water, referred to herein as permeate, may pass through the membrane 622, leaving behind most (e.g., 95%-99%) of the dissolved solids originally contained within the input water (e.g., salt or other minerals) referred to herein as "concentrate". The concentrate may be routed to a drain line 640 via a concentrate outlet of the membrane 622. The permeate may be passed to an input of the relays 618 via a permeate outlet of the membrane 622 coupled thereto. The permeate may then be controllably passed from an output of the relays 618 to an input of the post filter 624 for subsequent use in various water appliances 629, or may be routed to the storage tank 626 to be stored for future use. In this way a supply of filtered water (e.g., the permeate) may be collected for on-demand use.

The storage tank 626 may include a water level sensor that detects when the storage tank 626 is full. In response, the water level sensor may send data to the controller 603 indicating that the storage tank 626 is full. The controller 603 may then control the relays 618 to stop the flow of water through the water filtration system 614 until the water level sensor detects that the storage tank 626 is no longer full. Alternatively, the controller 603 may send data to the controller 602 indicating that the storage tank 626 is full and, in response, the controller 602 may close the smart valve 613 in order to block the flow of water into the water filtration system 614.

The post filter 624 may be a sediment post filter, for example. An output of the post filter 624 may be coupled to a manifold 628. A smart valve 625 may be coupled between the water filtration system 614 and the manifold 628 so that the flow of water into the manifold 628 from the water filtration system 614 may be selectively enabled and disabled. In some embodiments, a flow meter 650 may be coupled between the smart valve 625 and the manifold 628 and may measure the flow rate of water passing between the two components. The flow meter 650 may be communicatively coupled to the gateway 604 and may thereby transmit flow rate data to the controller 602 or remote servers 608. The smart valve 625 may be communicatively coupled to the gateway 604 and may receive commands from the controller 602, which set the state (e.g., open or closed) of the smart valve 625. These commands may be automatically generated or may be generated in response to user input provided to the controller 602 from the user devices 644 via the network 606 and the gateway 604. While shown here to be external to the water filtration system 614, in alternate embodiments the smart valve 625 may be an internal component of the water filtration system 614 and may be controlled by the controller 603.

In some embodiments, as shown in FIG. 6, the water filtration system 614 uses a combination of reverse osmosis (RO) water filtration and activated carbon water filtration. However, it should be understood that other types of water filtration may be used in combination with or instead of these filtration methods. In such alternate embodiments, the water filtration system 614 may perform ionization, ultraviolet filtration, or infrared filtration.

The manifold 628 may be a network-enabled smart manifold, having controllable valves at each of its inputs and outputs so that the flow of water through the manifold 628 may be selectively controlled. For example, any selected output of the manifold 628 may be supplied with a selected water type-unsoftened and unfiltered output from the flow meter 664, softened and unfiltered output from the flow meter 660, or softened and filtered output from the flow meter 650. A network-enabled controller (e.g., IoT device 200 of FIG. 2) may be included in or coupled to the manifold 628, enabling remote and automatic control of the manifold 628 via a wired or wireless connection to the base station/gateway/router 604. The outputs of the manifold 628 may be coupled to the water appliances 629. The water appliances 629 may, for example, include a steam oven 630, a beverage device 632, a water tap 634, a dishwasher 636 and/or other applicable appliances, such as a washing machine. Network-enabled flow meters 642 may be interposed between the manifold 628 and the water appliances 629. Each of the flow meters 642 may include or may be coupled to a network-enabled controller (e.g., IoT device 200 of FIG. 2) by which the flow meters 642 may be communicatively coupled to the gateway 604. The flow meters 642 may monitor the flow rates of water passing between each of the outputs of the manifold 628 and the water appliances 629, and may communicate corresponding flow rate data to the controller 602 through the gateway 604. Each sampling of flow rate data from the flow meters 642, 648, 650, 656, 660, and 664 may be referred to herein as a "data capture" or "flow rate data capture". From this flow rate data, the controller 602 may identify potential leaks or misuse of filtered water, and may assess the total water consumption and/or the consumption of softened or filtered water as compared to other equivalent homes or businesses in the same area, as will be explained below.

The controller 602 may be implemented as a network-enabled device in the home, or may be implemented as part of a cloud-based architecture. For example, in a cloud-based implementation of the controller 602, the functions of the controller 602 may be performed by a dedicated module running on the remote servers 608, which may eliminate the need for a physical controller to be installed in the home or business of the user. In one embodiment, the controller 602 may be a central control hub, which may include a processor, volatile and non-volatile memory, a user interface, and network interface circuitry. The controller 602 or the remote servers 608 may communicate with the controller 603 to control the relays 618 of the water filtration system 614 automatically or in response to manual user commands (e.g., provided at the user interface of the controller 602 or by one of the user devices 644). For example, the controller 603 may cause the relays 618 to close (blocking the flow of water through the relays 618) during initial setup of the filtration system 614 or during cartridge replacement cycles (e.g., whenever cartridges need to be flushed prior to use). Closing the relays 618 in this way may prevent debris/contaminants from being flushed downstream into other components of the filtration system 614. As another example, the relays 618 may be closed during sanitization of individual filtration components.

The controller 602 may monitor and control other network-enabled devices in the system 600 via electronic communication through the gateway 604. For example, the controller 602 may receive the flow rate data generated by the flow meters 642, 648, 650, 656, 660, and 664. The controller 602 may generate water usage profiles (sometimes referred to herein as a "generated water usage profile") corresponding to each of the flow meters 642 based on the received flow rate data. For example, each generated water usage profile may include the raw flow rate data received from the flow meter or flow meters corresponding to that water usage profile, metadata related to various characteristics of the system 600, and water usage statistics derived from the raw flow rate data. For example the metadata may include the type of building (e.g., industrial, commercial, or residential) housing the system 600, information about the location (e.g., city, county, zip code, state country) of the system 600, and time-related information for each data point of the flow rate data (e.g., the specific time, day, month, year, season, etc. at which the data point was captured). The water usage statistics may include, for example, the total volume of water used in the system 600 over a period, the volume of water used by each of the applications 629 over a period, the total volume of filtered water used in the system 600 over a period, the total volume of softened water used in the system 600 over a period, the total volume of filtered water used in the system 600 over a period, the total volume of unsoftened and unfiltered water used in the system 600 over a period, the ratio of total softened water used to total water used over a period, the ratio of total filtered water used to total water used over a period, and moving averages of total, softened, and filtered water usage and flow rates for the system 600. The raw flow rate data and water usage statistics may be compiled into respective datasets and/or graphs (e.g., over a rolling window, such as a 24-hour rolling window, weekly, monthly, quarterly, and/or yearly periods), which may be transmitted to and displayed as part of user interfaces of the user devices 644.

In some embodiments, the generated water usage profiles may include an aggregate water usage profile derived from flow rate data collected from all of the flow meters 642 or from subsets thereof. The generated water usage profiles may be stored in a local profile database 646 in a memory device of the controller 602 and/or in one or more remote profile databases, such as the profile database 610 of the remote servers 608. In some embodiments, generating a water usage profile for a given flow meter or group of flow meters may include updating an existing water usage profile stored in the database 646 to incorporate newly received flow rate data from the corresponding flow meter or meters. The controller 602 may access, through the gateway 604 and the network 606, a water usage profile database 610 stored in one or more memory devices of the remote servers 608 in order to retrieve the water usage profiles collected or aggregated from the flow meters corresponding to other water systems, or to previously collected and stored water usage profiles of the system 600.

For example, the water usage profile database 610 may include a collection of water usage profiles (sometimes referred to herein as "collected water usage profiles") corresponding to flow meter data collected from flow meters coupled to outputs of various residential and/or commercial water filtration systems. These collected water usage profiles may include previously-generated water usage profiles of the system 600. In some embodiments, one or more aggregate water usage profiles may be generated (e.g., by the controller 602 or by one or more processors of the remote servers 608) and stored in the profile database 610. For example, a given set of water usage profiles from which an aggregate water usage profile is derived may be selectively limited to include only the subset of the collected water usage profiles stored in the profile database 610 where each water usage profile of the subset are derived from water filtration systems corresponding to a selected region, time of year (e.g., spring, summer, winter, or fall), time of day (e.g., morning, afternoon, night, or specific time ranges), property type (e.g., commercial, residential, or industrial), industry, and/or other metadata defining the water usage profiles. In one illustrative example, the system 600 may be a residential system operating in the mid-western region of the U.S. during summer. Thus, in this example, the controller 602 or the servers 608 may compare the water usage profile generated by the system 600 to an aggregate of all collected water usage profiles corresponding (e.g., according to metadata) only to residential water systems operating in the mid-western region of the U.S. during summer. This aggregate water usage profile may already be stored in the profile database 610, or may be generated automatically by the servers 608 or the controller 602 during the assessment of a generated water usage profile of the system 600.

Organizing or filtering the collected water usage profiles into groups according to metadata allows the controller 602 to identify and retrieve only those collected water usage profiles most relevant to the water filtration system 614 and the system 600, which may provide a more accurate basis for comparison. Specifically, aggregating relevant collected water usage profiles into a single aggregate water usage profile for comparison with the generated water usage profile may reduce the impact of outlier water usage profiles on the outcome of the comparison. The use of metadata as a basis for aggregating collected water usage profiles further improves accuracy. For example, a water usage profile for an industrial water filtration system in an arid region would likely differ from a water usage profile for a residential water filtration system in a humid region.

In some embodiments, the metadata associated with each collected water usage profile of the profile database 610 may additionally define whether a given profile corresponds to an example of normal use of RO filtered water or abnormal use of RO filtered water. Abnormal uses of RO filtered water may be subdivided by type (e.g., as corresponding to a water leak, handwashing, etc.).

From the water usage profile database 610, the controller 602 may periodically retrieve one or more of the collected water usage profiles having metadata corresponding closely or exactly to that of the water filtration system 614. The controller 602 may compare the generated water usage profile to the retrieved water usage profile or profiles to determine whether the generated water usage profile corresponds (e.g., within a predetermined threshold range) to a normal water usage profile or to an abnormal water usage profile.

If the controller 602 determines that each of the generated water usage profiles is normal, it may continue to monitor the flow rate data received from the flow meters 642. Otherwise, if the controller 602 determines that the generated water usage profile is abnormal, it may identify the abnormality and automatically perform a predefined action associated with the identified abnormality. For example, if the identified abnormality is a water leak, the controller 602 may instruct the manifold 628 to block the flow of water to the region where the leak has been detected. In some embodiments, a processor of the controller 602 or one of the remote servers 608 may be configured to automatically contact a maintenance service (e.g., a plumber) to schedule repair of a leak in response to the detection of the leak, and to notify the home or business owner of the time and date of the scheduled repair. For example, the controller 602 may cause a leak alert indicating the presence of a leak in the water system and/or a service alert indicating that maintenance or repair of the water system has been scheduled to be sent to a user device of the user devices 644. For example, configuration data (i.e., a configuration) for the water system may be stored in the memory of the controller, and may define whether automatic leak prevention or automatic maintenance requests are enabled. In some embodiments, the controller 602 or the remote servers 608 may store user-defined contact information for the maintenance service in a memory device. As another example related to commercial and industrial applications, if the identified abnormality is a type of employee misuse (which may be considered an abnormality subtype), such as using RO filtered water for handwashing, the controller 602 or the remote servers 608 may cause a misuse alert (e.g., in the form of a text message or push notification) to be sent to one or more of the user devices 644 in order to inform a manager or supervisor of the misuse so that the behavior can be corrected. In some embodiments, the misuse alert may include an abnormality subtype associated with the detected misuse.

In some embodiments, the generated and collected water usage profiles may be used to identify how efficiently water is used in the system 600. A water usage report may be generated (e.g., by the controller 602) for the system 600 based on comparisons between an average of various water usage statistics of collected water usage profiles (e.g., identified by the controller 602 as having similar system characteristics to those of the system 600, based on metadata, which may include characteristic data) and corresponding water usage statistics of a generated water usage profile of the system 600. For example, the controller 602 may perform a comparison of a set of characteristics of the system 600 to sets of characteristics of various water systems represented in a profile database of the remote server 608 in order to identify water systems and corresponding water usage profiles that are characteristically similar to those of the system 600. The identified water usage profiles (which may be considered equivalent to the "collected water usage profiles") may then be retrieved by the controller 602, and may be used as a basis for determining whether water usage of the system 600 is "abnormal" or "normal". For example, water usage statistics may define the total water usage, softened water usage, filtered water usage (assumed to be softened in this example), unfiltered/unsoftened water usage, ratios of total, softened, filtered, and/or unfiltered/unsoftened water usage to total water usage over one or more time periods. In one embodiment, the controller 602 may generate a percentage or ratio for each of the aforementioned water usage statistics as a result of this comparison. For example, the total water usage of the generated water usage profile may be 250 gallons of water over a 24 hour period, while the average total water usage of collected water usage profiles retrieved by the controller 602 may be 200 gallons of water over the same 24 hour period. Thus, the controller 602 generates a percentage of 125% or a ratio of 5:4 for comparative total water usage when generating the water usage report. The water usage report may include a composite score derived from (e.g., as a simple or weighted average of) each of the generated percentages or ratios corresponding to the water usage statistics assessed by the controller 602.

In some embodiments, the controller 602 may track the water usage of the system 600 across consecutive time periods (e.g., daily, weekly, quarterly, monthly, and/or yearly time periods). For example, the local profiles 646 may include a first water usage profile for a current time period and a second water usage profile for an immediately preceding time period. Some or all of the water usage statistics of the first water usage profile may be compared to those of the second water usage profile by the controller 602 to generate a water usage report, similar to that described in the preceding example.

The water usage report generated by the controller 602 in either of the preceding examples may be sent to one or more of the user devices 644 to be displayed on a user interface thereof for viewing by the home or business owner, for example. If the water usage report corresponds to below average efficiency of water usage, corresponds to declining water usage efficiency between consecutive time periods, or includes a composite score below a predetermined threshold, the controller 602 may also send recommendations to the one or more user devices 644 for how to generally use water more efficiently, and, specifically, how to use water of particular types more efficiently. If the water usage report corresponds to above average efficiency of water usage, corresponds to improving water usage efficiency between consecutive time periods, or includes a composite score above a predetermined threshold, the controller 602 may send an alert to the one or more user devices 644 informing the home or business owner that the efficiency of water usage in the system 600 is improved in comparison to other correlated water systems or in comparison to previously detected water usage of the system 600.

Filtered water, especially RO filtered water such as that produced by the water filtration system 614, is generally more costly than unfiltered tap water due at least in part to the need to replace filters and clean membranes over time. Thus, it may be desirable to avoid wasting filtered water through misuse or prolonged water leaks. One way of identifying leaks and misuse is to generate water usage profiles for a home or business and compare the water usage profiles to those of a database of collected water usage profiles that have been classified as corresponding to normal use or abnormal use, with abnormal use cases being subclassified by specific types of abnormal use. Once abnormal use of filtered water has been identified, appropriate corrective action may be taken to prevent further waste of filtered water.

Figure 7A:
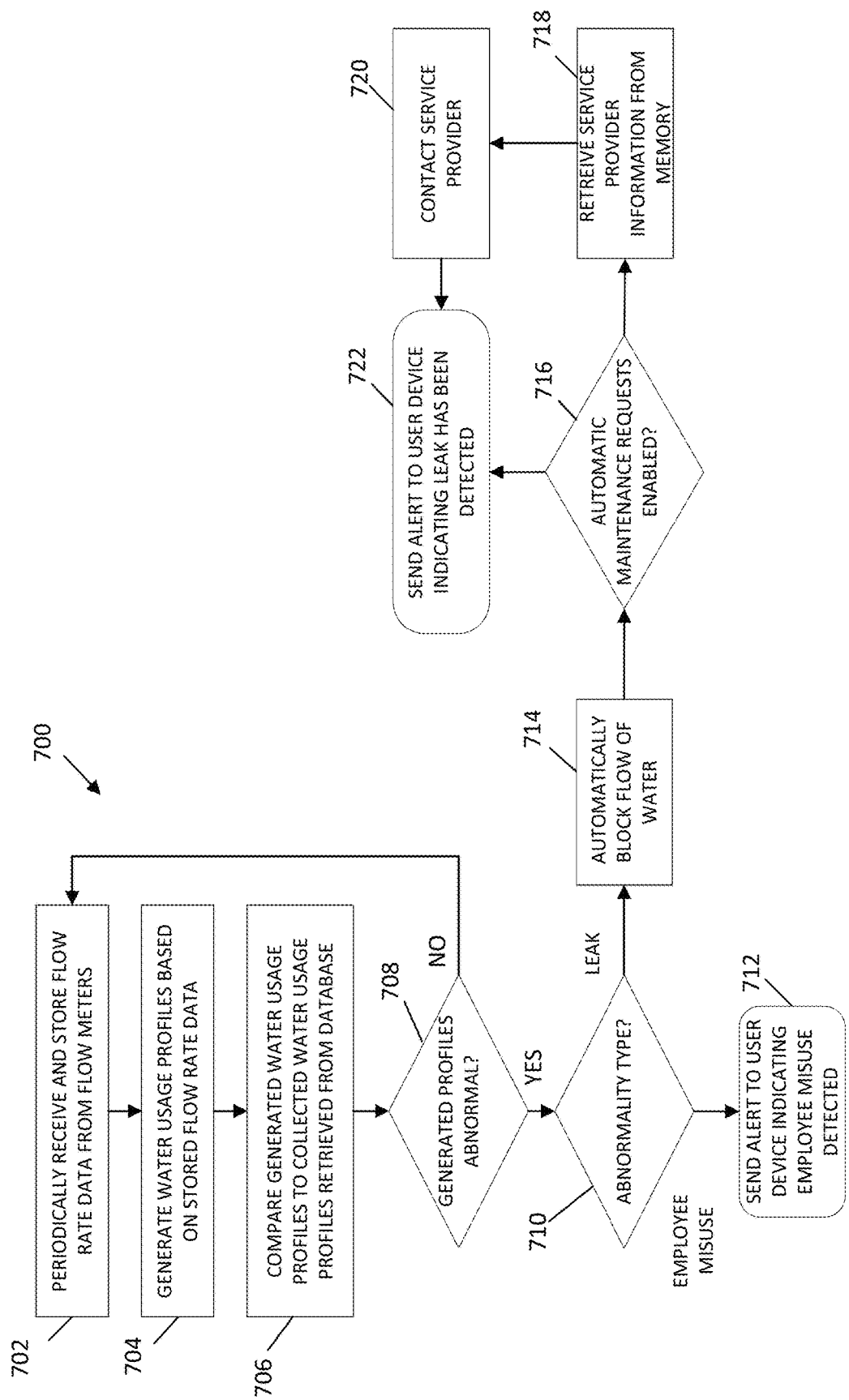
FIG. 7A is a flow chart of an example embodiment of a method that may detect and respond to abnormal usage of filtered water.

FIG. 7A shows an illustrative process flow for a method 700 for the monitoring and control of the operation of a network-enabled water filtration system (e.g., the water filtration system 614 of FIG. 6) within a residence or business. The method 700 may be performed by executing computer-readable instructions stored in a memory of a controller (e.g., controller 602 of FIG. 6) or a remote server (e.g., server 118, 150, 160, 336, 608 of FIGS. 1, 3, 6) with a processor of the controller or server. The controller or server may be coupled to network-enabled components of a system (e.g., system 600 of FIG. 6) via an electronic communications network (e.g., LAN 120 or internet or WAN 122 of FIG. 1; network 606 of FIG. 6).

At step 702, the processor of the controller or server periodically retrieves flow rate data from flow meters (e.g., flow meters 642, 648, 650 of FIG. 6) disposed at inputs and/or outputs of the water filtration system. The controller or server may store the flow rate data in one or more electronic memory devices (e.g., a hard disk drive or a solid state drive). For example, the processor may acquire the flow rate data from the flow meters at a predetermined sampling rate (e.g., once per second, once per ten seconds, once per minute, once per half hour, etc.). In some embodiments, this sampling rate may be user defined (e.g., via a user interface of the user devices 644 of FIG. 6), while in other embodiments the sampling rate may be set to a default value.

At step 704, the processor generates a water usage profile for the residence or business. The generated water usage profile may, for example, be periodically updated as a rolling window spanning of predetermined length (e.g., spanning a predetermined time period) with flow rate data being sampled from flow meters at a predetermined sampling rate (e.g., one sample per second, one sample per minute, one sample per five minutes, or any other applicable sampling rate). Each generated water usage profile may correspond to flow rate data from a single flow meter in some embodiments or may be an aggregate of the flow rate data from some or all of the flow meters coupled to the water filtration system. In some embodiments, secondary characteristics may be calculated when generating a water usage profile from a set of flow rate data. These secondary characteristics may include average flow rate over one or more time periods, peak flow rate, minimum flow rate, total water usage (e.g., through the corresponding flow meter or flow meters), averaged length of sustained water usage, maximum length of sustained water usage, or other applicable secondary characteristics.

At step 706, the processor compares the generated water usage profiles to related water usage profiles retrieved (e.g., via electronic communication over a network such as network 606 of FIG. 6) from a database (e.g., profile database 610 of FIG. 6) of collected water usage profiles, which may be stored in a memory of a remote server. The database may include collected water usage profiles that are broadly categorized as either "normal" or "abnormal", with abnormal water usage profiles being subdivided according to their specific type of abnormality. In some embodiments, a given generated water usage profile may only be compared one or more collected water usage profiles having system characteristics defined by metadata that are sufficiently similar to those of the given generated water usage profile. Limitations on which system characteristics are considered when assessing the relevance of collected water usage profiles may be defined automatically or may be user-defined. These system characteristics may include time of day, time of year, region (e.g., city, state, zip code, country), system type (e.g., residential, commercial, industrial), or any other applicable system characteristics. In some embodiments, a generated water usage profile that is not identified as substantially correlating with any normal collected water usage profile may automatically be considered abnormal. In other embodiments, only a generated water usage profile that is identified as substantially correlating with an "abnormal" collected water usage profile may be considered "abnormal". For example, two water usage profiles are considered correlated if a direct comparison of the two profiles exceeds a predefined correlation threshold (e.g., r>0.9, where r is the correlation coefficient). As another example, two water usage profiles may be considered correlated if comparisons of one or more secondary characteristics (e.g., those enumerated above) of the two profiles collectively exceed a predefined correlation threshold (e.g., r>0.9).

At step 708, if all of the generated water usage profiles are determined by the processor to be normal/not be abnormal (e.g., by determining that the generated water usage profiles either correlate with normal collected water usage profiles or do not correlate with abnormal collected water usage profiles), the method 700 returns to step 702. In this way, steps 702, 704, 706, and 708 may iterate for as long as the generated water usage profiles are not abnormal. Alternatively, if one of the generated water usage profiles (referred to below as the "abnormal generated water usage profile") is determined by the processor to be abnormal, then method 700 proceeds to step 710.

At step 710, the processor determines the type of abnormality that the abnormal generated water usage profile most closely correlates with. For example, the type of abnormality may be determined by identifying the known abnormality of the collected water usage profile that the abnormal generated water usage profile most closely correlates with. While it should be understood that other abnormalities may exist, only employee misuse and water leaks are considered in this example. If the processor determines that the abnormal generated water usage profile corresponds to employee misuse, then the method 700 proceeds to step 712. Alternatively, if the processor determines that the abnormal generated water usage profile corresponds to a leak, then the method 700 proceeds to step 714.

At step 712, in response to determining that the abnormal generated water usage profile corresponds to employee misuse, the processor causes an alert to be sent (e.g., via network 606 and/or gateway 604 of FIG. 6) to one or more user devices (e.g., user devices 644 of FIG. 6) indicating that employee misuse of the water filtration system has been detected. For example, the alert may include a push notification sent by the processor to a software application running on the user device, a simple messaging service (SMS) message, or any other applicable text or voice alert capable of being output by the user device(s). In some embodiments, the alert may indicate a particular subtype of employee misuse that has been identified. For example, the employee misuse subtypes may include: as using filtered water for handwashing, leaving a filtered water faucet on for too long, using filtered water to fill mop buckets, bypassing the water filtration system (e.g., by activating a bypass valve rather than addressing a problem with the water filtration system) etc. The employee misuse subtype of the abnormal generated water usage profile may be identified as that of the collected water usage profile most closely correlated with the abnormal generated water usage profile. Abnormality type and subtype information may, for example, be stored in the memory of the remote server for each of the abnormal collected water usage profiles.

At step 714, in response to determining that the generated water usage profile corresponds to a leak in the water filtration system, the processor remotely instructs (e.g., via the network) one or more smart valves (e.g., smart valves 613 and 625, relays 618, and/or valves of manifold 628 of FIG. 6) to close, blocking the flow of water. In some embodiments, only smart valves leading to an identified location of the leak may be closed so that water may continue to be supplied to the rest of the water system. Alternatively, all valves in the water system may closed until the leak is repaired in order to ensure that the leak is stopped. A user interface of a controller (e.g., controller 602, 603 of FIG. 6) or of a user device coupled to the system through the network may be subsequently manipulated to reopen the closed valves once the leak has been repaired. The location of the leak may be determined based on the location of the flow meter or flow meters that generated the flow rate data from which the abnormal generated water usage profile was derived. In this way, the leak may be isolated, with water no longer being supplied to the section of the water filtration system experiencing the leak, and degradation of the water filter or filters employed by the water filtration system may be reduced compared to if the leak were allowed to persist unblocked.

At step 716, the processor determines whether automatic maintenance requests are enabled for the system. For example, automatic maintenance requests may be enabled by changing configuration settings (e.g., and corresponding configuration data) through a user interface of the controller or one or more of the user devices. The processor may reference the configuration data when determining whether the automatic maintenance requests are enabled. If automatic maintenance requests are enabled, the method 700 proceeds to step 718. Otherwise, the method 700 proceeds to step 722.

At step 718, the processor retrieves service provider information from a local or remote memory. The service provider information may be defined by a user when enabling the automatic maintenance requests and may be stored in the configuration data or elsewhere in memory, and may include at least a phone number or e-mail address of the service provider and, optionally, the title and address of the service provider along with user-provided payment information.

At step 720, the processor contacts the service provider based on the retrieved service provider information to schedule repair of the identified leak. For example, the processor may cause a text message or e-mail to be sent to the service provider, or may call the service provider and play an automated message in order to request that the repair be scheduled. In some embodiments, the service provider may confirm the scheduling of the repair for a particular time and date, and in response the processor may send a text-based alert to one or more electronic devices of the user in order to inform the user of the time and date of the scheduled repairs.

At step 722, the processor sends an alert (e.g., via network 606 and/or gateway 604 of FIG. 6) to a user device indicating that a leak has been detected. For example, the alert may include a push notification sent a software application running on the user device, a simple messaging service (SMS) message, or any other applicable text or voice alert capable of being output by the user device. In some embodiments, the alert may also indicate the severity of the leak. For example, different leak subtypes may correspond to different levels of leak severity (e.g., characterized as minor, moderate, or severe). The leak subtype of the abnormal generated water usage profile may be identified as that of the collected water usage profile most closely correlated with the abnormal generated water usage profile.

Figure 7B:
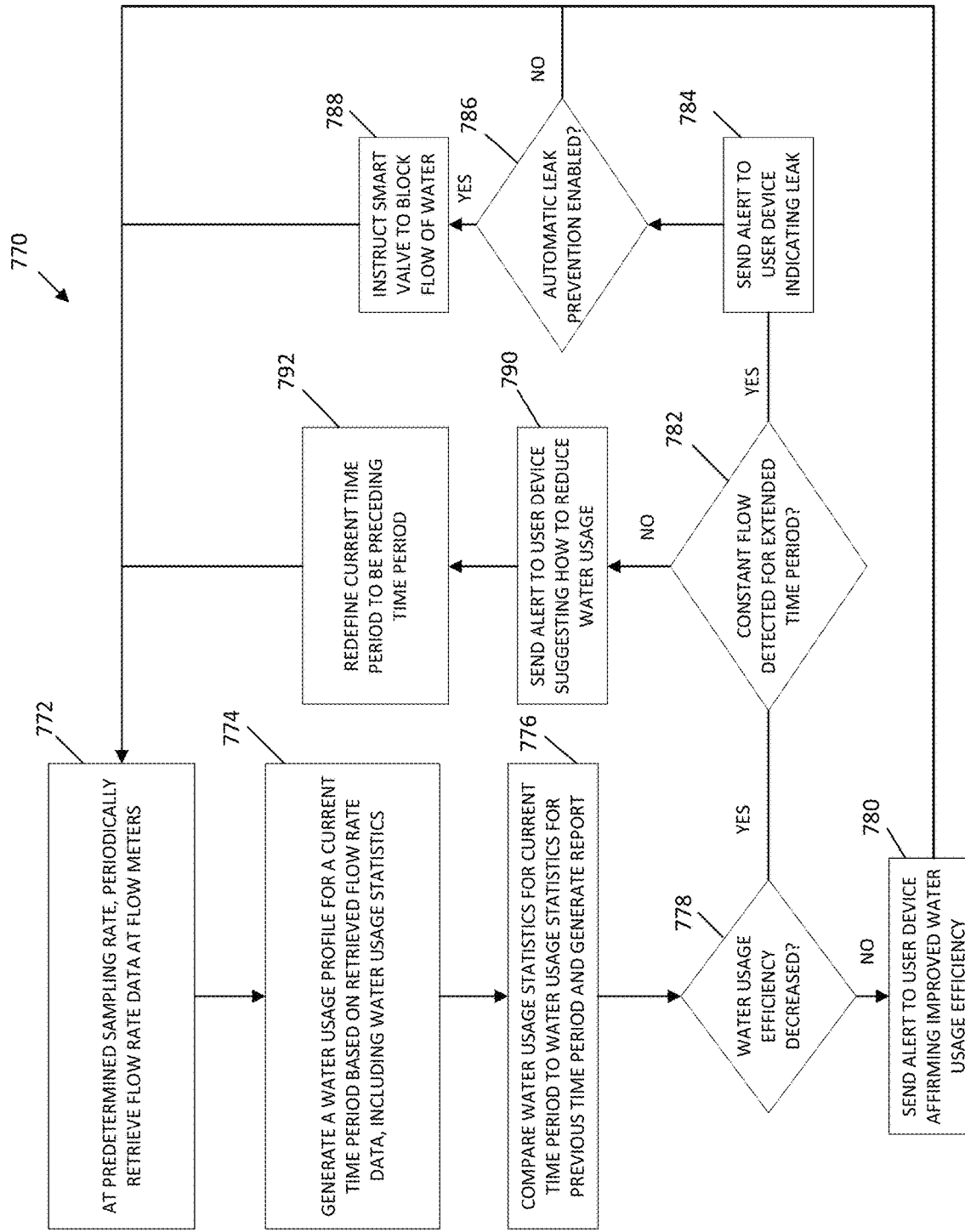
FIG. 7B is a flow chart of an example embodiment of a method that may monitor water usage efficiency in a system between consecutive time periods and detect leaks.

Referring to FIG. 7B, an example method 750 for updating generated water usage profiles may be used to track water usage over a rolling window of a predetermined length. The method 750 may be, for example, an example implementation of steps 704 and 706 of FIG. 7A. The rolling window may correspond to a certain number of the most recent consecutive sampling periods of flow rate data from the flow meter or flow meters corresponding to one of the generated water usage profiles, such as 144 ten-minute sampling periods for a 24 hour rolling window. Thus, once the monitoring data of an entire window's worth of sampling periods has been combined in the generated water usage profile, the oldest data capture may be considered stale and marked for removal at the end of the next sampling period. The processor may receive a signal or may otherwise determine (e.g., by monitoring an internal clock) that a sampling period has just elapsed. For example, if the sampling period is one minute and starts at the beginning of each minute, the processor may initiate the method 750 at the beginning of each minute. Then, at step 752, the processor obtains a previously generated water usage profile from the local profile database 746 where the generated water usage profiles are maintained. At step 754, the processor may determine whether the retrieved water usage profile contains data that is now "stale". For example, in a 24 hour rolling window, any data captures having a timestamp that is more than 24 hours in the past may be considered stale data eligible to be removed from the activity profile. In an embodiment where the flow rate data captures are stored in the generated water usage profiles, the processor may check the timestamps stored in memory of the controller or server to determine whether any of the data is stale. In an embodiment where the flow rate data captures are referenced with an array of data capture identifiers that point to locations in the memory where corresponding data captures are stored, the processor may determine the time that the identifiers were added to the generated water usage profile, or may retrieve the associated data captures and check their timestamps, or obtain another value from the parameters of the generated water usage profile that indicate the timestamp(s) of data stored in the generated water usage profile.

If there is no stale data in the generated water usage profile, the processor may move to the next activity profile (step 760, returning to step 752); this loop may proceed until all generated water usage profiles have been checked for stale data. If there is data that is stale (i.e., is older than the time window) at step 756 the processor may remove the stale data. For example, the processor may delete each data capture, or the identifier thereof (i.e., from an array as described above), that is older than the rolling window. The actual data of the data capture may be retained in a separate memory device (e.g., located on a local or remote server), but it is no longer referenced in the generated water usage profile. At step 758, the processor may update tracked secondary characteristics, such as average flow rate over one or more time periods, peak flow rate, minimum flow rate, total water usage (e.g., through the corresponding flow meter or flow meters), averaged length of sustained water usage, maximum length of sustained water usage, or other applicable secondary characteristics, to account for the removal of one or more data captures. The recalculation of these secondary characteristics may be performed in conjunction with adding a new data capture, if any, to the generated water usage profile. Once the data for the rolling window is updated, at step 760 the processor may obtain the next activity profile (i.e., return to step 752) or may terminate the method 750 if all activity profiles have been checked before returning to step 702 of method 700 of FIG. 7A.

By using the above methods to identify misuse of a water filtration system, action can be taken to quickly correct the misuse, thereby reducing waste of filtered water and prolong filter life.

FIG. 7B shows an illustrative method 770 by which water usage statistics of a water usage profile of a water system (e.g., the system 600 of FIG. 6) corresponding to a current time period may be generated and compared to those of a water usage profile corresponding to a preceding time period (e.g., the time period being set to a day, a week, or a month automatically by the processor or as a user-defined setting). The generation of the water usage profile and the comparison may be performed, for example, by a processor of a controller (e.g., controller 602 of FIG. 6) communicatively coupled to multiple flow meters (e.g., flow meters 642, 648, 650, 656, 660, 664) of the water system. The processor may perform the method 770 by executing computer-readable instructions stored on a memory device of the controller.

The processor may generate a report based on the comparison of the water usage statistics, which may inform a home or business owner of how the water usage efficiency of the water system is changing between consecutive time periods. Environmentally-conscious water users can review the report to determine how to improve or reduce their water usage. The report can compare the home or business owner's usage demographics to other usage demographics in a similar geographic region and/or to other water users with similar overall usage. The report can also provide a link to online tutorials on how to improve water usage efficiency. For example, the water usage efficiency of the water system may be quantified by a composite score derived from the water usage statistics of the current time period as well as from comparisons of various water usage statistics of the water usage profile of current time period to that of the previous time period.

If the water usage efficiency has improved from one time period to the next, the processor may send a notification to a user device (e.g., user devices 644) of the home or business owner informing of the improvement. Otherwise, if the water usage efficiency has decreased between consecutive time periods, the processor may send a notification to a user device (e.g., user devices 644) of the home or business owner informing of the decrease. The processor may additionally provide suggestions of how the water usage efficiency of the water system may be improved, and may identify specific water types or appliances (e.g., appliances 629 of FIG. 6) that are experiencing increased water usage in the current time period. Additionally, if the water usage efficiency has decreased, this may be indicative of a leak in the water system. The processor may identify the location of the leak, if detected, and if automatic leak prevention is enabled, the processor may control one or more smart valves to block the flow of water to the location of the leak. For example, configuration data stored in a memory device coupled to the processor may define whether automatic leak prevention is enabled, and the processor may reference this configuration data when making this determination.

At step 772, the processor periodically retrieves flow rate data from one or more of the flow meters of the water system. At step 774, the processor generates a water usage profile for a current time period based on the retrieved flow rate data. The generated water usage profile may include water usage statistics, which may define, for example, multiple parameters including the total water usage, softened water usage, filtered water usage (assumed to be softened in this example), unfiltered/unsoftened water usage, ratios of total, softened, filtered, and/or unfiltered/unsoftened water usage to total water usage over one or more time periods. The generated water usage profile may be stored in a local profile database (e.g., local profile database 646) of the controller.

At step 776, the processor compares the water usage statistics of the generated water usage profile for the current time period to water usage statistics of a water usage profile for a preceding time period and generates a report based on the comparison. The water usage profile for the preceding time period may be stored in the local profile database of the controller. The comparison of the two sets of water usage statistics may include direct comparisons of each parameter of the water usage statistics, with the result of these comparisons being percentages or ratios that are included in the generated report. For example, the processor may separately compare the total water usage, softened water usage, and filtered water usage of the water system for the preceding time period to that of the current time period to generate percentages respectively representing the change in total water usage, the change in softened water usage, and the change in filtered water usage between the two consecutive time periods.

At step 778, the processor determines whether the water usage efficiency of the water system has increased or decreased based on the generated percentages. For example, the processor may consider only the percentage change in total water usage between the two consecutive time periods when determining whether water usage efficiency has increased or decreased. Alternatively, the processor may determine whether water usage efficiency has increased or decreased based on an average of the percentage change in softened water usage and the percentage change in filtered water usage. In some embodiments, only generated percentages corresponding to user-defined parameters of the water usage statistics may be considered by the processor when making this determination. For example, a home or business owner may desire to specifically decrease the amount of softened water used in the water system from month to month. The home or business owner would alter settings via a user interface of a user device in electronic communication with the controller to select only water softened water usage to be monitored and to select a monitoring time period to be one month. If the processor determines that water usage efficiency has increased or stayed the same between the two consecutive time periods, then the method 770 proceeds to step 780. Otherwise, the method 770 proceeds to step 782.

At step 780, the processor causes an alert to be sent (e.g., via network 606 and/or gateway 604 of FIG. 6) to one or more user devices (e.g., user devices 644 of FIG. 6) indicating that water usage efficiency has improved between the two consecutive time periods. For example, the alert may include a push notification sent by the processor to a software application running on the user device, a simple messaging service (SMS) message, or any other applicable text or voice alert capable of being output by the user device(s). The alert may include the generated report and may indicate particular water usage areas (e.g., parameters of the water usage statistics) that have improved and, optionally, any water usage areas that still need improvement.

A decrease in water usage efficiency in a water system may sometimes be caused, not by human error, but instead by a leak somewhere in the water system. Thus, it may be beneficial to verify whether a decrease in water usage efficiency between two consecutive time periods is caused by a leak. At step 782, the processor determines whether a constant flow of water has been detected by the flow meters based on the flow rate data for an extended time period (e.g., exceeding a predetermined time threshold), which may be indicative of a leak in the water system. The processor may determine a general location of the leak based on which flow meter or flow meters of the water system indicate constant flow during the extended time period. If the processor identifies constant water flow for an extended time period, the method 770 proceeds to step 784. Otherwise, the method 770 proceeds to step 790.

At step 784, the processor causes an alert to be sent (e.g., via network 606 and/or gateway 604 of FIG. 6) to one or more user devices (e.g., user devices 644 of FIG. 6) indicating that a leak has been detected somewhere in the water system. For example, the alert may include a push notification sent by the processor to a software application running on the user device, a simple messaging service (SMS) message, or any other applicable text or voice alert capable of being output by the user device(s). The alert may include the general location of the detected leak.

At step 786, if automatic leak prevention is enabled (e.g., via a user-defined setting that may be enabled via a user interface of one of the user devices to modify configuration data that defines whether automatic leak prevention is enabled), the method 770 proceeds to step 788. Otherwise, the method 770 returns to step 772, forming an iterative loop.

At step 788, the processor instructs (e.g., via a command sent through the gateway 604) one or more smart valves (e.g., smart valves 613, 625, 654, 658, 662 or outputs of manifold 628 of FIG. 6) of the water system to close in order to block the flow of water to the area in which the leak has been identified. For example, turning briefly to the system 600 of FIG. 6, if the controller 602 detects a leak based on flow meter data retrieved from flow meter 650, but not from any of flow meters 642, 660, or 664, this may indicate a leak at the corresponding input of manifold 628, and a processor of the controller 602 may instruct the smart valve 625 to close. In some embodiments, the processor may cause an alert to be sent to the user device indicating which smart valve has been closed.

At step 790, the processor causes an alert to be sent (e.g., via network 606 and/or gateway 604 of FIG. 6) to one or more user devices (e.g., user devices 644 of FIG. 6) indicating that water usage efficiency has decreased between the two consecutive periods and suggesting how the home or business owner may reduce water usage. For example, the alert may include a push notification sent by the processor to a software application running on the user device, a simple messaging service (SMS) message, or any other applicable text or voice alert capable of being output by the user device(s). The suggestions for how to reduce water usage may identify particular appliances (e.g., of appliances 629 of FIG. 6) that may have contributed to the increase of water usage between the two consecutive periods and may identify which types of water are being used the most.

At step 792, the processor may redefine the water usage profile corresponding to the current time period and stored in the local profile database as corresponding to the preceding time period. The method 770 then returns to step 772 to begin collecting flow rate data to generate a new water usage profile for the current time period.

Returning to FIG. 6, over time the filters of the water filtration system 614 (e.g., pre-filter 616, carbon filter 620, and post filter 624) may need to be replaced as sediment collects in the filters as a natural result of operation of the system. If left unchanged for too long, the filters may be clogged by this collected sediment, undesirably reducing the water pressure through the water filtration system 614. However, it may also be undesirable to replace the filters too often, as this would result in unnecessary expense to the user. Thus, a solution is needed by which the replacement of any of the filters of a water filtration system is optimized. This may be achieved by alerting users when they are changing filters too frequently, by determining when filters need to be replaced based on the detected amount of total dissolved solids in the filters, rather than based on a predetermined amount of time, and by using regional filter analytics data to determine the average lifespan of similar filters in the local region in which the water filtration is located.

Figure 8:
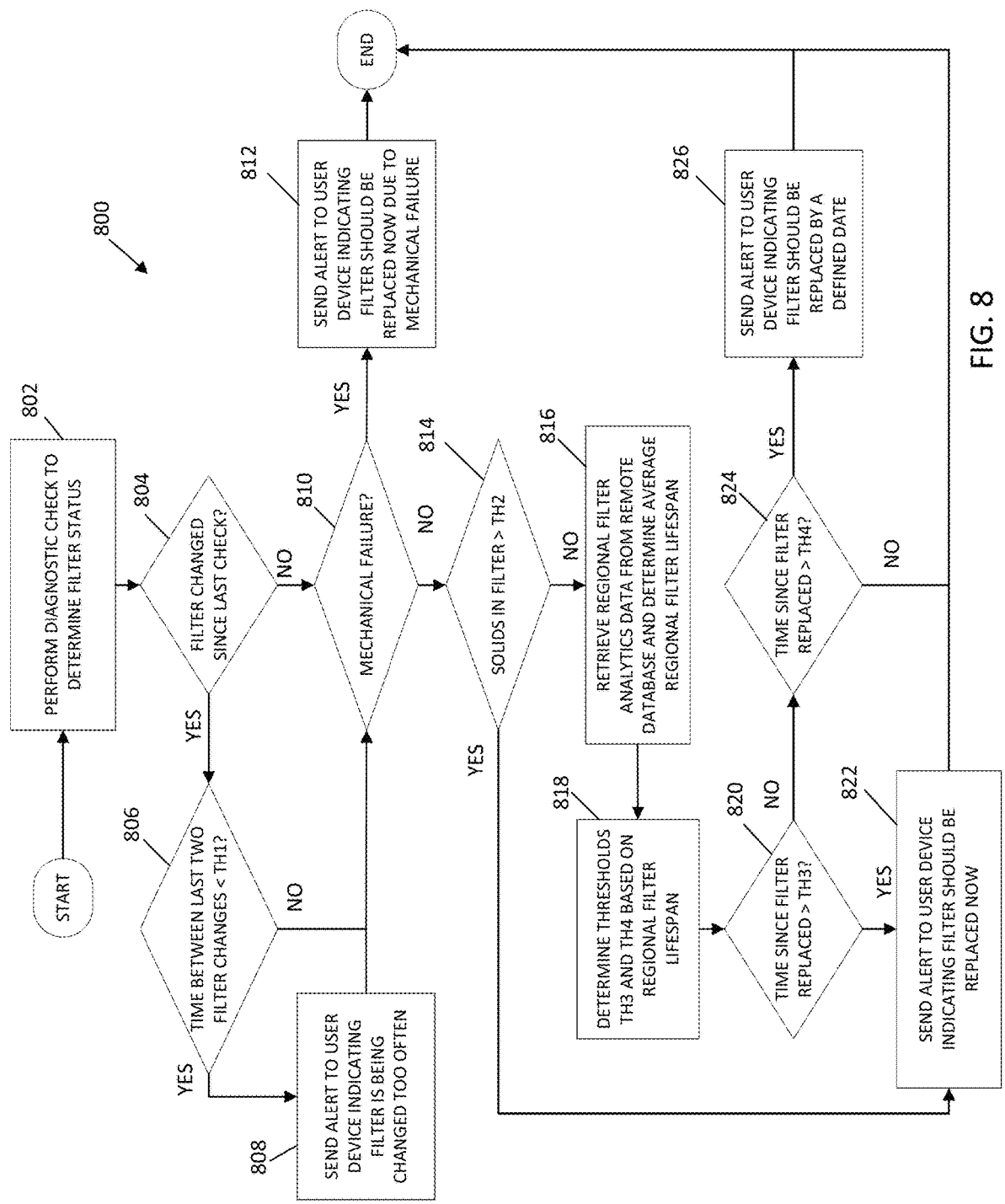
FIG. 8 is a flow chart of an example embodiment of a method that may monitor when filters of a water filtration system should be replaced.

FIG. 8 shows a method 800 by which alerts may be generated and sent to a user device to indicate when filters should be replaced and/or backwashed, as well as when filter replacement is occurring too often in a water filtration system (e.g., water filtration 614 of FIG. 6, non-limiting examples of which include a residential water filtration system, a commercial water filtration system, and a pool/spa water filtration system). It should be noted that the some or all of the steps of the method 800 may be performed by a processor of a controller of the water filtration system (e.g., controller 603 of FIG. 6), or of a remote controller connected to the water filtration system via a gateway (e.g., gateway 604 of FIG. 6) and/or a network (e.g., network 606 of FIG. 6). The method 800 may be performed periodically for each filter within the water filtration system. At step 802, a diagnostic check may be performed to determine the status of the filter being checked, and the processor may retrieve this filter stats from the diagnostic system.

At step 804, the processor determines from the filter status information whether the filter has been changed or backwashed since the last time a diagnostic check was performed. If so, the method 800 may proceed to step 806. Otherwise, the method 800 may proceed to step 810.

At step 806, the processor determines from the filter status information the time between the most recently occurring two filter changes before comparing the determined time to a predetermined threshold TH1, before which the previous filter is considered to have been discarded prematurely (e.g., before the end of its effective lifespan). For example, TH1 may be defined as a fraction (e.g., 70%) of a calculated average regional filter lifespan, which will be described below. If the determined time is less than TH1, the method proceeds to step 808. Otherwise, the method 800 proceeds to step 810.

At step 808, in response to determining that time between the most recent two filter changes is less than TH1, the processor sends an alert (e.g., via LAN 120 or internet or WAN 122, FIG. 1, or another applicable electronic communications network) to one or more user devices (e.g., user devices 644 of FIG. 6) indicating that the filter is being changed more often than is likely necessary, which may result in unnecessary waste. For example, the alert may include a push notification sent by the processor to a software application running on the user device, a simple messaging service (SMS) message, or any other applicable text or voice alert capable of being output by the user device(s).

At step 810, the processor determines, based on the filter status information, whether a mechanical failure has been detected for the filter. For example, leaks at filter couplings may be detected by pressure gauges installed along the filter manifold. If a pressure drop is identified across the filter (e.g., based on measurements made by the pressure gauges), the filter may be identified in the filter status information as being the source of a leak. If a mechanical failure has been detected for the filter, the method 800 proceeds to step 812. Otherwise, the method 800 proceeds to step 814.

At step 812, in response to determining that the filter has experienced a mechanical failure, the processor sends an alert (e.g., via LAN 120 or internet or WAN 122, FIG. 1, or another applicable electronic communications network) to one or more user devices (e.g., user devices 644 of FIG. 6) indicating that a mechanical failure of the filter has occurred and that the filter should be replaced. For example, the alert may include a push notification sent by the processor to a software application running on the user device, a simple messaging service (SMS) message, or any other applicable text or voice alert capable of being output by the user device(s). The alert may further indicate the type of mechanical failure that has been experienced by the filter. In some embodiments, the processor may also cause a smart valve (e.g., smart valve 613, 625) located at the input or output of the water filtration to close in response to the mechanical failure of a filter in order to prevent improperly filtered water from being passed to the rest of the water system.

At step 814, the processor determines the amount of solids in the filter. For example, the pressure across the filter (e.g., as determined by pressure gauges installed along the filter manifold) may correlate with the amount of solids in the filter (e.g., and thereby the remaining filter capacity), such that the amount of solids in the filter may be determined based on the pressure across the filter. The processor may then compare the determined amount of solids in the filter to a predefined threshold, TH2 over which the operation of the filter (and thus the water filtration system) may be rendered substantially inefficient. If the measured solids exceed TH2, the method 800 proceeds to step 822. Otherwise, the method proceeds to step 816.

At step 816, the processor retrieves regional filter analytics data from a database stored in a memory of a remote server (e.g., server 608 of FIG. 6). The regional filter analytics data may be collected from water filtration systems within a defined region (e.g., city, state, zip code, etc.) and may include, for each water filtration system represented in the data, the average filter lifespan (e.g., the amount of time elapsed between filter changes) for that system. This data may be limited to a particular region, as various factors affecting filter life, such as feed water quality, may vary from region to region. In some embodiments, the regional filter analytics data may be an aggregate measure of filter lifespan, such as a calculated average or median regional filter lifespan, for all of the water filtration systems in the region. In other embodiments, if the database does not include the average or median regional filter lifespan the processor may calculate the average or median regional filter lifespan based on the analytics data.

At step 818, the processor determines two thresholds, TH3 and TH4, based on the regional filter lifespan. The threshold TH3 may be a predetermined percentage (e.g., 10%) over the average or median regional filter lifespan, while the threshold TH4 may be a predetermined percentage (e.g., 10%) below the average or median regional filter lifespan. For example, if the regional filter lifespan is ten months, TH3 may be eleven months, while TH4 may be 9 months.

At step 820, the processor identifies the amount of time since the filter was last replaced and compares it to TH3. If the identified amount of time exceeds TH3, the method 800 proceeds to step 822. Otherwise, the method 800 proceeds to step 824.

At step 822, the processor sends an alert (e.g., via LAN 120 or internet or WAN 122, FIG. 1, or another applicable electronic communications network) to one or more user devices (e.g., user devices 644 of FIG. 6) indicating that the filter should be replaced as soon as possible. For example, the alert may include a push notification sent by the processor to a software application running on the user device, a simple messaging service (SMS) message, or any other applicable text or voice alert capable of being output by the user device(s). After step 822, the method 800 ends.

At step 824, the processor compares the amount of time since the filter was last replaced to TH4. If the identified amount of time exceeds TH4, the method 800 proceeds to step 826. Otherwise, the method 800 ends.

At step 826, the processor sends an alert (e.g., via LAN 120 or internet or WAN 122, FIG. 1, or another applicable electronic communications network) to one or more user devices (e.g., user devices 644 of FIG. 6) indicating that the filter should be replaced by a defined date. For example, the alert may include a push notification sent by the processor to a software application running on the user device, a simple messaging service (SMS) message, or any other applicable text or voice alert capable of being output by the user device(s). For example, the defined date may be equal to TH3 minus the amount of time since the filter was last replaced. After step 826, the method 800 ends.

Another prevalent concern among home and business owners is the prevention of flooding in rooms located below ground and, in particular, those located near or overlapping the water table. Such rooms often require a sump pump to route water that has collected in the room out of the building.

Figure 9:
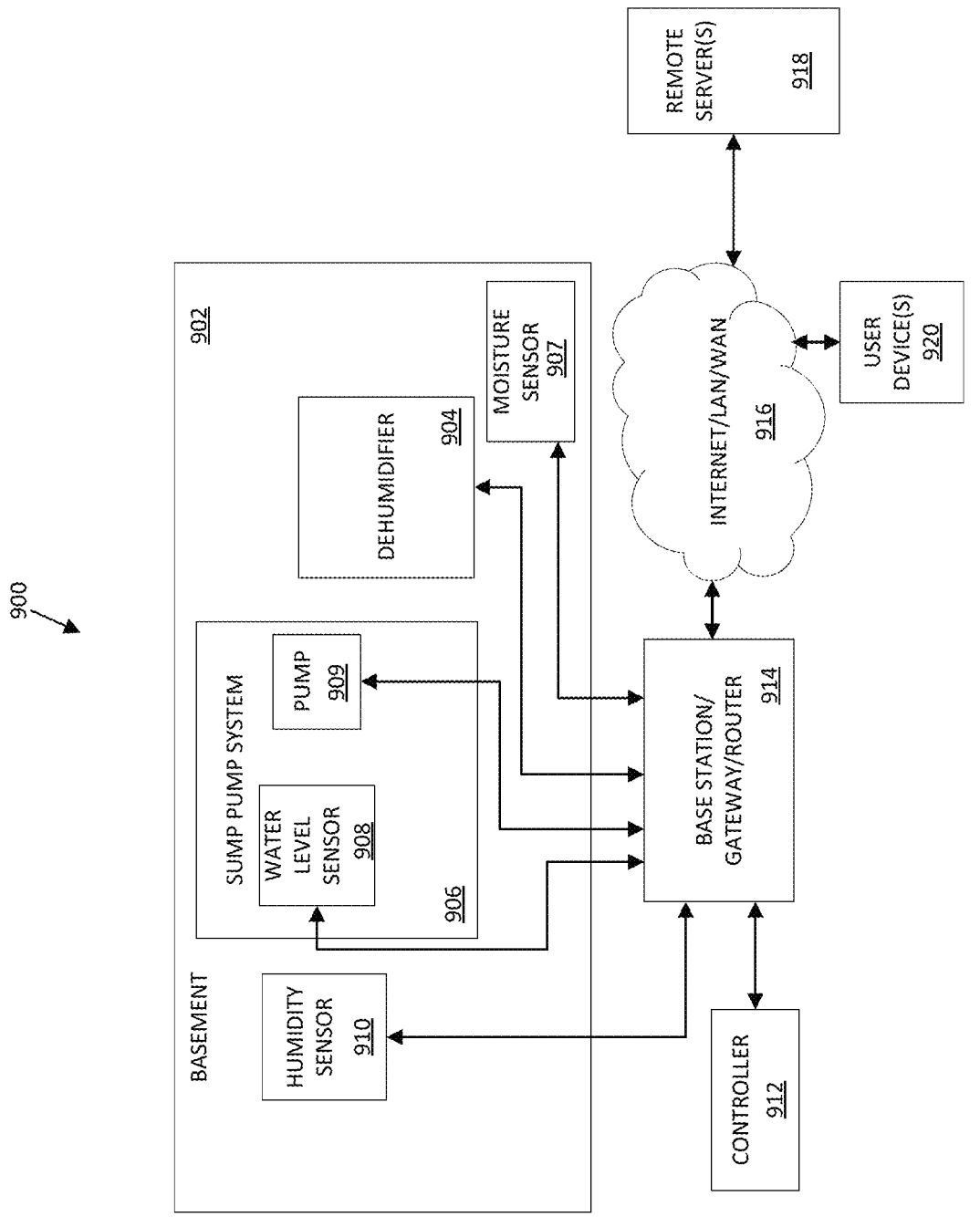
FIG. 9 is a block diagram of an example embodiment of a communication system and basement having a sump pump system, humidity sensor, dehumidifier, and moisture sensor.

FIG. 9 shows an illustrative system 900 by which water accumulation (e.g., flooding) in a basement 902 may be detected and appropriate mitigating action taken. The system 900 may include devices and systems located in the basement 902, such as one or more of a dehumidifier 904, a sump pump system 906, a moisture sensor 907, and a humidity sensor 910. The system 900 may further include a controller 912 (e.g., which may correspond to the controller 602 of FIG. 6), a gateway 914 (e.g., which may correspond to the gateway 604 of FIG. 6), a network 916 (e.g., network 606 of FIG. 6), one or more remote servers 918 (e.g., which may correspond to the remote servers 608 of FIG. 6), and one or more user devices 920 (e.g., which may correspond to the user devices 644 of FIG. 6). The controller 912 and the gateway 914 may be located within the basement 902 or may be located in another part of the building of which the basement 902 is a part. The sump pump system 906 may be a submersible sump pump system that includes a water level sensor 908 and a pump 909. As will be described below, electronic communication between individual network-enabled devices of the system 900 allows coordination between these devices in ways that are not achievable in conventional sump pump systems.

Each of the dehumidifier 904, the moisture sensor 907, the water level sensor 908, the sump pump 909 and the humidity sensor 910 may include or be coupled to a network-enabled controller (e.g., IoT device 200 of FIG. 2) that enables communication between these devices and the gateway 914. The controller 912 and the user devices 920 may also be communicatively coupled to the gateway 914. The gateway 914 may be communicatively coupled to the remote servers 918 via the network 916.

The water level sensor 908 may be a buoyant float sensor such that as the water level in the basement rises the water level sensor 908 or a component thereof may be lifted with respect to the rest of the sump pump system 906. Once the water level sensor 908 exceeds a predetermined threshold height, the water level sensor may, upon exceeding the threshold height, send a signal to the controller 912 or to one of the remote servers 918, which may then verify the validity of the signal before sending an instruction to the sump pump 909 to begin pumping.

In some embodiments, multiple predetermined threshold heights may be set for the water level sensor 908. For example, lower, middle, and upper thresholds may be defined. When the water level sensor 908 rises above the middle threshold, a first alert is sent to the controller 912 or the remote servers 918, indicating that the sump pump 909 should be turned on. When the water level sensor 908 rises above the upper threshold, a second alert is sent to the controller 912 or the remote servers 918, indicating a malfunction of the sump pump 909 has likely occurred as the rate of water accumulation in the basement 902 has exceeded the ability of the sump pump 909 to remove water from the basement 902. When the water level sensor 908 falls below the lower threshold, a third alert is sent to the controller 912 or the remote servers 918, indicating that the sump pump should be turned off as the water level has sufficiently receded. It should be noted that, in this example, the controller 912 or the remote servers 918 make the ultimate determination of whether to turn the sump pump on or off. In some embodiments, this determination may be made based on an analysis of the validity of the signals received from the water level sensor 908, for example, based on indicators received from the moisture sensor 907 and/or the humidity sensor 910, as will be described below.

If a processor of the controller 912 or the remote servers 918 determines, based on signals received from the water level sensor 908, that the water level in the basement 902 has exceeded a predetermined threshold (e.g., the middle threshold), the processor may instruct the sump pump system 906 to begin pumping water out of the basement 902. Additionally, the processor may instruct the dehumidifier 904 to turn on in order to begin dehumidifying the basement 902. If the processor subsequently determines that the water level has exceeded a second, higher predetermined threshold (e.g., the upper threshold), this may be indicative of the sump pump malfunctioning. In response to identifying a sump pump malfunction, the processor may cause an alert to be sent to one or more of the user devices 920. Additionally, if automatic maintenance service requests have been enabled by the home or business owner (e.g., via a user interface accessed using one of the user devices 920), the processor may be configured to automatically contact a maintenance service (e.g., a plumber or repair service) to schedule repair of the sump pump in response to the detection of a malfunction of the sump pump. For example, configuration data stored in a memory of the controller 912 may define whether automatic maintenance service requests are enabled, and the processor 912 may reference this configuration data when making this determination. In some embodiments, the maintenance service request may request that the maintenance service be performed prior to a predicted time at which inclement weather is predicted to occur, based on weather data. The processor may further be configured to notify the home or business owner of the time and date of the scheduled repair by sending a text message or push notification to one or more of the user devices 920.

Water level sensors of sump pump systems, such as the water level sensor 908, may occasionally malfunction (e.g., as a result of the water level sensor getting stuck or accumulating grime or residue that blocks electrical contacts of the sensor) so that water accumulation in the basement remains undetected by the sensor or so that the water level sensor falsely detects water accumulation even when no water is present. Thus, it may be desirable to have alternative systems in place for detecting water accumulation in the basement 902 so that water accumulation may still be detected even in the event of such malfunctions. These alternative systems may also be used to verify whether flooding detected by the water level sensor 908 is actually occurring, or whether the signal output by the water level sensor is a false positive.

For example, the moisture sensor 907 may be a secondary water detection device disposed in the basement 902 (e.g., attached to or placed on the floor of the basement near the sump pump system 906). The moisture sensor 907 may be a spot leak detector, an under-carpet leak detector, a hydroscopic tape-based sensor, or a rope-type sensor, for example.

If the moisture sensor 907 detects water, it may send an alert to the controller 912 or to the remote servers 918 via the gateway router 914.

As another example of an alternative device for water accumulation detection and verification, a humidity sensor 910 may be disposed in the basement 902. The humidity sensor 910 may include a capacitive sensor, a resistive sensor, and/or a thermal conductivity sensor for measuring ambient humidity. The humidity sensor 910 may detect the humidity level of the basement 902. If the humidity level exceeds a predetermined threshold, the humidity sensor 910 may send an alert to the controller 912 or to the remote servers 918 via the gateway router 914. In some embodiments, the controller 912 may instruct the dehumidifier 904 to turn on in response to receiving the alert from the humidity sensor 910.

A processor of the controller 912 or the remote servers 918, upon receiving alerts from both the moisture sensor 907 and the humidity sensor 910, may instruct the sump pump system 906 to begin pumping water out of the basement 902, even if the water level sensor 908 has not yet detected water accumulation there. In this way, the sump pump system 906 may still operate to remove accumulated water from the basement 902, even if the water level sensor 908 has malfunctioned.

The processor may refrain from turning on the sump pump system 906 if the water level sensor 908 indicates flooding, but the processor has not received alerts from the moisture sensor 907 or the humidity sensor 910, as this scenario may be assumed to correspond to a false positive reading of the water level sensor 908.

In some embodiments, if the humidity sensor 910 and the moisture sensor 907 indicate water accumulation in the basement 902 and the water level sensor 908 does not, in addition to turning on the sump pump system 906, the processor may cause a push notification or text message to be sent to one or more of the user devices 920 by a processor of the controller 912 or of the remote servers 918 in order to inform the home or business owner that the water level sensor 908 may be malfunctioning and should be checked.

In some embodiments, the processor may determine, upon receiving alerts from the water level sensor 908, but not from either of the humidity sensor 910 or the moisture sensor 907, that the water accumulation detected by the water level sensor 908 corresponds to a false positive. In response, the processor may cause a push notification or text message to be sent to one or more of the user devices 920 by a processor of the controller 912 or of the remote servers 918 in order to inform the home or business owner that the water level sensor 908 may be malfunctioning and should be checked.

Additionally, if automatic maintenance service requests have been enabled by the home or business owner (e.g., via a user interface accessed using one of the user devices 920), the processor may be configured to automatically contact a maintenance service (e.g., a plumber or repair service) to schedule repair of the water level sensor 908 in response to the detection of a malfunction thereof. For example, configuration data stored in a memory of the controller 912 may define whether automatic maintenance service requests are enabled. The processor may further be configured to notify the home or business owner of the time and date of the scheduled repair by sending a text message or push notification to one or more of the user devices 920.

Figure 10A:
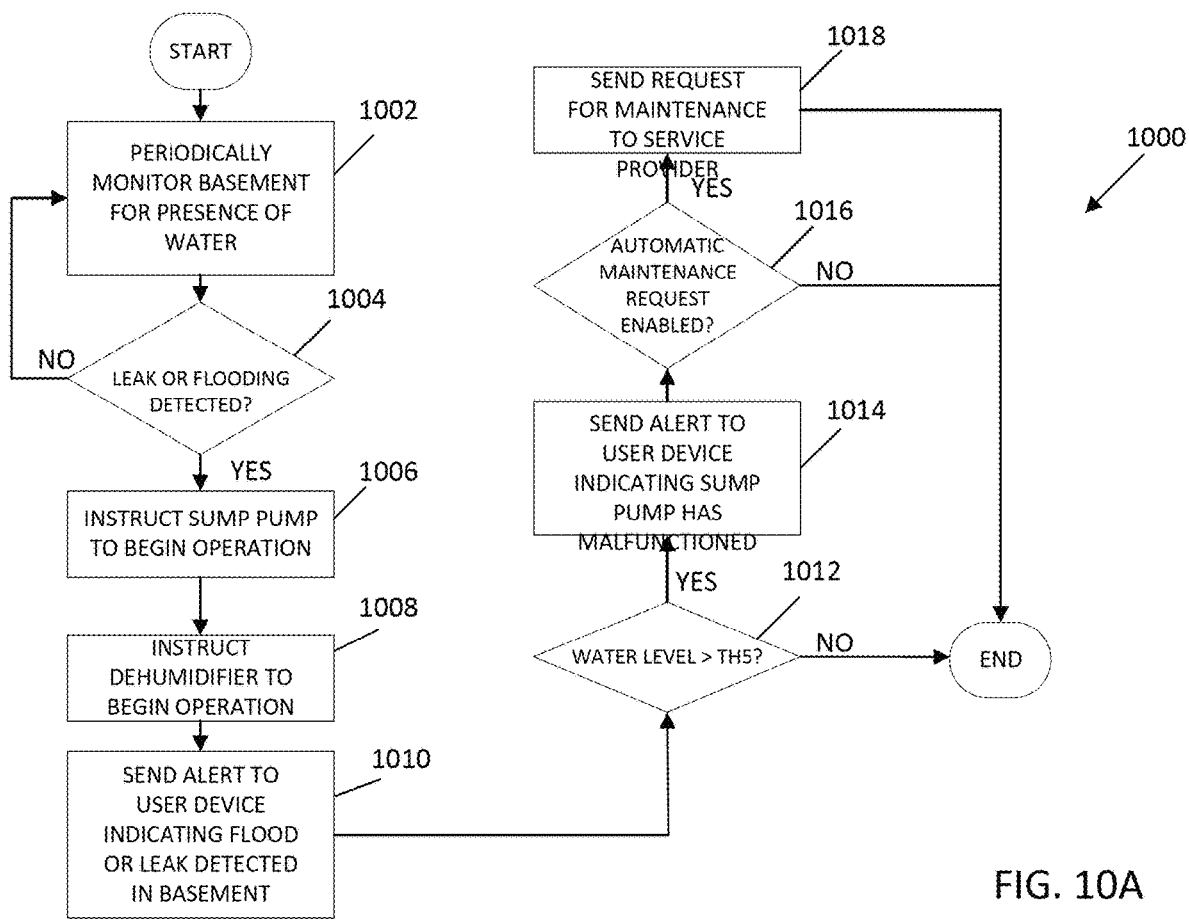
FIG. 10A is a flow chart of an example embodiment of a method that may control the operation of a sump pump and dehumidifier in response to detected leaks or flooding.

FIG. 10A shows an illustrative process flow for a method 1000 for the monitoring and control of the operation of a network-enabled sump pump system (e.g., the sump pump system 906 of FIG. 9). The method 1000 may be performed by executing computer-readable instructions stored in a memory of a controller (e.g., controller 912 of FIG. 9) or a remote server (e.g., servers 918 of FIG. 9) with a processor of the controller or server. The controller or server may be coupled to network-enabled components of a system (e.g., system 900 of FIG. 9) via an electronic communications network (e.g., network 916 of FIG. 9).

At step 1002, the processor may periodically monitor a basement containing the sump pump system for the presence of water. For example, the processor may determine whether any alerts have been issued by one or more of a water level sensor (e.g., water level sensor 908 of FIG. 9) of the sump pump system, by a humidity sensor (e.g., humidity sensor 910 of FIG. 9), or by a moisture sensor (e.g., moisture sensor 907 of FIG. 9).

At step 1004, the processor determines if data (e.g., water level data, humidity data, moisture data, respectively, and/or corresponding alerts) sent by the water level sensor, the humidity sensor, and/or the moisture sensor indicate that flooding (e.g., which may correspond to flooding caused by rain or flooding caused by a leak in a water system in proximity to the basement) may be occurring in the basement. For example, if the water level sensor detects that the water level in the basement has exceeded a predefined water level threshold and issues an alert to the processor, if the humidity sensor detects that the humidity in the basement has exceeded a predefined humidity threshold and issues an alert to the processor, and if the moisture sensor indicates that moisture is detected on the floor of the basement and issues an alert to the processor, this indicates to the processor that flooding may be occurring in the basement. A detailed example of how alerts generated by these sensors may be interpreted and reacted to by the processor is provided in connection with FIG. 10B.

If a flooding is detected, the method proceeds to step 1006. Otherwise, the method returns to step 1002, forming an iterative loop. At step 1006, the processor instructs the sump pump to begin operation to pump water out of the basement. At step 1008, the processor instructs a dehumidifier (e.g., dehumidifier 904 of FIG. 9) in the basement to turn on to begin dehumidifying the basement. In some embodiments, the processor may be configured to instruct the dehumidifier to turn on any time the sump pump is operating.

At step 1010, the processor causes an alert to be sent (e.g., via gateway 914 and/or network 916 of FIG. 9) to one or more user devices (e.g., user devices 920 of FIG. 9) indicating that flooding has been detected in the basement. For example, the alert may include a push notification sent by the processor to a software application running on the user device, a simple messaging service (SMS) message, or any other applicable text or voice alert capable of being output by the user device(s).

At step 1012, the processor may analyze any alerts received from the water level sensor of the sump pump system. If the alerts indicate that the water level exceeds an upper threshold TH5, this may be indicative that the flooding cannot be effectively corrected by the sump pump, either due to a malfunction of the sump pump. Thus, if the alerts provided by the water level sensor indicate that the water level has exceeded TH5, the method proceeds to step 1014 so that the home or business owner may be alerted to the malfunctioning of the sump pump. Otherwise, the method 1000 ends.

At step 1014, the processor sends an alert to the one or more user devices indicating that the sump pump has malfunctioned. For example, the alert may include a push notification sent by the processor to a software application running on the user device, a simple messaging service (SMS) message, or any other applicable text or voice alert capable of being output by the user device(s).

At step 1016, if automatic maintenance requests are enabled (e.g., as part of an opt-in or opt-out program), the method 1000 proceeds to step 1018. For example, automatic maintenance requests may be enabled by the home or business owner via a user interface of one of the user devices, and a record of whether the automatic maintenance requests have been enabled may be stored on the controller or the remote server (e.g., in configuration data stored on a memory thereof). The maintenance requests may authorize the processor to automatically schedule the servicing or repair of the sump pump system with a service provider. In some embodiments, the maintenance service request may request that the maintenance service be performed prior to a predicted time at which inclement weather is predicted to occur, based on weather data. The contact information for the service provider may be stored in a memory device of the controller or remote server, and may be user defined. If maintenance requests are not enabled, the method 1000 ends.

At step 1018, the processor retrieves the stored contact information of the service provider and then contacts the service provider to schedule repair of the identified leak. For example, the processor may cause a text message or e-mail to be sent to the service provider, or may call the service provider and play an automated message in order to request that the repair be scheduled. In some embodiments, the service provider may confirm the scheduling of the repair for a particular time and date, and in response the processor may send a text-based alert to one or more electronic devices of the user in order to inform the user of the time and date of the scheduled repairs.

Figure 10B:
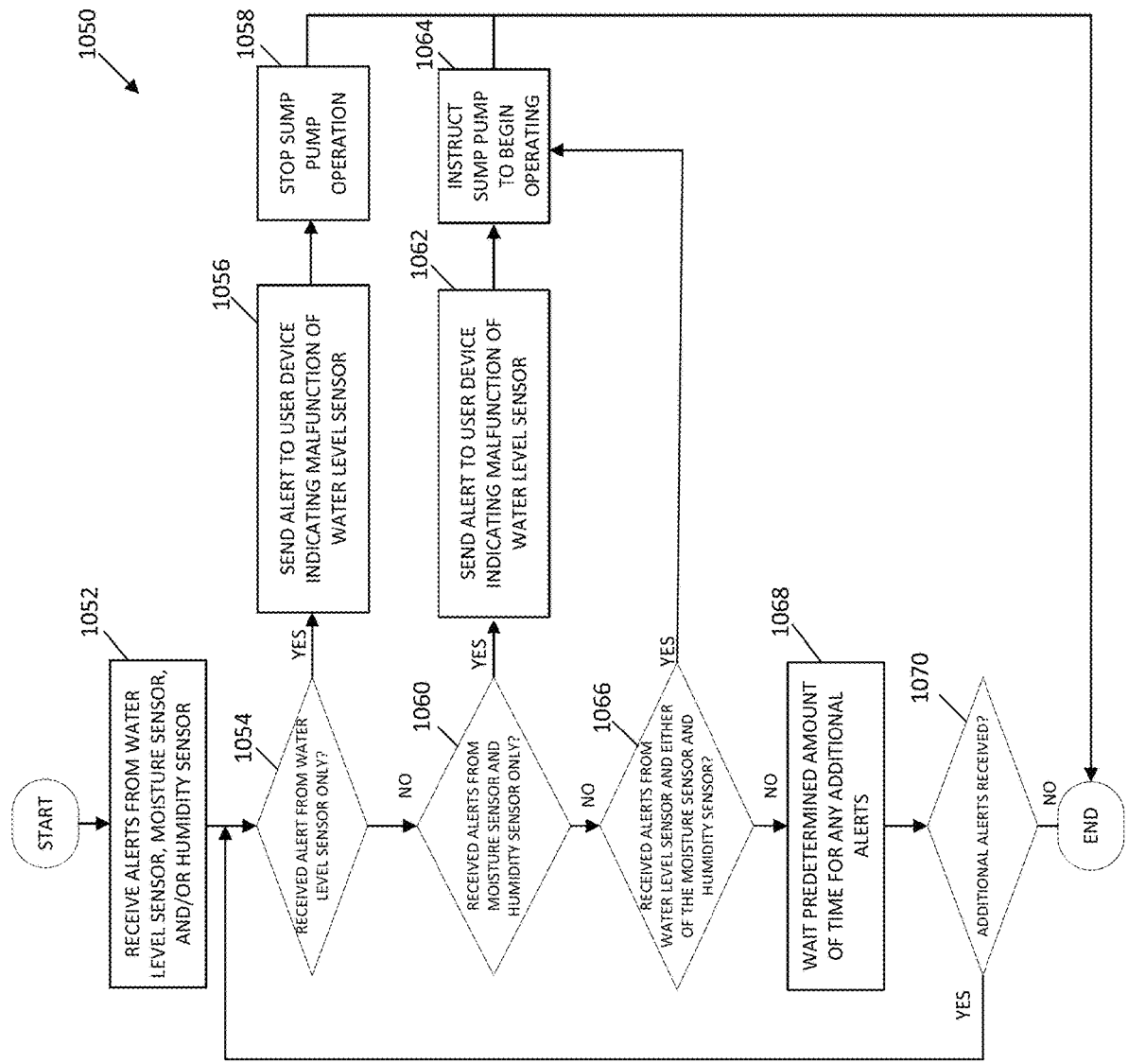
FIG. 10B is a flow chart of an example embodiment of a method that may detect false-positives generated by a water level sensor of a sump pump system.

FIG. 10B shows an illustrative method 1050 by which alerts from multiple devices located in a basement may be analyzed in combination in order to accurately determine whether flooding (e.g., which may correspond to flooding caused by rain or flooding caused by a leak in a water system in proximity to the basement) has occurred in the basement sufficient for a sump pump (e.g., sump pump 909 of FIG. 9) should be activated. The method 1050 may be performed in conjunction with steps 1004 and 1006 of method 1000 of FIG. 10A. A processor of a controller (e.g., controller 912 of FIG. 9) or a remote server (e.g., remote servers 918 of FIG. 9) may perform the method 1050 by executing computer-readable instructions stored on a memory device of the controller or remote server.

At step 1052, the processor receives alerts from one or more network-enabled devices such as a water level sensor (e.g., water level sensor 908 of FIG. 9), a moisture sensor (e.g., moisture sensor 907 of FIG. 9), and a humidity sensor (e.g., humidity sensor 910 of FIG. 9). For example, the processor may receive these alerts via an electronic communications network (e.g., network 916 of FIG. 9) and a gateway e.g., gateway 914 of FIG. 9). In the present example, a water level alert received from the water level sensor indicates that the water level in the area of the basement in which the water level sensor is located has exceeded a predetermined threshold and that the sump pump should be turned on. However, depending on the quality and condition of the water level sensor, this alert could be a false positive (e.g., due to the water level sensor malfunctioning). Additionally, the absence of an alert from the water level sensor does not necessarily mean that the sump pump should not be turned on. In order to account for the possibility of these malfunctions, secondary devices such as the humidity sensor and the moisture sensor may be disposed in the basement and alerts from these secondary devices may enable the processor to confirm or overrule alerts received from the water level sensor. Humidity data or a humidity alert (e.g., representing a humidity level of the basement) received from the humidity sensor may indicate that the humidity of the basement has exceeded a predetermined humidity threshold. A moisture alert received from the moisture sensor may indicate that moisture has been detected at the moisture sensor's location within the basement.

At step 1054, if the processor determines an alert has been received an alert from the water level sensor, but not from the humidity sensor or the moisture sensor, this is likely indicative of a false positive reading from the water level sensor due to a malfunction, and the method 1050 proceeds to step 1056. Otherwise, the method 1050 proceeds to step 1060.

At step 1056, the processor causes an alert to be sent to one or more user devices (e.g., user devices 920 of FIG. 9) indicating that the water level sensor of the sump pump system may have malfunctioned. For example, the alert may include a push notification sent by the processor to a software application running on the user device, a simple messaging service (SMS) message, or any other applicable text or voice alert capable of being output by the user device(s). In this way, the owner of the basement may be made aware of a potential issue with the sump pump system, enabling them to confirm and possibly correct the identified malfunction.

At step 1058, the processor may send a command to the sump pump to stop operation. For example, in some embodiments the sump pump may include a local controller that causes the sump pump to turn on when the water level threshold is exceeded, but the instructions of this local controller may be overridden by the processor if the detected exceeding of the water level threshold is determined to be a false positive.

As another example, the water level sensor could malfunction after having operated properly to initiate sump pump operation, meaning that the sump pump would already be running at the time the malfunction of the water level sensor occurred. The processor would then send a command to the sump pump to stop operation upon determining that the humidity sensor and moisture sensor no longer detected excessive humidity and moisture, respectively.

At step 1060, if the processor determines that alerts have been received from the moisture sensor and the humidity sensor, but not from the water level sensor, this is likely indicative of a false negative reading from the water level sensor due to a malfunction, and the method 1050 proceeds to step 1056. Otherwise, the method 1050 proceeds to step 1066.

At step 1062, the processor causes an alert to be sent to the one or more user devices indicating that the water level sensor of the sump pump system may have malfunctioned. For example, the alert may include a push notification sent by the processor to a software application running on the user device, a simple messaging service (SMS) message, or any other applicable text or voice alert capable of being output by the user device(s). In this way, the owner of the basement may be made aware of a potential issue with the sump pump system, enabling them to confirm and possibly correct the identified malfunction.

At step 1064, the processor sends a command to the sump pump instructing it to begin operating to remove accumulated water from the basement. At step 1066, if the processor determines that alerts have been received from the water level sensor and either of the moisture sensor and the humidity sensor, this provides confirmation of the validity of the water level sensor reading, and the method 1050 proceeds to step 1064. Otherwise, the method 1050 proceeds to step 1068.

At step 1068, if only a single alert has been received from either the humidity sensor or the moisture sensor, the processor may wait a predetermined amount of time for additional alerts. For example, the humidity sensor may detect that the humidity of the basement exceeds the predefined humidity threshold before enough water has collected in the basement to exceed the water level threshold or enough moisture has collected at the moisture sensor to be detected by the moisture sensor. Thus, waiting for the predetermined amount of time allows conditions in the basement to progress to potentially levels that are detectable by the water level sensor or the moisture sensor. Similarly, if the processor has only received an alert from the moisture sensor, the processor will wait for the predetermined amount of time for confirmatory alerts to be received from the water level sensor or the humidity sensor.

At step 1070, if additional alerts have been received by the processor, the method 1050 returns to step 1054 to confirm which actions should be taken given the alerts that have been received. Otherwise, the method 1050 ends.

Figure 11:
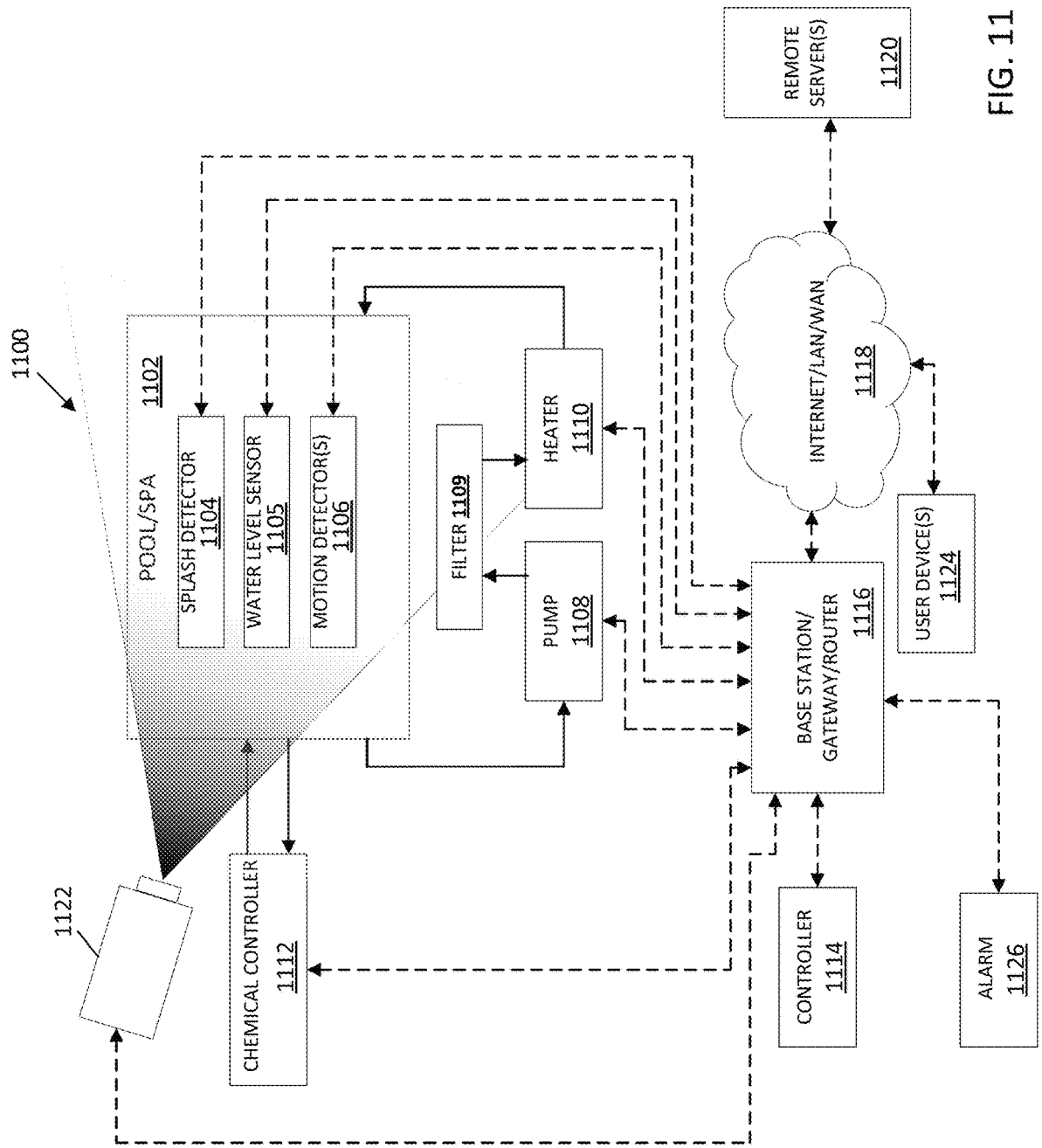
FIG. 11 is a block diagram of an example embodiment of a communication system and a pool or spa system having a chemical controller, a pump, a heater, a splash detector, and motion detectors.

FIG. 11 shows an illustrative system 1100 by which a pool or spa 1102 may be monitored and maintained. The system 1100 may have multiple network-enabled devices (e.g., network-enabled via an IoT device such as IoT device 200 of FIG. 2) at the pool or spa 1102, including one or more of a chemical controller 1112 in fluid communication with the pool or spa 1102, a pump 1108 in fluid communication with the pool or spa 1102, a heater 1110 that, when activated, increases the temperature of the water in the pool or spa 1102, a camera 1122 having some or all of the pool or spa 1102 in its field of view, a splash detector 1104, a water level sensor 1105, and/or motion detector 1106 disposed in the pool or spa 1102. The system 1100 may further include a controller 1114 (e.g., controller 602 of FIG. 6), a gateway 1116 (e.g., gateway 604 of FIG. 6), a network 1118 (e.g., network 606 of FIG. 6), one or more remote servers 1120 (e.g., remote servers 608 of FIG. 6), one or more user devices 1124 (e.g., user devices 644 of FIG. 6), and one or more alarms 1126. The splash detector 1104, the water level sensor 1105, the motion detectors 1106, the pump 1108, the heater 1110, the chemical controller 1112, the controller 1114, the camera 1122, and the alarms 1126 may each be coupled to and in electronic communication with the gateway 1116. The remote servers 1120 and the user devices 1124 may be coupled to and in electronic communication with the gateway 1116 through the network 1118.

The pump 1108 may receive water from a drain of the pool or spa 1102 (e.g., via a suction inlet) and may discharge water back into the pool or spa 1102 through the heater 1110, which increases the temperature of water discharged by the pump 1108. The pump 1108 may be a circulating pump normally used with pools or spas that is also network-enabled and therefore capable of receiving commands remotely (e.g., from the controller 1114 or the remote servers 1120). The heater may be a gas or electric heating unit normally used with pools or spas that is also network-enabled and therefore capable of receiving commands remotely (e.g., from the controller 1114 or the remote servers 1120). In some embodiments, a filtration unit 1109 may be coupled between the outlet of the pump 1108 and the input of the heater 1110.

The chemical controller 1112 may be a system for controlling the chemical balance a body of liquid such as the pool or spa 1102 that is also network enabled and therefore capable of receiving commands remotely (e.g., from the controller 1114 or the remote servers 1120). For example, the chemical controller 112 may include one or more chemical balance sensors (e.g., for sensing pH levels and chlorine levels) that periodically (e.g., at a predefined rate) compare the chemical levels of water received from the pool or spa 1102 with a standard water sample stored within the chemical controller 112 and having a desired chemical balance. If the detected chemical levels of the pool or spa water do not sufficiently correlate with those of the standard water sample, the chemical controller 1112 may automatically dispense chemicals (e.g., chlorinated or acidic fluid) into the pool or spa 1102.

In some embodiments, the chemical controller 1112 may dispense these chemicals proactively (e.g., in anticipation of or immediately following heavy rain). In some embodiments, the chemical controller 1112 may have different selectable operating modes, such as a "normal" mode and a "vacation" mode, where the chemical controller 1112 samples and analyzes water from the pool or spa 1120 less frequently in the vacation mode compared to the normal mode. As will be described below, the vacation mode may be initiated manually via commands input at a user interface of one of the user devices 1124, the controller 1114, or the chemical controller 1112 itself or may be initiated automatically when it is detected (e.g., via the splash detector 1104 and/or the motion detectors 1106) that the pool or spa 1102 has been unused for more than a predetermined time period. In this way, the use of chemicals by the chemical controller 1112 may be made more efficient, with chemical balancing of the pool or spa 1102 being performed less often while its owners are assumed or confirmed to be absent.

The splash detector 1104 may be of a type normally used in pools or spas, but that is also network enabled and therefore capable of receiving commands and sending data remotely (e.g., to and from the controller 1114 or the remote servers 1120). For example, the splash detector 1104 may include a vibration transducer securely mounted in the pool or spa 1102. The splash detector 1104 may be turned on when a person (e.g., the owner or a trusted adult) is not present to monitor the use of the pool or spa so that if an animal, person, or a sufficiently large object enters the pool or spa unexpectedly, the owner and, optionally, anyone in or around the residence adjacent to the pool or spa 1102 may be alerted via electronic messages and/or alarms. For example, the splash detector 1104 may be turned on manually via a user interface of the user devices 1124 or of the controller 1114. Alternatively, the splash detector 1104 may be turned on automatically after a predetermined time period has passed with no movement/splashing detected.

When the splash detector 1104 is on, vibrations from a splash (e.g., caused by an animal or person entering the pool or spa 1102) are hydraulically transmitted to the vibration transducer, which generates an electrical signal. The generated electrical signal may be sent to a processor of an on-board controller of the splash detector 1104, or may be transmitted to a processor of the controller 1114 or to one of the remote servers 1120. This processor may determine the magnitude of the generated electrical signal and compare that magnitude to a predetermined threshold. If the magnitude of generated electrical signal exceeds the predetermined threshold, the processor determines that a something relevant has likely entered the pool or spa 1102. Then, the processor may send an alert to one or more of the user devices 1124 and may optionally instruct the alarms 1126 to activate. The alarms 1126 may be located spa/pool-side and/or inside a residence adjacent to the pool or spa 1102. The alarms produce sound (e.g., via conventional speakers) and/or light when activated in order to alert nearby persons to the unexpected entry of a person, animal, or object into the pool or spa 1102.

The water level sensor 1105 may periodically measure the water level of the pool or spa 1102, and may generate corresponding water level data. The controller 1114 and/or the remote servers 1120 may periodically retrieve the water level data from the water level sensor through the gateway 116. In some embodiments, the water level data may be analyzed over time by the controller 1114 and/or the remote servers 1120 to determine whether it is raining. For example, a processor of the controller 1114 or of the remote servers 1120 may compare two consecutive water level measurements of the water level data. If the water level has increased between the two consecutive water level measurements, the processor determines that rain is likely occurring. If the water level has not increased between the two consecutive water level measurements, the processor determines that rain is likely not occurring.

One or more motion detectors 1106 may be disposed at one or more locations around the pool or spa 1102. The motion detectors 1106 may detect motion within their "line-of-sight" if they are light-based (e.g., infrared), microwave-based, area reflective type, or ultrasonic motion detectors. Alternatively, the motion detectors 1106 may detect nearby motion in multiple directions if they are vibration-based motion sensors. For example, the motion detectors 1106 may be positioned around the pool or spa 1102 (e.g., mounted on the ground, walls, posts, etc. around the pool or spa). When the motion detectors 1106 detect movement around the pool or spa 1102, they may send an alert to a processor of the controller 1114 or of the remote servers 1120 via electronic communication over the gateway 1116 and/or the network 1118. In response to this alert, the processor may instruct the splash detector 1104 and/or the camera 1122 to turn on via electronic communication over the gateway 1116 and/or the network 1118. In this way, the splash detector 1104 and the camera 1122 may be activated in response to motion around the pool or spa 1102, which may be indicative of a person, animal, or object that may enter the pool or spa 1102, intentionally or otherwise.

The camera 1122 may be a network-enabled video camera capable of receiving commands and sending data remotely (e.g., to and from the controller 1114 or the remote servers 1120). When activated, the camera 1122 may capture a live video stream of the general area of the pool or spa 1102, generating a stream of video data. The camera 1122 may send the stream of video data to any of the controller 1114, the user devices 1124, and the remote servers 1120, such that the video data may be viewed immediately (e.g., on an electronic display of one of the user devices 1124) or stored in a memory of the receiving device for later viewing. The camera 1122 may be activated by a command received from the controller 1114 or one of the remote servers 1120 via the gateway 1116. For example, the camera 1122 may be instructed to activate in response to the splash detector 1104 detecting that something entered the pool or spa 1102, so that the home or business owner may view a live feed of their pool or spa 1102 so that they may determine what or who has entered the pool or spa 1102 and respond accordingly.

In some embodiments, the remote servers 1120 may host or retrieve weather data (e.g., from internet-accessible dedicated weather servers), particularly weather data for a local region (e.g., city, county, zip-code, or state) in which the system 1100 is located. This weather data may include meteorological predictions (e.g., across several days/weeks) and live readings of temperature and weather for the local region. Some or all of the weather data for the local region hosted or retrieved by the remote servers 1120 may be transmitted to the controller 1114 via the gateway 1116 and the network 1118 in some embodiments. The remote servers 1120 or the controller 1114 may analyze the weather data and may control the network-enabled devices of the system 1100 based on this analysis, as will be described.

Figure 12:
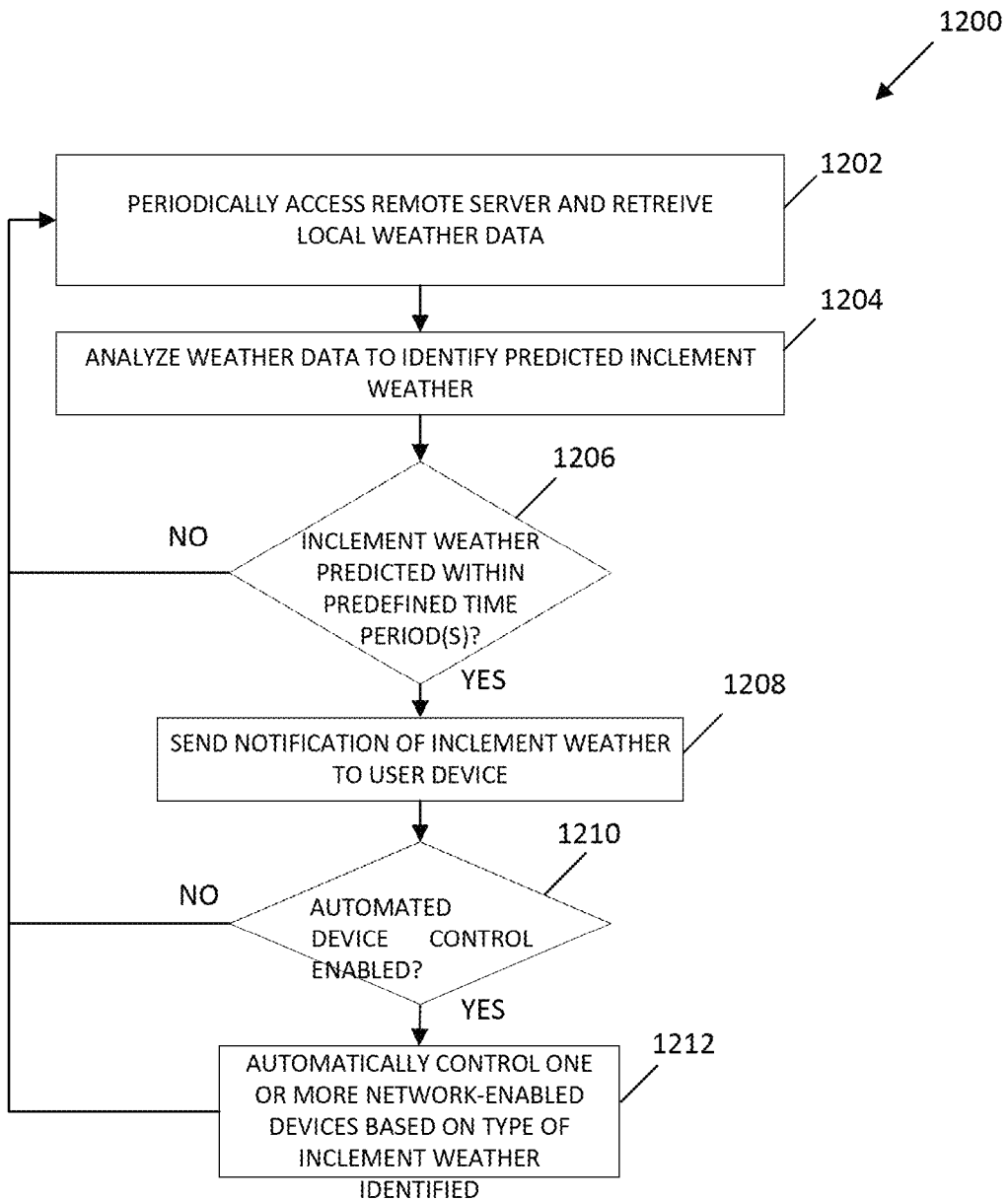
FIG. 12 is a flow chart of an example embodiment of a method that may identify inclement weather in a region and automatically control network-enabled devices based on the type of inclement weather identified.

FIG. 12 shows an illustrative method 1200 by which a remote server (e.g., remote servers 1120 of FIG. 11) may be accessed by a controller (e.g., controller 1114 of FIG. 11) via an electronic communications network (e.g., gateway 1116 and network 1118 of FIG. 11) to retrieve local weather data. The retrieved weather data may be analyzed using a processor of the controller to identify predicted inclement weather, a home or business owner may be notified of any impending inclement weather, and network-enabled devices in the owner's home or business or on the property thereof may be automatically controlled by the processor to take appropriate action in anticipation of the inclement weather. The processor may perform the method 1200 by executing computer-readable instructions stored on a memory device of the controller.

At step 1202, the processor of the controller automatically accesses the remote server and retrieves local weather data corresponding to the location of a home or business with which the controller is associated. For example, the local weather data may correspond to a particular city, county, zip code, or state. The local weather data may include real-time and predicted weather information for the area, including weather type (e.g., sunny, cloudy, partially cloudy, rain showers, thunderstorms, flood warning, tornado watch/warning, sleet, hail, snow, dust storm warning, etc.), chance of precipitation, current temperature, high temperature, and/or low temperature for various defined time periods (e.g., a 5-day forecast). In some embodiments, the local weather data may also include historical weather data, such that the processor may determine whether inclement weather has recently occurred.

At step 1204, the processor may analyze the local weather data to identify any predicted inclement weather and a predicted time at which or time period during which the inclement weather is expected to occur. In some embodiments, the processor may define inclement weather as corresponding to rain showers, thunderstorms, flood warnings, sleet, hail, and/or snow weather types.

At step 1206, if the processor identifies inclement weather from the local weather data that is predicted to occur within a predefined time period (e.g., less than three days from the present date), the method 1200 proceeds to step 1208. Otherwise, the method 1200 returns to step 1202, forming an iterative loop.

At step 1208, the processor causes an alert to be sent (e.g., via gateway 1116 and/or network 1118 of FIG. 11) to one or more user devices (e.g., user devices 1124 of FIG. 11) indicating that inclement weather has been forecast in the area of the home or business. This alert may include the type of inclement weather and when (e.g., the predicted time or time period) it is predicted to occur. For example, the alert may include a push notification sent by the processor to a software application running on the user device, a simple messaging service (SMS) message, or any other applicable text or voice alert capable of being output by the user device(s).

At step 1210, if automated device control has been enabled (e.g., by settings selected via a user interface of a user devices such as user devices 1124 of FIG. 11), the method 1200 proceeds to step 1212. Otherwise, the method 1200 returns to step 1202, forming an iterative loop.

At step 1212, the processor automatically controls (e.g., via communication of commands through gateway 1116 and/or network 1118) one or more network-enabled devices based on the weather type and predicted occurrence of the identified inclement weather. For example, the processor may instruct a sump pump system to perform a diagnostic check. As another example, the processor may instruct the chemical controller of a pool or spa to chemically balance the pool or spa soon after it rains, as the rain will have diluted the pool or spa water. As another example, the processor may instruct the chemical controller to verify chemical levels prior to a forecast rainstorm (e.g., according to method 1400 of FIG. 14) so that chemical stores may be refilled in anticipation of the aforementioned dilution. Subsequently, the method 1200 may return to step 1202 to continue periodically retrieving and analyzing local weather data.

Returning briefly to FIG. 9, in some embodiments one or more of the remote servers 918 may host local weather data corresponding to the area in which the basement 902 is located. A processor of the controller 912 or of the remote servers 918 may access this local weather data to determine if heavy rain or flooding is expected in the area (e.g., within one day). In response to identifying the impending inclement weather, the processor may instruct a diagnostic system coupled to or included in the sump pump system 906 to perform a diagnostic check. For example, the diagnostic system may be implemented as a diagnostic module running on a processor of the controller 912 or of the remote servers 918. The diagnostic check may determine the status of the sump pump system 906 by identifying, for example, whether the sump pump of the sump pump system 906 is able to successfully turn on and begin pumping and whether a battery backup of the sump pump system 906 is charged and operational. If, through this diagnostic check, the processor determines that the sump pump system 906 is not fully operational, the processor may send an alert to one or more of user devices 920 to inform the home or business owner that the sump pump needs to be prepared before the inclement weather arrives. Additionally, if automatic maintenance service requests have been enabled by the home or business owner (e.g., via a user interface accessed using one of the user devices 920), the processor may be configured to automatically contact a maintenance service (e.g., a plumber or repair service) to schedule repair of the sump pump system 906. For example, configuration data stored in a memory coupled to the processor may define whether automatic maintenance service requests are enabled, and the processor may reference the configuration data to determine whether automatic maintenance requests have been enabled. In some embodiments, the maintenance service request may request that the maintenance service be performed prior to a predicted time at which inclement weather is predicted to occur, based on weather data. The processor may further be configured to notify the home or business owner of the time and date of the scheduled repair by sending a text message or push notification to one or more of the user devices 920.

Figure 13:
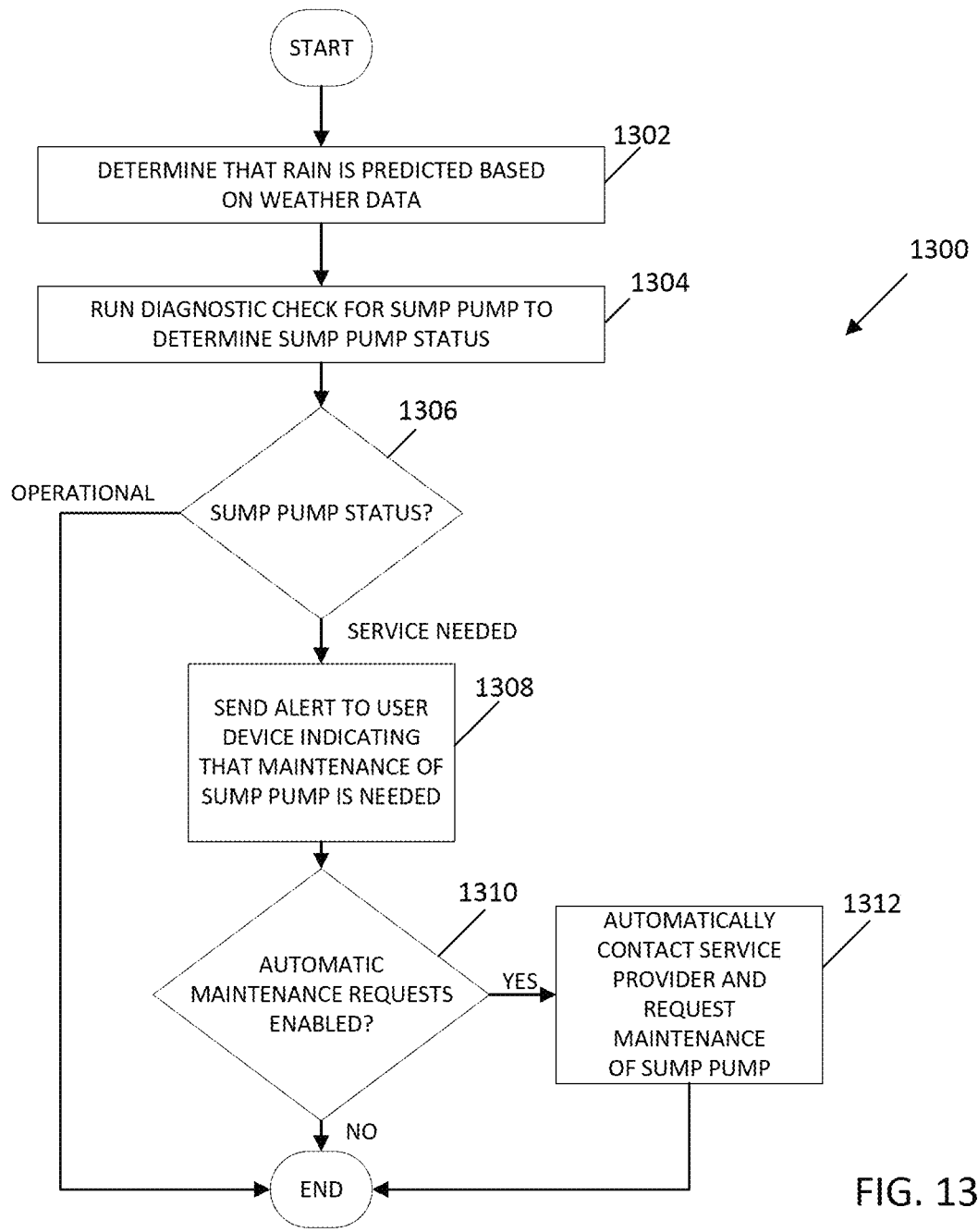
FIG. 13 is a flow chart of an example embodiment of a method that may perform a diagnostic check of a sump pump system in response to identifying predicted inclement weather.

FIG. 13 shows an illustrative method 1300 by which the status of a sump pump system (e.g., sump pump system 906 of FIG. 9) may be automatically determined via a diagnostic check in response to predicting inclement weather that may cause flooding, and by which, if the sump pump system is determined to need service, a home or business owner may be informed and a service provider may be automatically to request maintenance of the sump pump system. The method 1300 may, for example, be performed in conjunction with step 1212 of the method 1200 of FIG. 12. A processor of a controller (e.g., controller 912 of FIG. 9) or remote server (e.g., remote servers 918 of FIG. 9) may perform the method 1300 by executing computer-readable instructions stored on a memory device of the controller or server.

At step 1302, the processor determines (e.g., via communication over an electronic communications network such as network 1118 of FIG. 11) that rain or flooding is predicted to occur in the area of the sump pump system based on retrieved weather data (e.g., corresponding to steps 1202-1206 of FIG. 12).

At step 1304, the processor may cause a diagnostic check to be performed (e.g., by a diagnostic module of the processor or of an on-board processor of the sump pump system) for a sump pump (e.g., sump pump 909 of FIG. 9) of the sump pump system to determine a sump pump status. For example, the diagnostic check may verify that the sump pump can turn on and begin pumping. As another example, the diagnostic check may verify that one or more backup batteries coupled to power the sump pump in the event of a power outage are sufficiently charged. The processor may determine that the sump pump status is either "operational" or "service needed". An "operational" status indicates that the sump pump and its backup systems are capable of removing water from a basement in which the sump pump system is located in the event of a flood. A "service needed" status indicates that maintenance should be performed on the sump pump system in order to ensure its effective operation in the event of a flood. In some embodiments, the "service needed" status may include service information defining the issue or issues that need to be resolved with the sump pump system. For example, the service information may indicate that a backup battery needs to be charged or replaced, that the sump pump is not receiving power, or that the sump pump is receiving power but is not able to begin pumping.

At step 1306, if the sump pump status is "service needed", the method 1300 proceeds to step 1308. Otherwise, if the sump pump status is "operational", the method 1300 ends.

At step 1308, the processer causes an alert to be sent to (e.g., via gateway 914 and/or network 916 of FIG. 9) to one or more user devices (e.g., user devices 912 of FIG. 9) indicating that maintenance of the sump pump system is needed. This alert may include the type of maintenance that is needed and the identified problem with the sump pump system behind the need for maintenance. For example, the alert may include a push notification sent by the processor to a software application running on the user device, a simple messaging service (SMS) message, or any other applicable text or voice alert capable of being output by the user device(s).

At step 1310, the processor determines if automatic maintenance requests have been enabled. For example, automatic maintenance requests may be enabled by changing settings through a user interface of the controller or one or more of the user devices. For example, configuration data stored in a memory coupled to the processor may define whether automatic maintenance service requests are enabled, and the processor may reference the configuration data to determine whether automatic maintenance requests have been enabled. In some embodiments, the maintenance service request may request that the maintenance service be performed prior to a predicted time at which inclement weather is predicted to occur, based on weather data. If automatic maintenance requests are enabled, the method 1300 proceeds to step 1312. Otherwise, the method 1300 ends.

At step 1312, the processor retrieves service provider information from a local or remote memory and contacts the corresponding service provider. The service provider information may be defined by a user when enabling the automatic maintenance requests, and may include at least a phone number or e-mail address of the service provider and, optionally, the title and address of the service provider along with user-provided payment information. For example, the processor may cause a text message or e-mail to be sent to the service provider, or may call the service provider and play an automated message in order to request that the repair be scheduled. In some embodiments, the service provider may confirm the scheduling of the repair for a particular time and date, and in response the processor may send a text-based alert to one or more electronic devices of the user in order to inform the user of the time and date of the scheduled repairs.

Figure 14:
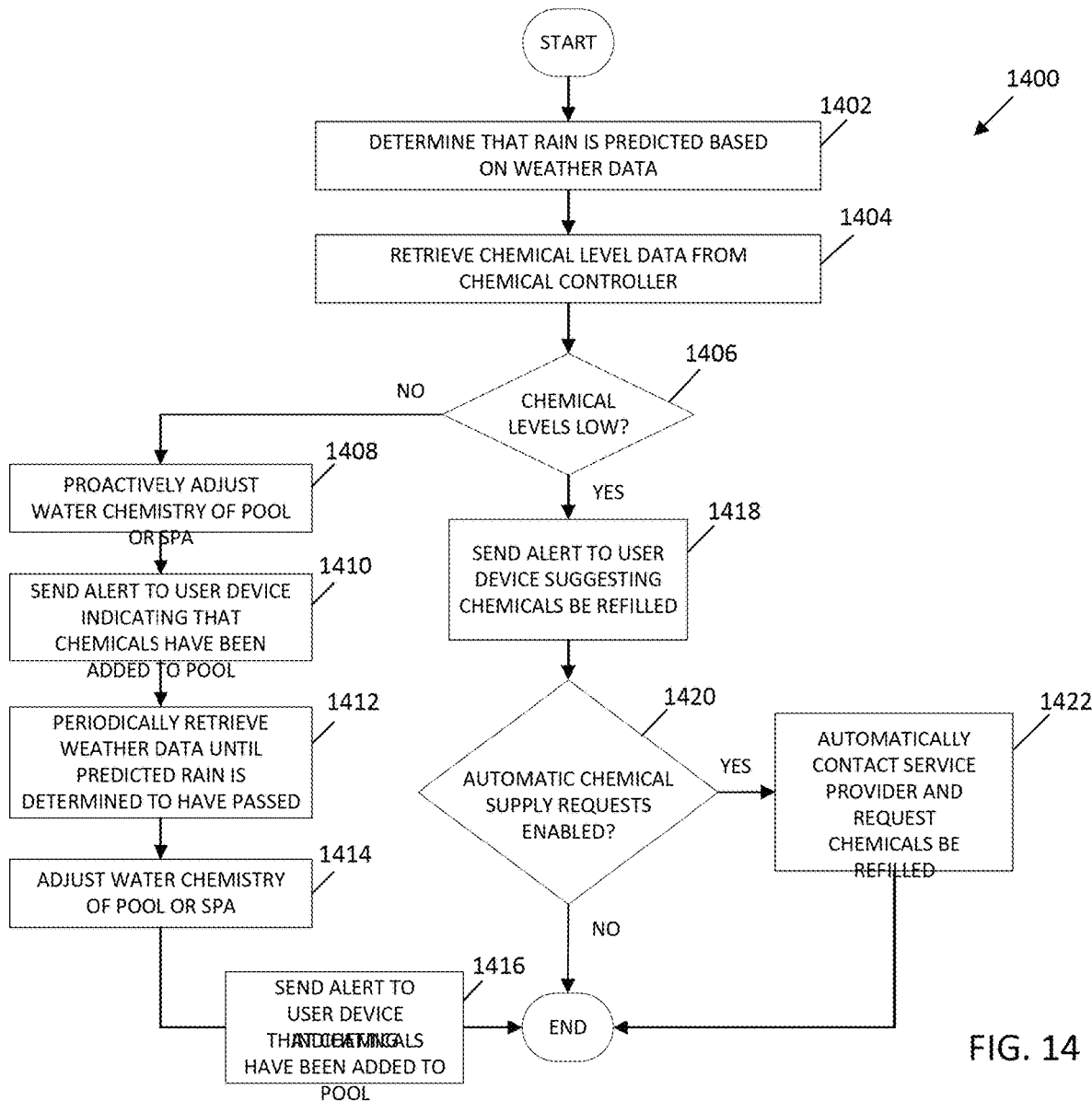
FIG. 14 is a flow chart of an example embodiment of a method that may check the chemical levels of a chemical controller of a pool or spa and proactively adjust the water chemistry of the pool or spa in response to identifying predicted inclement weather.

FIG. 14 shows an illustrative method 1400 by which the levels of chemicals of a chemical controller (e.g., chemical controller 1112 of FIG. 11) for a pool or spa (e.g., pool or spa 1102 of FIG. 11) may be determined by a processor of a controller (e.g., controller 1114 of FIG. 11) or a remote server (e.g., servers 1120 of FIG. 11) in response to determining that inclement weather is predicted in the area of the chemical controller. If the processor determines that the chemical levels are low, a home or business owner may be alerted to the need to refill the chemicals of the chemical controller and, optionally, a chemical supply service may automatically be contacted to refill the chemicals. The processor may perform the method 1400 by executing computer-readable instructions stored on a memory device of the controller.

At step 1402, the processor determines (e.g., via communication over an electronic communications network such as network 1118 of FIG. 11) that rain or flooding is predicted to occur in the area of the sump pump system based on retrieved weather data (e.g., corresponding to steps 1202-1206 of FIG. 12).

At step 1404, the processor requests and receives chemical level data from the chemical controller (e.g., via communication over the network). The chemical level data may, for example, include the amounts of chemicals (e.g., chlorine and acid) stored in containers coupled to the chemical controller 1112, as detected by level sensors or weight sensors disposed at each container.

At step 1406, the processor determines whether the chemical levels are low based on the chemical level data. For example, if the amount of chlorine in a corresponding container is determined by the processor to be lower than a predefined threshold, the processor determines that the chlorine level is low, and that additional chlorine should be added to that container. Alternatively, this threshold determination may be made by the chemical controller, and the chemical level data may simply include one or more signals may be sent to the processor to indicate whether the chemical level of for chemical is low. If the chemical levels are not low, the method 1400 proceeds to step 1408. Otherwise, if the chemical levels are low, the method 1400 proceeds to step 1418.

At step 1408, the processor instructs the chemical controller to proactively adjust the water chemistry of the pool or spa prior to the expected rainfall. In some embodiments, this adjustment may include the chemical controller oversaturating the pool or spa with chlorine or a mixture of chlorine and calcium hypochlorite. Alternatively, this oversaturation may be performed after the rainfall has occurred. In some embodiments, this adjustment may include the chemical controller adding algaecide to the pool or spa in anticipation of organic contaminants being introduced to the pool or spa during the storm.

At step 1410, the processor causes an alert to be sent to (e.g., via gateway 1116 and/or network 1118 of FIG. 11) to one or more user devices (e.g., user devices 1124 of FIG. 11) indicating that chemicals have been added to the pool or spa by the chemical controller. This alert may include the type and amount of chemicals added. For example, the alert may include a push notification sent by the processor to a software application running on the user device, a simple messaging service (SMS) message, or any other applicable text or voice alert capable of being output by the user device(s). The alert may inform the home or business owner that the pool or spa should not be used for a predetermined amount of time subsequent to the oversaturation of the pool or spa with chlorine.

At step 1412, the processor periodically retrieves and analyzes weather data (e.g., similarly to step 1202 of FIG. 12) and determines when the rain predicted at step 1402 has occurred and passed. For example, a water level sensor (e.g., water level sensor 1105, FIG. 11) in the pool or spa may monitor the water level of the pool periodically and may generate corresponding water level data. The processor may periodically retrieve and analyze the water level data from the water level sensor. The processor may determine that rain is occurring if the water level data indicates that the water level has increased between two consecutive time periods. The processor may subsequently determine that the rain has stopped when the water level data indicates that the water level of the pool has stopped increasing (e.g., that the water level of the pool has stayed the same between two consecutive time periods).

At step 1414, the processor instructs the chemical controller to adjust the water chemistry of the pool or spa after rainfall has occurred. In some embodiments, this adjustment may include the chemical controller oversaturating the pool or spa with chlorine or a mixture of chlorine and calcium hypochlorite. Alternatively, this oversaturation may be performed prior to the occurrence of rainfall. The chemical controller may rebalance the chemical levels in the pool or spa after a predetermined amount of time has passed since oversaturating the pool or spa with chlorine or the mixture. In some embodiments, this adjustment may include the chemical controller adding algaecide to the pool or spa in anticipation of organic contaminants being introduced to the pool or spa during the storm.

At step 1416, the processor causes an alert to be sent to (e.g., via gateway 1116 and/or network 1118 of FIG. 11) to one or more user devices (e.g., user devices 1124 of FIG. 11) indicating that chemicals have been added to the pool or spa by the chemical controller. This alert may include the type and amount of chemicals added. The alert may inform the home or business owner that the pool or spa should not be used for a predetermined amount of time subsequent to the oversaturation of the pool or spa with chlorine.

At step 1418, in response to detecting low chemical levels, the processor causes an alert to be sent to (e.g., via gateway 1116 and/or network 1118 of FIG. 11) to one or more user devices (e.g., user devices 1124 of FIG. 11) indicating that the supply of chemicals of the chemical controller should be refilled. This alert may include the type and amount of chemicals that need to be refilled. The alert may provide a time frame within which the chemicals should be refilled (e.g., corresponding to a time period leading up to the predicted occurrence of rain, as determined by the processor from the weather data).

At step 1420, the processor determines if automatic chemical supply requests (sometimes referred to herein generally as "automatic service requests") have been enabled. For example, automatic chemical supply requests may be enabled by changing settings through a user interface of the controller or one or more of the user devices. For example, configuration data stored in a memory coupled to the processor may define whether automatic chemical supply requests are enabled, and the processor may reference the configuration data to determine whether automatic maintenance requests have been enabled. In some embodiments, the maintenance service request may request that the maintenance service be performed prior to a predicted time at which inclement weather is predicted to occur, based on weather data. If automatic chemical supply requests are enabled, the method 1400 proceeds to step 1422. Otherwise, the method 1400 ends.

At step 1422, the processor retrieves service provider information (e.g., for a chemical supply service) from a local or remote memory and contacts the corresponding service provider. The service provider information may be defined by a user when enabling the automatic chemical supply requests, and may include at least a phone number or e-mail address of the service provider and, optionally, the title and address of the service provider along with user-provided payment information. For example, the processor may cause a text message or e-mail to be sent to the service provider, or may call the service provider and play an automated message in order to request that the repair be scheduled. In some embodiments, the service provider may confirm the scheduling of the resupply of chemicals of the chemical controller for a particular time and date (e.g., prior to the predicted occurrence of rainfall), and in response the processor may send a text-based alert to one or more electronic devices of the user in order to inform the user of the time and date of the scheduled repairs.

Figure 15:
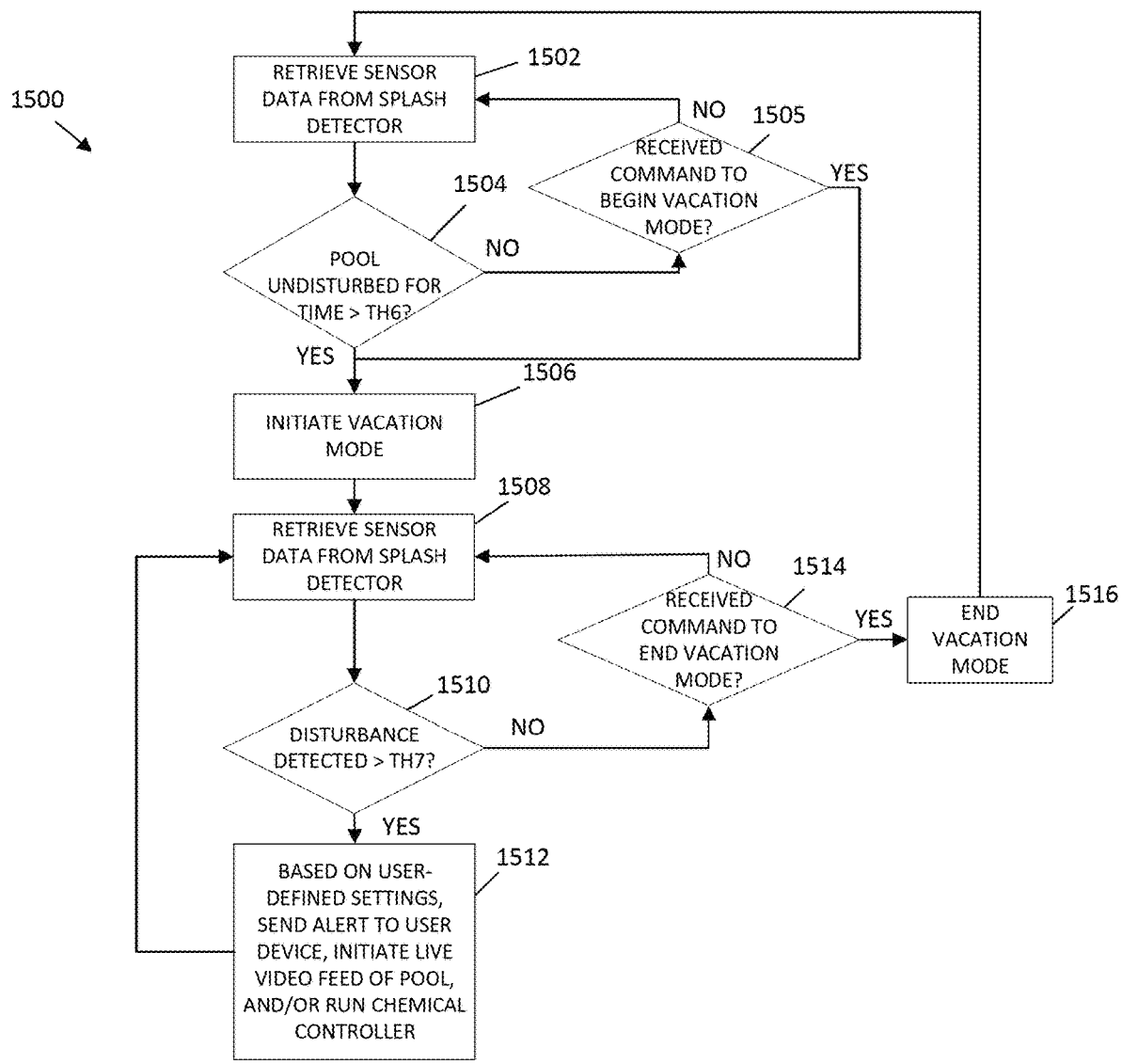
FIG. 15 is a flow chart of an example embodiment of a method that may monitor activity in a pool or spa to initiate or end a vacation mode.

FIG. 15 shows an illustrative method 1500 by which a vacation mode may be initiated for a pool (e.g., pool or spa 1102 of FIG. 11) by a processor of a controller (e.g., controller 1114 of FIG. 11) or a remote server (e.g., servers 1120 of FIG. 11) in response to determining, based at least on signals received from a splash detector of the pool (e.g., splash detector 1104 of FIG. 11), that the pool has remained undisturbed for longer than a predefined threshold TH6, or in response to receiving a user-provided command to begin vacation mode. The processor may perform the method 1500 by executing computer-readable instructions stored on a memory device of the controller.

At step 1502, the processor retrieves sensor data from the splash detector. For example, the processor may receive this data from the splash detector via electronic communication over a network (e.g., network 1118 and/or gateway 1116 of FIG. 11). The sensor data may include a measure of how much time has passed since a disturbance was last detected by the splash detector (i.e., how long the pool has remained undisturbed).

At step 1504, the processor analyzes the sensor data to determine whether the pool has been undisturbed for more than a predetermined threshold TH6. If so, the method 1500 proceeds to step 1506, otherwise, the method proceeds to step 1505.

At step 1505, the processor determines whether a command has been received to begin vacation mode. For example, this command may be received from a user device (e.g., one of the user devices 1124 of FIG. 11) via the network in response to user input at a user interface of the user device. If no such command has been received by the processor, the method 1500 returns to step 1502. Otherwise, the method proceeds to step 1506.

At step 1506, the processor initiates vacation mode (e.g., by asserting a flag or other status indicator in a memory device coupled to the processor). At step 1508, the processor periodically retrieves sensor data from the splash detector, as in step 1502.

At step 1510, the processor determines if the magnitude of a disturbance detected by the splash detector and reflected in the retrieved sensor data exceeds a threshold TH7 (e.g., a predetermined disturbance threshold). If so, the method 1500 proceeds to step 1512. Otherwise, the method 1500 proceeds to step 1514.

At step 1512, based on user defined settings, the processor may perform a variety of tasks in response to determining that a sufficiently large disturbance has been detected in the pool by the splash detector. For example, the processor may cause an alert to be sent to a user device (e.g., user devices 1124 of FIG. 11) in the form of a text message or push notification. The alert may indicate that something has been detected in the pool. As another example, the processor may initiate a live video feed of the pool by activating a camera (e.g., camera 1122 of FIG. 11), which may stream video data to the user device and/or store recorded video in a memory device of the controller or remote server. As another example, the processor may activate a chemical controller (e.g., chemical controller 1112 of FIG. 11) for the pool, which may check the chemical balance of the pool and, if necessary, add chemicals to the pool.

At step 1514, the processor determines whether a command has been received (e.g., from the user device) to end vacation mode. If so, the method 1500 proceeds to step 1516. Otherwise, the method 1500 returns to step 1508.

At step 1516, the processor ends vacation mode (e.g., by de-asserting a flag or other status indicator in a memory device coupled to the processor). The method 1500 then returns to step 1502.

Figure 16:
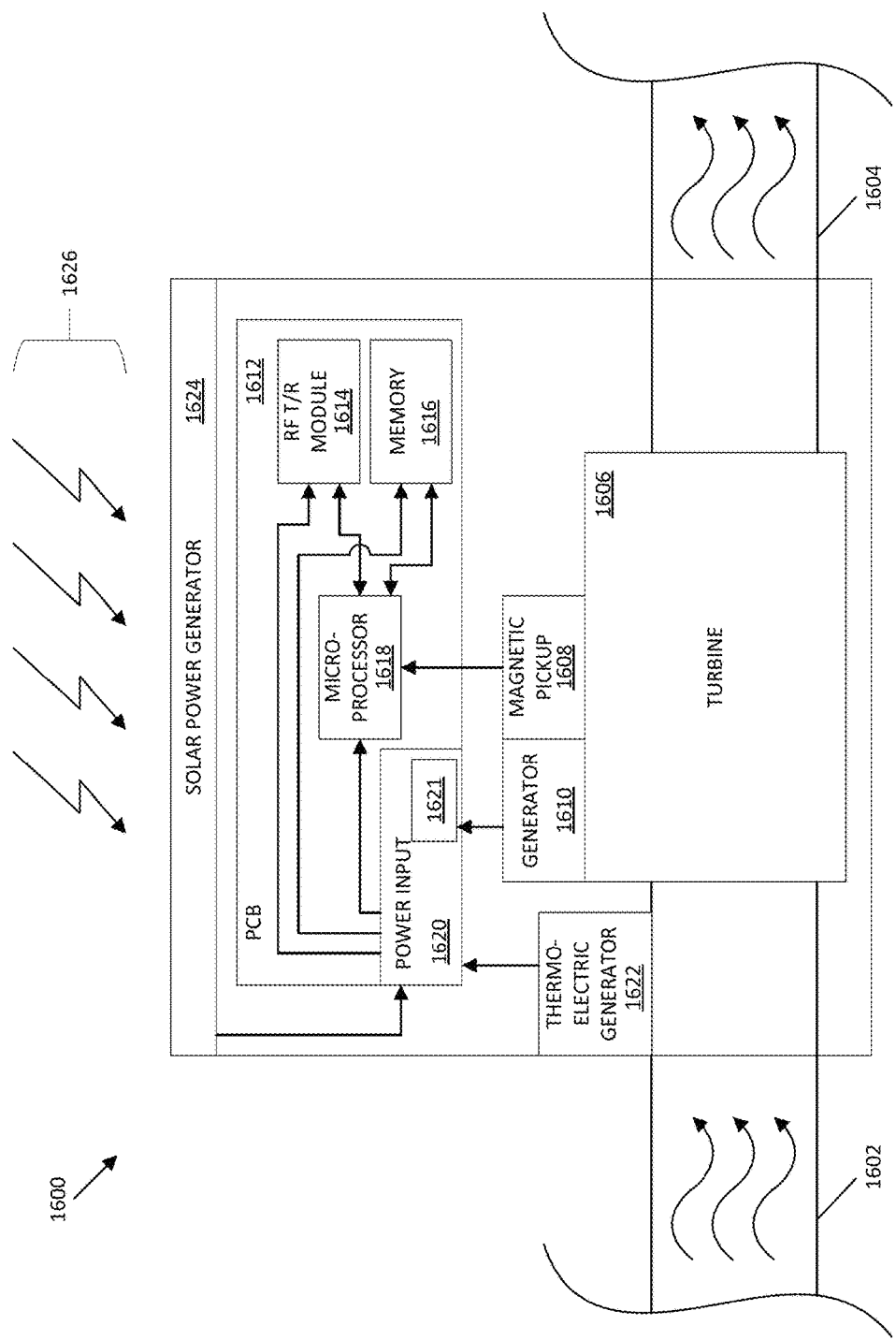
FIG. 16 is a block diagram of an example embodiment of a flow meter that may include hydroelectric, thermoelectric, and/or solar power generators.

FIG. 16 shows an illustrative flow meter 1600, which may detect the flow rate of water passing through it. The flow meter 1600 may be powered by renewable electricity sources, which may improve the flexibility with which the flow meter 1600 may be installed in a water system (e.g., as it may not be necessary to run wires to provide power to the flow meter 1600) and may provide a more eco-friendly alternative to traditional, non-renewable electricity sources. In some embodiments, any of the flow meters 642, 648, 650, 656, 660, and 664 of FIG. 6, the flow meters 1706 and 1716 of FIG. 17, and the flow meter 2006 of FIG. 20 may correspond to the flow meter 1600.

The flow meter 1600 may receive water from an inlet coupled to a pipe 1602 and may output water to an outlet coupled to a pipe 1604. The flow meter 1600 may include a turbine 1606, a magnetic pickup 1608 coupled to the turbine 1606, a generator 1610 (sometimes referred to as the hydroelectric generator 1610) coupled to the turbine 1606, a printed circuit board (PCB) 1612, a thermoelectric generator 1622, and a solar power generator 1624 (sometimes referred to as the solar powered electric generator 1624). The PCB 1612 may include a radio frequency (RF) transmit/receive (T/R) module 1614, a memory 1616, a microprocessor 1618, and power input circuitry 1620.

The turbine 1606 may include turbine blades coupled to a rotor via a shaft. The turbine blades may be turned by water flowing through the flow meter 1600. The turbine blades or the rotor and the rotor may include ferromagnetic material (e.g., steel or iron). The rotational speed of the rotor may be directly proportional to the velocity of the water. The magnetic pickup 1608 may include a coil wound around a permanently magnetized probe that is disposed near either the turbine blades or the rotor of the turbine 1606, such that as the ferromagnetic blades of the turbine 1606 turn, they pass through the magnetic field of the magnetic pickup 1608, modulating the flux density of the magnetic field and inducing voltages in the coil of the magnetic pickup 1608. For example, a voltage may be induced in the coil of the magnetic pickup 1608 each time a turbine blade passes in close proximity to the probe. The time between induced voltages is indicative of the rotational speed of the turbine 1606, which is linearly proportional to the flow rate through the flow meter 1600. The coil of the magnetic pickup 1608 may be coupled to the microprocessor 1618 of the PCB 1612, which logs the voltages induced in the coil and converts them to flow rate data that may be stored in the memory 1616 for subsequent retrieval by the processor of a controller (e.g., controller 602 of FIG. 6) or remote server (e.g., remote servers 608 of FIG. 6) via an electronic communications network (e.g., network 606 and/or gateway 604 of FIG. 6).

The generator 1610 may be a hydroelectric generator coupled to the turbine 1606. For example, the generator 1610 may include a stator that includes loops of wire wrapped around magnetic metal (e.g., steel or iron) laminations (e.g., field poles), which may be mounted around a perimeter of the rotor, the outer surface of which may include multiple pairs of electromagnets or permanent magnets. As the rotor turns, the magnets of the rotor distort and cut through the magnetic field of the magnetic metal laminations of the stator, which drives alternating electric current in the loops of wire wrapped around these laminations. These loops of wire may be coupled to the power input circuitry 1620, such that when electric current is generated in the loops of wire by the rotation of the rotor, electric charge may be stored in energy storage circuitry 1621 of the power input circuitry 1620. In this way, the hydroelectric generator 1610 may convert/transform kinetic energy corresponding to the rotation of the turbine 1606 into electrical energy.

In some embodiments, the magnetic pickup 1608 may be omitted and the electric currents or voltages output by the generator 1610 may be measured, logged, and converted into a flow rate by the microprocessor 1618. This conversion is achievable because the amount of power output by the generator 1610 is proportional to the flow rate of water passing through the flow meter 1600. The microprocessor 1618 may store the measured currents or voltages and the flow rate in the memory 1616.

The thermoelectric generator 1622 may be disposed at a surface of the pipe 1602. If the pipe 1602 contains water that is colder or hotter than the ambient temperature (i.e. if the surface of the pipe 1602 is hotter or colder than the air around the pipe 1602), this creates a heat flux through the thermoelectric generator, which causes electric power to be generated via the Seebeck effect. The thermoelectric generator 1622 may be coupled to the power input circuitry 1620, such that electric power generated by the thermoelectric generator 1622 is routed to the power input circuitry 1620, where it may utilized immediately (e.g., to power the microprocessor 1618 or the RF T/R module 1614) or may be stored in the energy storage circuitry 1621 for later use. In this way, the thermoelectric generator may convert/transform thermal energy of the pipe 1602 into electrical energy.

The solar power generator 1624 may include one or more arrays of photovoltaic cells (e.g., amorphous or crystalline silicon solar cells), which generate electrical charge when exposed to light 1626 via the photovoltaic effect. Electrical charge generated by the photovoltaic cells is routed to the power input circuitry 1620, where it may utilized immediately (e.g., to power the microprocessor 1618 or the RF T/R module 1614) or may be stored in the energy storage circuitry 1621 for later use. In this way, the solar power generator 1624 may convert/transform photon energy corresponding to the light 1626 into electrical energy.

The energy storage circuitry 1621 of the power input circuitry 1620 may include one or more batteries and/or capacitors, which may collect and store electrical charge generated by the thermos-electric generator 1622, the solar power generator 1624, and the generator 1610. In some embodiments, one or more batteries of the energy storage circuitry 1621 may be replaceable, pre-charged batteries that may provide power to the PCB 1612 at times when renewable energy sources are not sufficient to provide enough power to operate the RF T/R module 1614, for example.

The RF T/R module 1614 may include a signal generator and an at least one antenna and may be configured to send and receive data to and from other wireless communications devices (e.g., gateway 604 of FIG. 6) via a wireless communication protocol such as Bluetooth® (i.e., short-wavelength ultra high frequency [UHF] radio waves in the industrial, scientific, and medical [ISM] band from 2.4 to 2.485 GHz) or WiFi® (i.e., UHF radio waves in the 2.4 GHz ISM band). In response to instructions received from the microprocessor 1618, the signal generator of the RF T/R module 1614 may generate a data signal that is then sent to the antenna of the T/R module 1614, which transmits the data signal to another wireless communications device. The antenna of the T/R module 1614 may also receive data signals from another wireless communications device, which may be processed and sent to the microprocessor 1618 by the RF T/R module 1614.

The T/R module 1614 generally consumes more power when transmitting data signals compared to receiving data signals. Additionally, the generators 1610, 1622, and 1624 may not constantly generate electric power (e.g., in the absence of water flow, heat, or light, respectively). Thus, in some embodiments, the microprocessor 1618 may wait until enough charge (e.g., above a predetermined charge threshold) has been accumulated in the energy storage circuitry 1621 before transmitting a data signal (e.g., that includes flow rate data) with the RF T/R module 1614.

Because the flow meter 1600 does not require an external source of electrical power, a home or business owner may have more flexibility choosing where to install the flow meter 1600 compared to conventional flow meters. Additionally, by utilizing renewable energy sources to generate electrical power for the flow meter 1600 with the generators 1610, 1622, and 1624, the flow meter 1600 may be more environmentally friendly than conventional flow meters.

In order to reduce the net water usage of a water system of a home or business, it may be desirable to recycle so-called "grey water" (i.e., wastewater generated from sources other than toilets, such as sinks, showers, baths, clothes, washing machines, or dish washers) for re-use in non-potable water applications such as toilet flushing and yard irrigation. In addition to grey water, water from other sources such as atmospheric water generators, dehumidifiers, snow melt, and rain may also be reclaimed and used for such non-potable applications.

Figure 17:
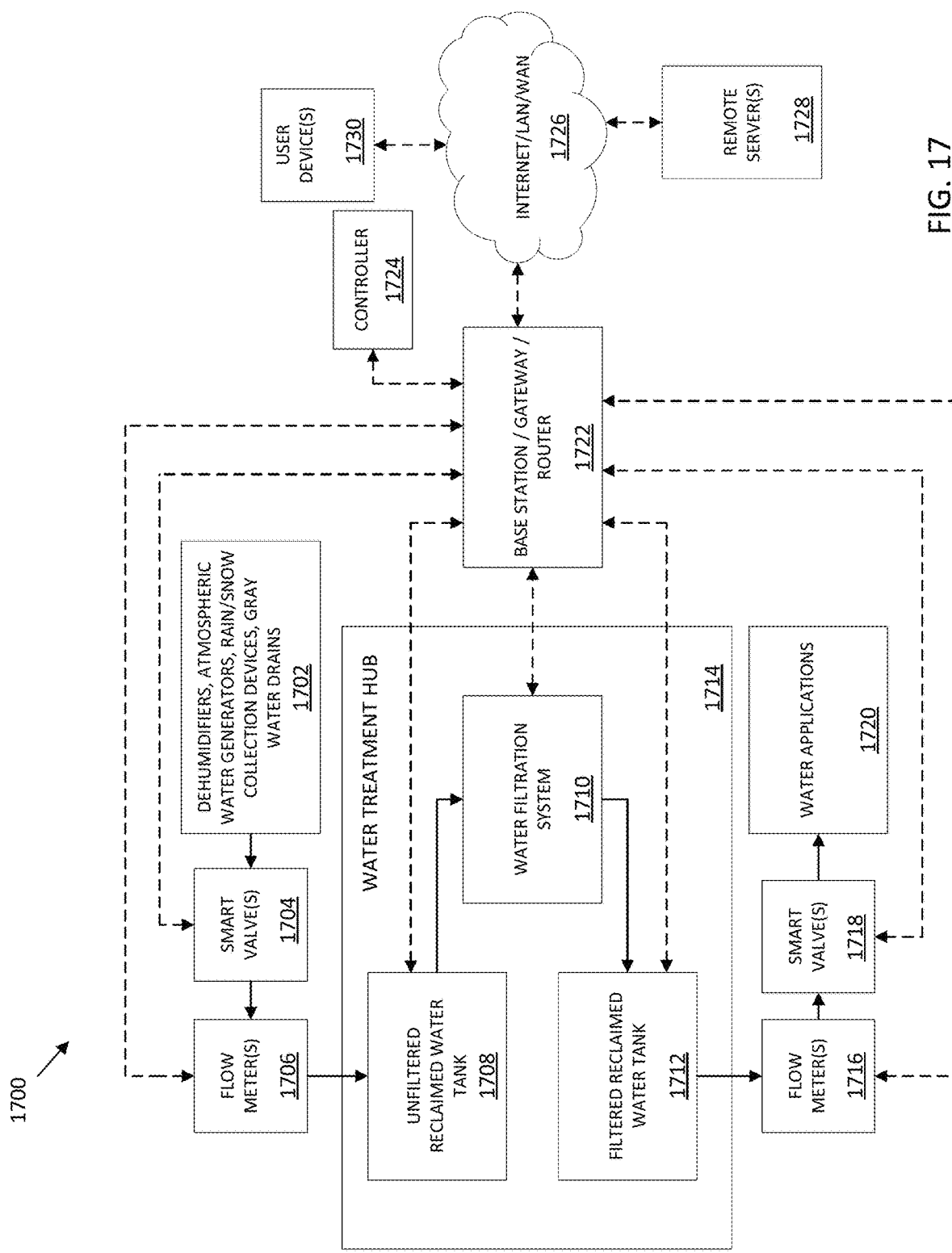
FIG. 17 is a block diagram of an example embodiment of a water treatment hub that may store reclaimed water for use in non-potable water applications.

FIG. 17 shows a system 1700 by which water may be reclaimed, treated, and stored for reuse in non-potable water applications. Reclaimed water may be collected from various reclaimed water sources 1702 of a water reclamation system, which may include atmospheric water generators, dehumidifiers, rain and snow collection devices, and gray water drains. In some embodiments, water sources 1702 may be capable of reclaiming so much water the home or business that includes the system 1700 may be considered to have net-zero water usage (e.g., where the amount of water used does not exceed the amount of water reclaimed), For example, depending on their size, atmospheric water generators may produce over 100 gallons of water per day. As another example, about 60% of the water used in a home or business may be reclaimed through gray water drains. One or more flow meters 1716 and one or more smart valves 1718 may be coupled between the sources 1702 and the unfiltered reclaimed water tank 1708 so that the flow of water between the sources 1702 and the tank 1708 may be monitored and controlled (e.g., by a processor of the controller 1724 or the remote servers 1728).

The water treatment hub 1714 may include an unfiltered reclaimed water tank 1708, which stores reclaimed water collected from the sources 1702. The tank 1708 may include a network-enabled water level sensor that determines the level of unfiltered reclaimed water in the tank 1708. Unfiltered reclaimed water may be pumped from the tank 1708 into a water filtration system 1710 (e.g., water filtration system 614 of FIG. 6 or another applicable water filtration system), which may filter out at least a portion of contaminants that may be present in the unfiltered reclaimed water. The water filtration system 1710 may output filtered reclaimed water to a filtered reclaimed water tank 1712 for storage. The tank 1712 may include a network-enabled water level sensor that determines the level of unfiltered reclaimed water in the tank 1712. The filtered reclaimed water tank 1712 may be coupled to one or more predefined or user-defined water applications 1720, which may include an irrigation system and toilets, for example. One or more flow meters 1716 and one or more smart valves 1718 may be coupled between the filtered reclaimed water tank 1712 and the water applications 1720 so that the flow of water between the tank 1712 and the applications 1720 may be monitored and controlled (e.g., by a processor of the controller 1724 or the remote servers 1728).

The flow meters 1706 and 1716, the smart valves 1704 and 1718, the water filtration system 1710, the water level sensors of the tanks 1708 and 1712, and a controller 1724 may be network-enabled devices (e.g., coupled to or including an IoT device such as the IoT device 200 of FIG. 2) coupled to and in electronic communication with a gateway 1722 (e.g., gateway 320 of FIG. 3), which may be alternatively referred to as a base station or a router. The gateway 1722 may be coupled to and in electronic communication with one or more user devices 1730 and one or more remote servers 1728 through a network 1726, which may be a LAN, WAN, or the internet, for example. The gateway 1722 may route electronic communications between the network-enabled devices of the system 1700.

The controller 1724 may periodically retrieve water level data generated by the water level sensors of the tanks 1708 and 1712 to determine their respective water levels. If the controller 1724 determines that the unfiltered reclaimed water tank 1708 is full (e.g., that the water level in the tank 1708 exceeds a threshold TH8), the controller 1724 may control the smart valves 1704 to block water from flowing from the sources 1702 to the tank 1708 so that the tank 1708 does not overflow. While the smart valves 1704 are closed, water from the sources 1702 may be rerouted to a drain of the building that houses the system 1700. Similarly, the controller 1724 may determine that the filtered reclaimed water tank 1712 is full based on the water level data generated by its water level sensor and, in response, may instruct the water filtration system 1710 to cease operation (e.g., turning off a pump of the water filtration system 1700 that pumps water from the tank 1708 into the water filtration system 1700) so that the tank 1712 does not overflow.

In some embodiments, in order to reduce the amount of biological contamination of the reclaimed water, the controller 1724 may periodically "flush" (i.e., empty) the unfiltered reclaimed water tank 1708 and/or the filtered reclaimed water tank 1712. For example, if the controller 1724 determines that water has been allowed to stagnate in the unfiltered reclaimed water tank 1708 (e.g., based on detecting that the water level of the tank 1708 has not decreased according to water level data generated by the water level sensor of the tank 1708 and retrieved by the controller 1724) for more than 24 hours, the controller may drain all of the water out of the tank 1708 without passing it into the water filtration system 1710. This avoids burdening the water filtration system 1710 with unfiltered reclaimed water having excessive bacterial contamination. It should be noted that this flushing may not be necessary, depending on the quality of the water filtration system 1710. For example, flushing the tanks 1708 and 1712 may not be necessary if the water filtration system 1710 treats the unfiltered reclaimed water with antibacterial and antimicrobial chemicals.

Figure 18:
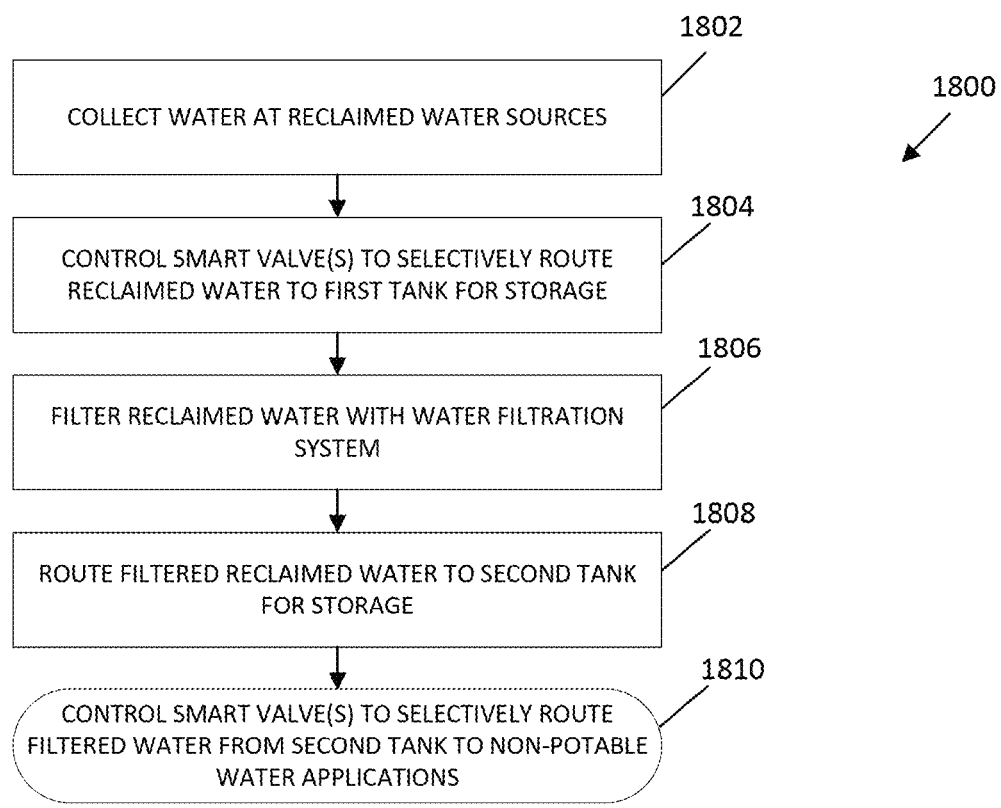
FIG. 18 is a flow chart of an example embodiment of a method of operating a water treatment hub.

FIG. 18 shows an illustrative method 1800 by which water may be collected at reclaimed water sources (e.g., sources 1702 of FIG. 17), filtered by a water filtration system (e.g., by water filtration system 1710 of FIG. 17), stored in tanks (e.g., in tanks 1708 and 1712 of FIG. 17) and used in water applications (e.g., applications 1720 of FIG. 17). Steps 1804 and 1810 of the method 1800 may be performed by executing computer readable instructions with a computer processor (e.g., a processor of the controller 1724 or of the remote servers 1728 of FIG. 17).

At step 1802, water is collected at reclaimed water sources. This collection may include the collection of rain water or snow melt, the collection of grey water at grey water drains, the collection of water produced as a byproduct of operating a dehumidifier, and the collection of water produced by an atmospheric water generator (e.g., which may be installed inside the home or business or outdoors) that extracts water from surrounding air. At step 1804, the processor communicates (e.g., via network 1726 and/or gateway 1722 of FIG. 17) with one or more smart valves (e.g., smart valves 1704 of FIG. 17), controlling the smart valves to open so that the reclaimed water is selectively routed from one or more of the reclaimed water sources to a first tank (e.g., unfiltered reclaimed water tank 1708 of FIG. 17) for storage.

At step 1806, the water filtration system receives and filters the unfiltered reclaimed water from the first tank to produce filtered reclaimed water. At step 1808, the water filtration system outputs the filtered reclaimed water to a second tank (e.g., filtered reclaimed water tank 1712 of FIG. 17) for storage. At step 1810, the processor communicates with one or more smart valves (e.g., smart valves 1718 of FIG. 17), controlling the smart valves to open so that the filtered reclaimed water is selectively routed to one or more water applications (e.g., water applications 1720 of FIG. 17), where the filtered reclaimed water may be used for irrigation or flushing toilets, for example.

Figure 19:
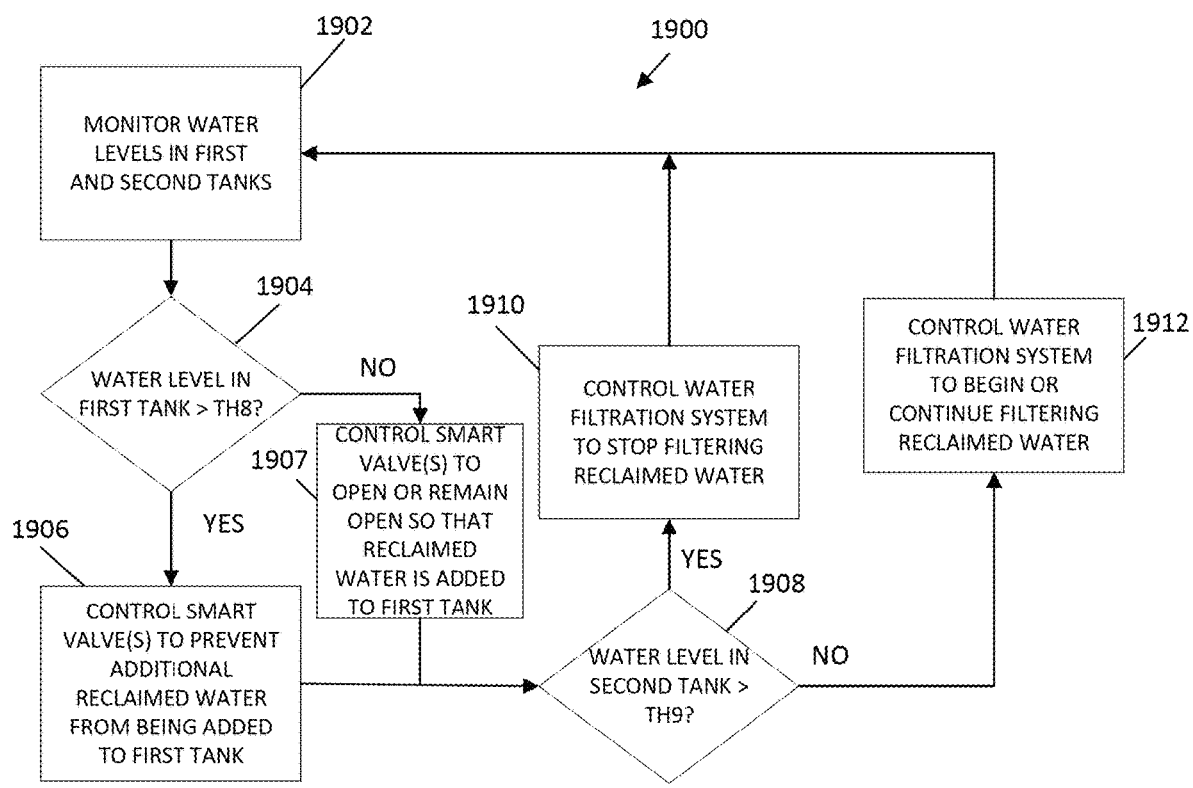
FIG. 19 is a flow chart of an example embodiment of a method of selectively blocking and unblocking the flow of water to reclaimed water storage tanks to prevent overflow.

FIG. 19 shows an illustrative method 1900 by which tank overflow may be prevented in a water treatment system (e.g., system 1700 of FIG. 7). The rate at which reclaimed water is collected and stored in a water treatment system, the rate at which this reclaimed water is filtered, and the rate at which the filtered reclaimed water is used in non-potable water applications will generally each differ. As the tanks of the water treatment hub (e.g., water treatment hub 1714 of FIG. 17) can only hold a finite amount of water, it may be necessary to control the flow of water to, from, and within the water treatment hub in order to prevent the tanks from overflowing due to asymmetrical collection, filtering, and use of reclaimed water. The method 1900 may be performed by executing computer readable instructions with a computer processor (e.g., a processor of the controller 1724 or of the remote servers 1728 of FIG. 17).

At step 1902, the processor monitors water levels in first and second tanks. The first tank (e.g., tank 1708 of FIG. 17) may store unfiltered reclaimed water and may be coupled between reclaimed water sources and a water filtration system (e.g., water filtration system 1710 of FIG. 17). The second tank (e.g., tank 1712 of FIG. 17) may be coupled between the water filtration system and non-potable water applications and may store filtered reclaimed water output by the water filtration system. The processor may monitor the water levels in the first and second tanks by communicating (e.g., via network 1726 and/or gateway 1722 of FIG. 17) with network-enabled water level sensors disposed in each of the first and second tanks to retrieve water level data.

At step 1904, the processor analyzes the water level data retrieved from the sensor of the first tank to determine whether the water level of the first tank exceeds a threshold TH8 at which the first tank would be completely or nearly full. If so, the method 1900 proceeds to step 1906. Otherwise, the method 1900 proceeds to step 1907.

At step 1906, the processor communicates with smart valves (e.g., smart valves 1704 of FIG. 17) coupled between various reclaimed water sources (e.g., sources 1702 of FIG. 17) and the first tank, instructing them to close in order to prevent additional reclaimed water from being routed to the first tank from the reclaimed water sources and, optionally, rerouting water output from the reclaimed water sources to one or more drains of the system.

At step 1907, the processor communicates with the smart valves coupled between the reclaimed water sources and the first tank, instructing them to open in order to allow reclaimed water to be routed to the first tank from the reclaimed water sources. In this way, reclaimed water flow into the first tank may be reestablished when the processor determines that the first tank is no longer full.

At step 1908, the processor analyzes the water level data retrieved from the sensor of the second tank to determine whether the water level of the second tank exceeds a threshold TH9 at which the second tank would be completely or nearly full. If so, the method 1900 proceeds to step 1910. Otherwise, the method 1900 proceeds to step 1912.

At step 1910, the processor communicates with the water filtration system, instructing it to stop filtering reclaimed water from the first tank in order to prevent additional reclaimed water from being output by the water filtration system to the second tank. The method 1900 may then return to step 1902, forming an iterative loop.

At step 1912, the processor communicates with the water filtration system, instructing it to begin or continue filtering reclaimed water received from the first tank. In this way the flow of filtered reclaimed water from the water filtration system into the second tank may be reestablished when the processor determines that the second tank is no longer full. The method 1900 may then return to step 1902, forming an iterative loop.

Figure 20:
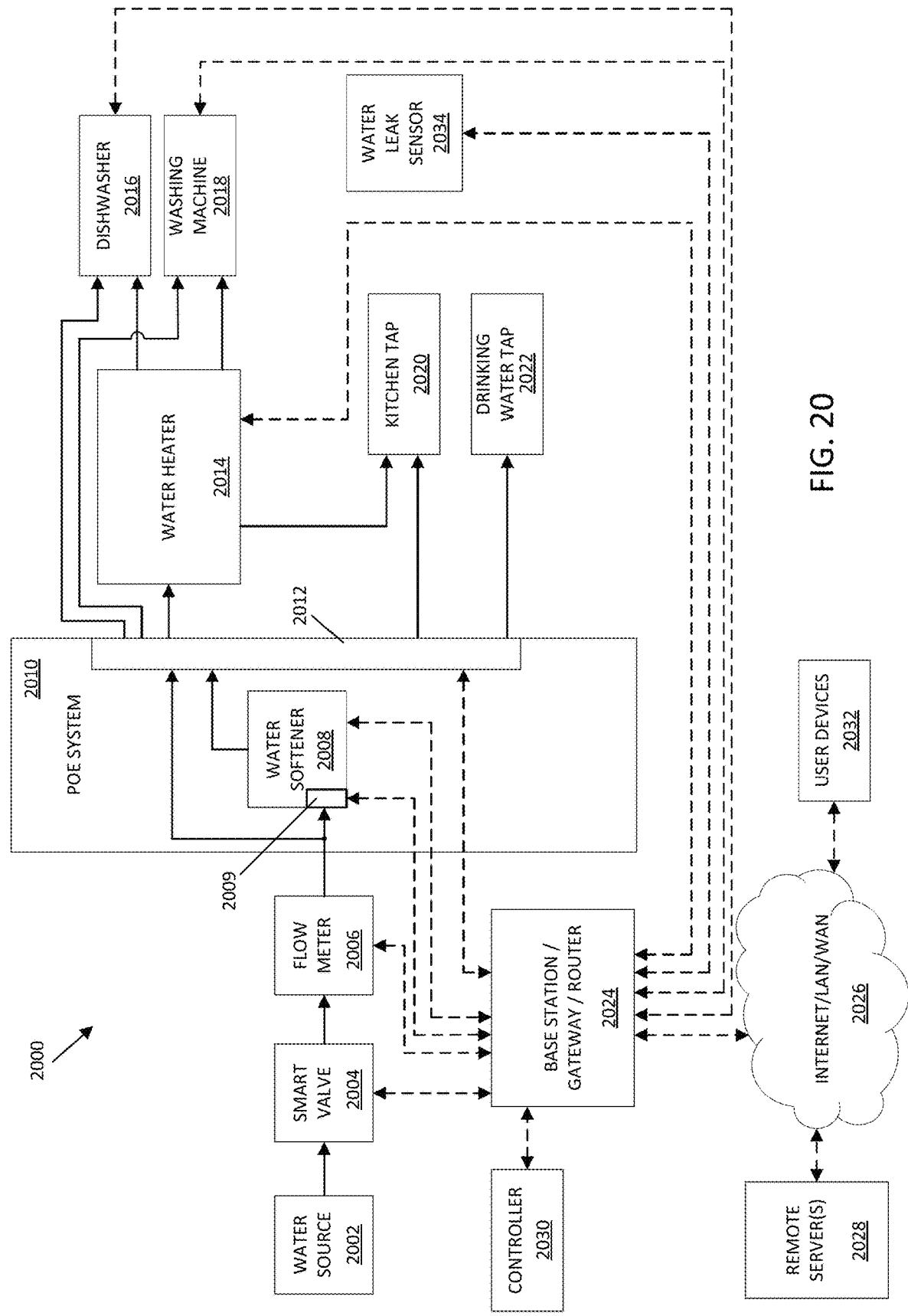
FIG. 20 is a block diagram of an example embodiment of a communication system and a water system having a point of entry system that includes a water softener and a smart manifold.

FIG. 20 shows an illustrative system 2000 by which water may be selectively softened and routed through a Point of Entry (POE) system 2010 to network-enabled appliances. As shown, the system 2000 includes many network-enabled devices, including a smart valve 2004, a flow meter 2006, a water softener 2008, an input valve 2009 of the water softener 2008, a smart manifold 2012, a water heater 2014, a dishwasher 2016, a washing machine 2018, a controller 2030, and a water leak sensor 2034. Each of these network-enabled devices may include or be correspond to an IoT device (e.g., IoT device 200 of FIG. 2), enabling communication between each network-enabled device and a gateway 2024 (e.g., the gateway 320 of FIG. 3), which may be alternatively referred to as a base station or a router. One or more remote servers 2028 and one or more user devices 2032 may be coupled to gateway 2024 through a network 2026, which may be a LAN, WAN, or the internet. The user devices 2032 may include personal computers, tablets, smart phones, etc. The gateway 2024 may route electronic communications between any of the network-enabled devices to which it is coupled.

The POE system 2010 may include the water softener 2008 (e.g., which may correspond to the water softener system 652 of FIG. 6) and the smart manifold 2012 (e.g., which may correspond to the manifold 628 of FIG. 6). The input of the POE system 2010 may be coupled to a water source 2002 (e.g., which may correspond to the water source 612 of FIG. 6). The smart valve 2004 and the flow meter 2006 (e.g., which may correspond to the flow meter 1600 of FIG. 16) may be coupled between the water source 2002 and the input of the POE system 2010. The controller 2030 may communicate with the smart valve 2004 and the flow meter 2006 through the gateway 2024 to control and monitor the flow rate of water from the water source 2002 into the POE system 2010. While not shown here for the sake of simplicity, additional smart valves and/or flow meters may be included at inputs and outputs of any of the water softener 2008, the smart manifold 2012, the water heater 2014, the dishwasher 2016, the washing machine 2018, the kitchen tap 2020, and the drinking water tap 2022.

The smart manifold 2012 may receive softened water from an output of the water softener 2008 and unsoftened water directly from the flow meter 2006. The smart manifold 2012 may selectively route softened or unsoftened water to the water heater 2014, the dishwasher 2016, the washing machine 2018, the kitchen tap 2020, and the drinking water tap 2022 as well as any other appliance in or around the building that uses water. The smart manifold 2012 may include controllable valves at each of its inputs and outputs so that each of the inputs and outputs may be selectively blocked or opened in response to commands received from the controller 2030 via the gateway 2024.

The water heater 2014 may provide heated water it receives from the manifold 2012 and may provide the heated water to the kitchen tap 2020, the dishwasher 2016, and the washing machine 2018. The water heater 2014 may include controllable valves at each of its inputs and outputs so that each of the inputs and outputs may be selectively blocked or opened in response to commands received from the controller 2030 via the gateway 2024.

Water output from the flow meter 2006 may be split between an input of the manifold 2012 and the water softener 2008. The input valve 2009 of the water softener 2008 may be selectively opened and closed by the controller 2030. In this way, the flow of softened water into the building that corresponds to the system 2000 may be selectively blocked (e.g., when a leak is detected by the water leak sensor 2034 or any other applicable leak detection mechanism). The controller 2030 may communicate with the water softener 2008 or a processor thereof to control the amount of water softening agent (e.g., salt) that the water softener applies to the water it receives from the flow meter 2006. For example, the controller 2030 may receive an alert from the dishwasher 2016 that it has been instructed (e.g., via a user-provided command) to perform a self-cleaning cycle (i.e., "self-cleaning operation"). In some embodiments, instead of an alert, the dishwasher may send a request to the controller 2030, requesting initiation by the controller 2030 of the self-cleaning cycle of the dishwasher. In response to the alert or request received from the dishwasher, the controller 2030 may instruct the manifold 2012 to temporarily block each of its softened water outputs (e.g., via the manipulation of the valves at these outputs) with the exception of those connected to the dishwasher and the water heater. The controller 2030 may then instruct the water softener 2008 to apply more than the standard amount of softening agent to the water it is softening (e.g., to oversaturate the water with salt) before sending the softened water to the water heater 2014 and the dishwasher.

The controller 2030 may instruct the water heater 2014 to block each of its outputs other than the output coupled to the dishwasher 2016. At this stage, the kitchen tap 2020, the drinking water tap 2022, and the washing machine 2018 are cut off from the water softener 2008 by the manifold 2012 and the water heater 2014, so that they are unable to receive the oversaturated softened water. The dishwasher 2016 may then perform the self-cleaning operation (e.g., in response to a command or acknowledgment sent to the dishwasher 2016 by the controller 2030 once corresponding outputs of the manifold 2012 and the water heater 2014 are closed), which may be made more effective due to the softened water used in the operation being oversaturated with softening agent. In general, controlling the precise salt level for the water supplied to each appliance may be used to extend the life of each appliance. The controller 2030 may cause the previously closed outputs of the manifold 2012 and the water heater 2014 to be opened, and may cause the water softener to stop elevating the salt levels of the softened water upon receiving a notification from the dishwasher 2016 that the self-cleaning operation is complete.

The water leak sensor 2034 may be disposed in an area of the building in which leaks may be likely to occur (e.g., in the kitchen, laundry room, or bathroom). The water leak sensor 2034 may be, for example, a moisture sensor which, upon coming in contact with moisture, sends an alert to the controller 2030 to indicate that a leak has been detected. In response to this alert, the controller 2030 may cause an alert to be sent (e.g., in the form of a push notification or a text message) to one or more of the user devices 2032 via the gateway 2024 and the network 2026. In some embodiments, in response to being alerted to the presence of a leak, the controller 2030 may cause the smart valve 2004 to close, blocking the flow of all water into the building in order to mitigate the leak. In other embodiments, the alert provided by the water leak sensor 2034 may indicate a particular area of the building in which the leak has occurred, and the controller 2030 may instruct the manifold 2012 and/or the water heater 2014 to close valves at outputs coupled to appliances in the indicated area. For example, if a leak is detected in the kitchen, the controller 2030 may instruct the manifold 2012 and the water heater 2014 to block their respective outputs that are coupled to the kitchen tap 2020 and to the dishwasher 2016. As another example, if a leak is detected in the laundry room, the controller 2030 may instruct the manifold 2012 and the water heater 2014 to block their respective outputs that are coupled to the washing machine 2018. In an alternate embodiment, functions described above as being performed by the controller 2030 may instead be performed by the remote servers 2028 (e.g., in the "cloud").

In another alternate embodiment, the smart valve 2004 may be omitted and the output of the flow meter 2006 may be coupled only to the water softener 2008, rather than being split between the water softener 2008 and the manifold 2012, such that the water softener 2008 is the only source of water provided to the manifold 2012. In this alternate embodiment, the flow of water into the building may be shut off by closing the input valve 2009 of the water softener 2008 in response to the detection of a leak. For example, the water leak sensor 2034 may send an alert to an on-board controller of the water softener 2008 through the gateway 2024 indicating that a leak has been detected and, in response, the on-board controller may instruct the input valve 2009 to close.

Figure 21:
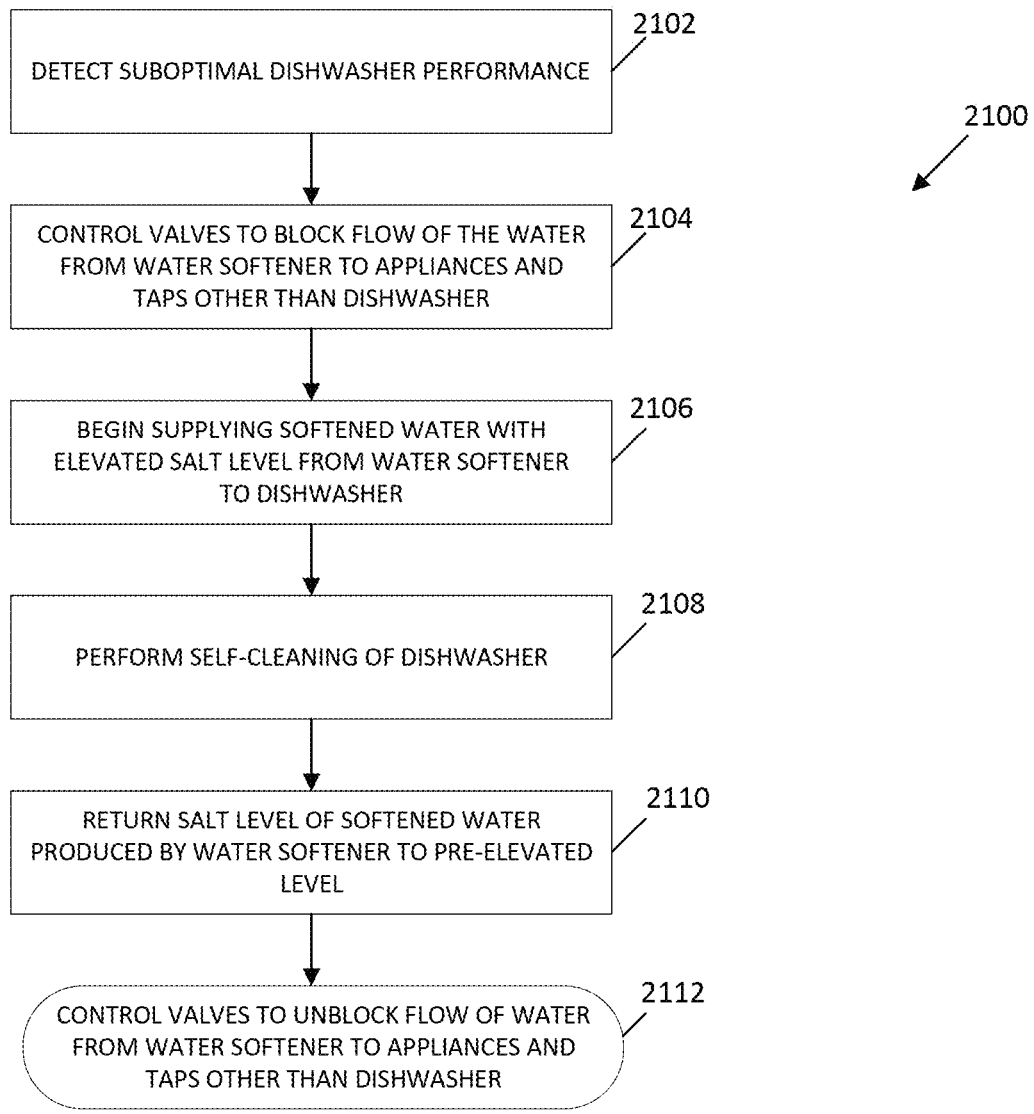
FIG. 21 is a flow chart of an example embodiment of a method of providing softened water with elevated salt levels to a dishwasher when the dishwasher performs a self-cleaning operation.

FIG. 21 shows an illustrative method 2100 by which a dishwasher (e.g., dishwasher 2016 of FIG. 20) may perform a self-cleaning operation using softened water with an elevated salt level. At step 2102, the dishwasher detects that it is performing suboptimally and may send a corresponding alert to the processor of a controller (e.g., controller 2030 of FIG. 20) or a remote server (e.g., remote servers 2028 of FIG. 20) indicating this suboptimal performance. In some embodiments, a user may provide input at a user interface of the dishwasher or a personal electronic device (e.g., electronic devices 2032 of FIG. 20) indicating that the dishwasher is performing suboptimally and that self-cleaning should be performed.

At step 2104, the processor instructs valves of a manifold (e.g., manifold 2012 of FIG. 20) and a water heater (e.g., water heater 2014 of FIG. 20) to block the flow of softened water from any outputs of the manifold and water heater that are not coupled to the dishwasher. This avoids sending softened water with elevated salt levels to appliances or taps where it is not needed.

At step 2106, the processor instructs a water softener (e.g., water softener 2008 of FIG. 20) to begin supplying softened water with elevated salt levels to the dishwasher. At step 2108, the processor instructs the dishwasher to perform the self-cleaning operation. The dishwasher may send an alert to the processor indicating that the self-cleaning operation is complete. At step 2110, the processor instructs the water softener to adjust the salt levels of the softened water it produces to a previous, non-elevated level. At step 2112, the processor instructs the previously closed valves of the manifold and water heater to reopen, unblocking the flow of softened water to the corresponding appliances and taps.

It should be understood that the use of the term "retrieve", as used in the description above with respect to retrieval of data or information, may correspond to process in which a device (e.g., processor) first sends a request for data to a data source, then receives the requested data from the data source.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

Features which are described in the context of separate embodiments may also be provided in combination in a single embodiment. Conversely, various features which are, for brevity, described in the context of a single embodiment, may also be provided separately or in any suitable subcombination. The applicant hereby gives notice that new claims may be formulated to such features and/or combinations of such features during the prosecution of the present application or of any further application derived therefrom. Features of the systems described may be incorporated into/used in corresponding methods and vice versa.

For the sake of completeness, it is also stated that the term "comprising" does not exclude other elements or steps, the term "a" or "an" does not exclude a plurality, a single processor or other unit may fulfil the functions of several means recited in the claims and any reference signs in the claims shall not be construed as limiting the scope of the claims.

The invention claimed is:

1. A system comprising:
    a water system comprising:
        a water softener system that receives unsoftened water from a water source and that converts the unsoftened water into softened water;
        a flow meter in fluid communication with an output of the water softener system, the flow meter generating flow rate data; and
        a communication system comprising:
            a gateway device that is coupled to and in electronic communication with the water softener system and the flow meter; and
            a controller coupled to the gateway device, the controller including a processor and a memory device comprising computer-readable instructions which, when executed, cause the processor to:
                periodically retrieve the flow rate data from the flow meter;
                generate a first water usage profile corresponding to a first time period based on the flow rate data, the first water usage profile comprising metadata and first water usage statistics derived from a first portion of the flow rate data that is generated during the first time period;
                send the first water usage profile to a user device via the gateway device;
                compare the first water usage profile to other water usage profiles in a local profile database;
                identify the other water usage profiles that are similar to the first water usage profile based on a set of system characteristics; and
                determine whether a water usage statistic of the first water usage profile is normal or abnormal based on a water usage statistic of the other water usage profiles identified as similar to the first water usage profile; and
                organize and filter the first water usage profile according to the metadata.

2. The system of claim 1, wherein the instructions, when executed, further cause the processor to:
    retrieve a second water usage profile corresponding to a second time period from the memory device, wherein:
        the second time period immediately precedes the first time period,
        the second water usage profile comprises second water usage statistics derived from a second portion of the flow rate data that is generated during the second time period,
        the first water usage statistics include a first total water usage for the first time period, and
        the second water usage statistics include a second total water usage for the second time period.

3. The system of claim 2, wherein the instructions, when executed, further cause the processor to:
    perform a comparison of the first total water usage and the second total water usage; generate a water efficiency report based on the comparison, the water efficiency report indicating whether water usage efficiency of the water system has increased or decreased from the second time period to the first time period; and
    send the water efficiency report to the user device via the gateway device.

4. The system of claim 3, wherein the instructions, when executed, further cause the processor to:
    determine that the first total water usage exceeds the second total water usage based on the comparison;
    determine that the first water usage profile represents a constant flow of water occurring for longer than a predetermined threshold time period; and
    send an alert to the user device indicating that a leak has been detected in the water system.

5. The system of claim 4, wherein the instructions, when executed, further cause the processor to:
    determine that automatic leak prevention is enabled based on a configuration stored in the memory device; and
    cause, via electronic communication via the gateway device, a network-enabled valve disposed at the water source of the water system to close to prevent water from flowing from the water source.

6. The system of claim 2, wherein the instructions, when executed, further cause the processor to:
    organize and filter the first water usage profile and the second water usage profile according to the metadata.

7. The system of claim 2, wherein the instructions, when executed further cause the processor to:
    generate at least one or more aggregate water usage profiles derived from a set of water usage profiles including the first water usage profile and the second water usage profile, wherein the at least one or more aggregate water usage profiles are generated based on the metadata.

8. The system of claim 1, wherein the instructions, when executed, further cause the processor to:
    determine a time that data capture identifiers associated with flow rate data captures were added to the generated water usage profile.

* * * * *